(12) United States Patent
Ramos et al.

(10) Patent No.: US 11,479,963 B2
(45) Date of Patent: Oct. 25, 2022

(54) MODULAR MULTI-CONTAINER HOUSING STRUCTURE, MULTI-CONTAINER INTERLOCK, AND METHODS FOR MANUFACTURE OF SAME

(71) Applicant: BEA Architects, Inc., Miami, FL (US)

(72) Inventors: Bruno Elias Ramos, Key Biscayne, FL (US); Mario F. Ortega, Miami, FL (US); Evelyn Iglesias, Miami, FL (US)

(73) Assignee: BEA ARCHITECTS, INC., Miami, FL (US)

( * ) Notice: Subject to any disclaimer, the term of this patent is extended or adjusted under 35 U.S.C. 154(b) by 0 days.

(21) Appl. No.: 17/138,632

(22) Filed: Dec. 30, 2020

(65) Prior Publication Data

US 2021/0381224 A1 Dec. 9, 2021

Related U.S. Application Data

(60) Provisional application No. 63/036,751, filed on Jun. 9, 2020.

(51) Int. Cl.
*E04B 1/41* (2006.01)
*E04B 1/343* (2006.01)
(Continued)

(52) U.S. Cl.
CPC ...... *E04B 1/34331* (2013.01); *E04B 1/34384* (2013.01); *E04B 1/34807* (2013.01); *E04B 1/34869* (2013.01); *E04B 1/40* (2013.01); *E04B 1/41* (2013.01); *E04H 1/02* (2013.01); *E04H 1/12* (2013.01); *F16B 2/10* (2013.01);
(Continued)

(58) Field of Classification Search
CPC . Y10T 24/28; Y10T 403/599; B65D 90/0013; E04H 2001/1283; E04H 1/1205; E04H 1/005; E04H 1/12; E04B 1/3433; E04B 1/34384; E04B 1/34331;
(Continued)

(56) References Cited

U.S. PATENT DOCUMENTS 3,592,493 A * 7/1971 Goose .................. B62D 33/044
403/247
3,972,439 A 8/1976 DiMartino
(Continued)

*Primary Examiner* — Babajide A Demuren
*Assistant Examiner* — Daniel J Kenny
(74) *Attorney, Agent, or Firm* — Gregory L. Mayback; Dickinson Wright PLLC

(57) ABSTRACT

A modular multi-container housing structure connector for containers, which each have sides including a roof, a floor, and four lateral sides, includes a connector frame comprising vertical and horizontal struts shaped to connect to at least one of the sides of two adjacent containers and at least one interlock configured to secure the connector frame to the side of one container. The at least one interlock may be a plurality of interlocks. The connector frame may comprise two vertical struts and two horizontal struts each shaped and configured to connect to a respective edge of an adjacent side of two adjacent containers and, responsive to the connector frame being connected to two adjacent sides of two adjacent containers by the plurality of interlocks, the connector frame and interlocks form a container-to-connector frame-to-container connection to establish a weather-tight housing structure with the two or multiple connected containers.

18 Claims, 41 Drawing Sheets

(51) Int. Cl.
*E04B 1/348* (2006.01)
*E04H 1/12* (2006.01)
*E04H 1/02* (2006.01)
*F16B 2/10* (2006.01)

(52) U.S. Cl.
CPC ............... *E04B 2001/34884* (2013.01); *E04B 2001/34892* (2013.01); *E04H 2001/1283* (2013.01); *Y10T 403/59* (2015.01)

(58) Field of Classification Search
CPC ................. E04B 1/34869; E04B 1/41; E04B 2001/34884; E04B 2001/34892
See application file for complete search history.

(56) References Cited

U.S. PATENT DOCUMENTS

| | | | | |
|---|---|---|---|---|
| 3,980,185 | A | 9/1976 | Cain | |
| 4,599,829 | A | 7/1986 | Dimartino, Sr. | |
| 4,907,388 | A * | 3/1990 | Siahatgar | E04B 2/744 52/481.2 |
| 4,942,975 | A | 7/1990 | Capron et al. | |
| 5,454,673 | A | 10/1995 | DiMartino | |
| 6,336,765 | B1 | 1/2002 | Watanabe | |
| 9,121,168 | B2 * | 9/2015 | Levy | E04B 1/3483 |
| 9,809,358 | B2 * | 11/2017 | Lanigan, Sr. | B65D 21/0209 |
| 2005/0008430 | A1 * | 1/2005 | Kahl | F16B 7/18 403/231 |
| 2016/0130795 | A1 * | 5/2016 | Downey | E04B 1/34823 52/79.1 |
| 2018/0109163 | A1 * | 4/2018 | Paine | H02K 7/1815 |

* cited by examiner

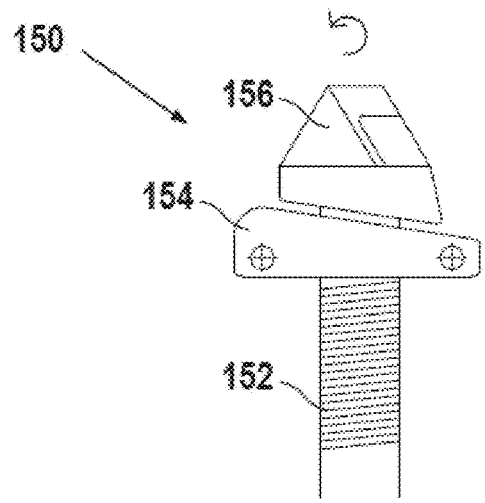
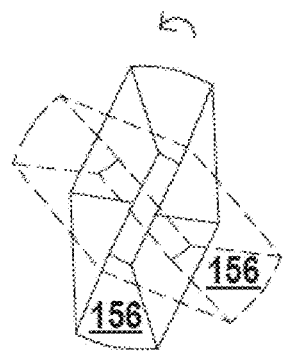
FIG. 19     FIG. 20
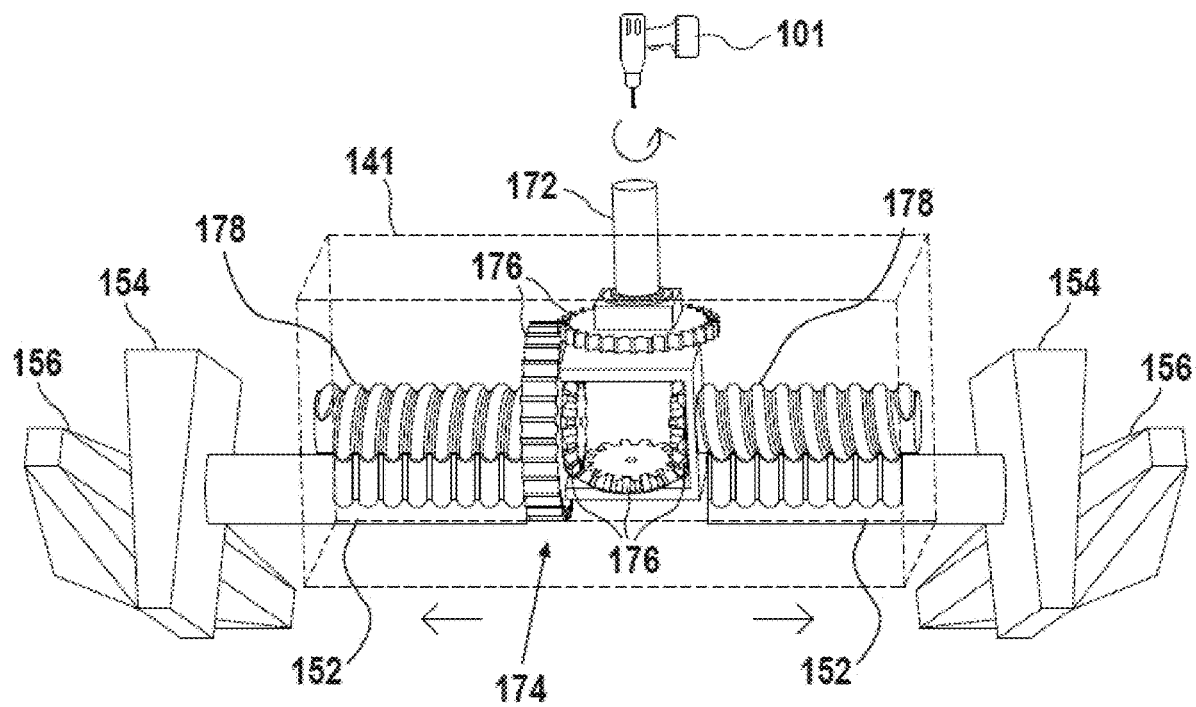
FIG. 21

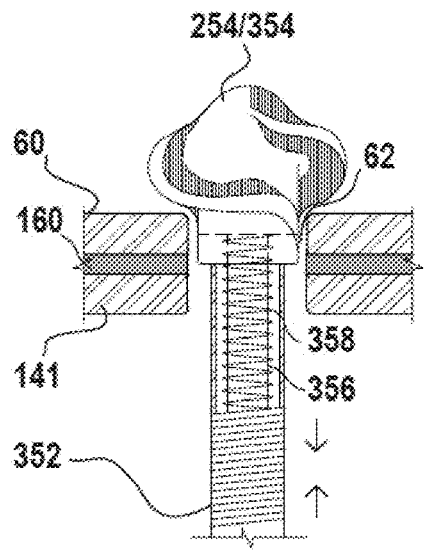
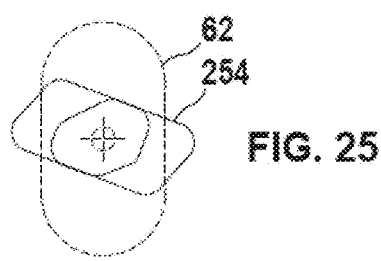
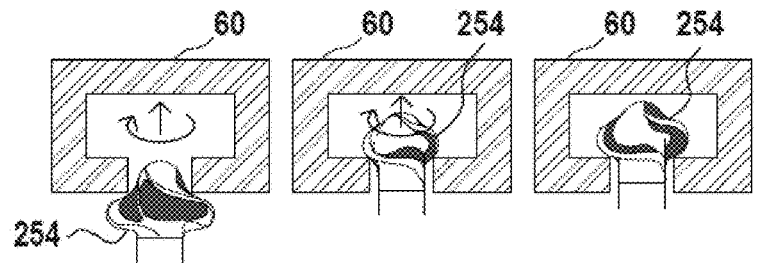
FIG. 24　　FIG. 25　　FIG. 26　　FIG. 27　　FIG. 28
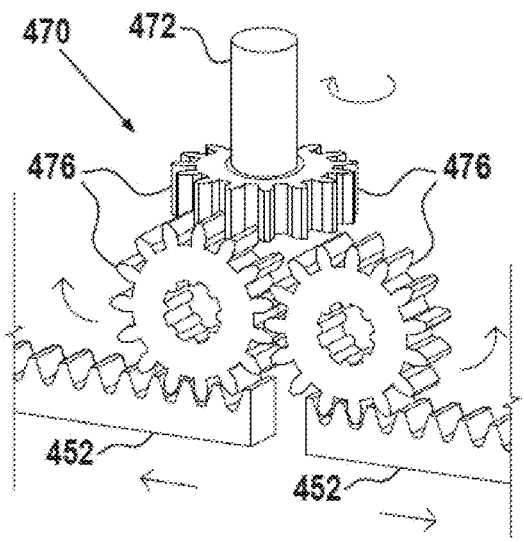
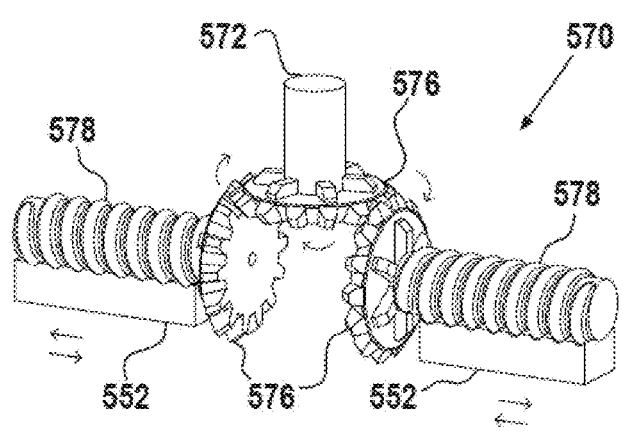
FIG. 29　　FIG. 30

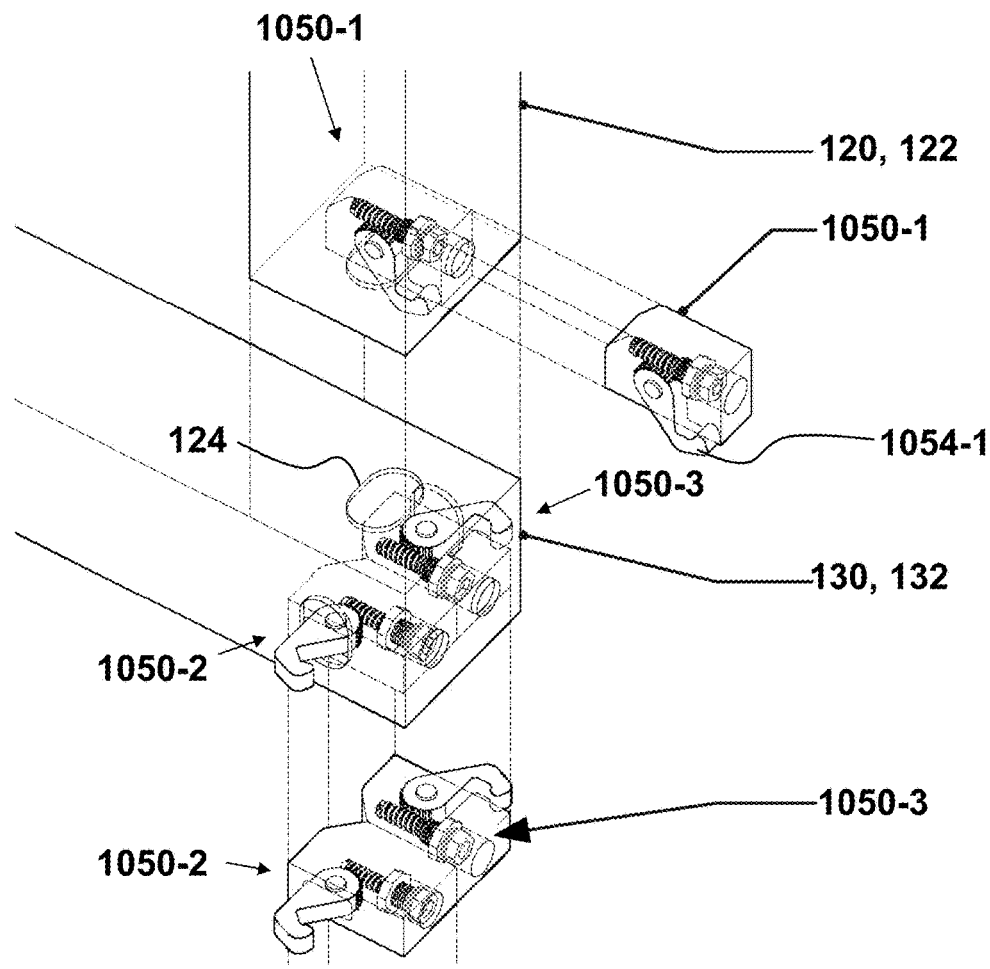
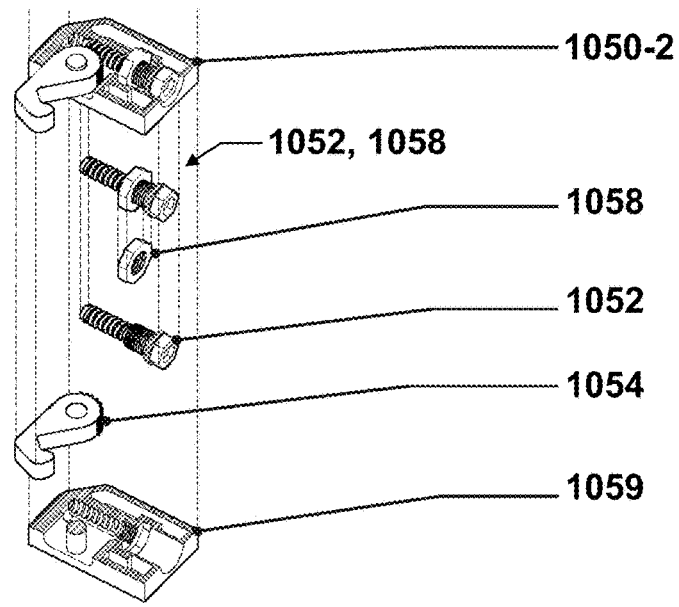

MODULAR MULTI-CONTAINER HOUSING STRUCTURE, MULTI-CONTAINER INTERLOCK, AND METHODS FOR MANUFACTURE OF SAME

CROSS-REFERENCE TO RELATED APPLICATIONS

This application claims the priority, under 35 U.S.C. § 119, of CU.S. Provisional Patent Application No. 63/036,751, filed Jun. 9, 2020; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of modular structures, in particular, houses. The present disclosure relates to a modular multi-container housing structure, a multi-container interlock, and methods for manufacturing the housing structure and the interlock.

BACKGROUND OF THE INVENTION

As used herein, a container refers to an intermodal, box-type, shipping or freight container, for example, those that are loaded and moved on container ships, trains, and 18-wheel container trucks. A container can refer to short or long shipping containers, for example, containers that are 20', 40', 6 m, and/or 12 m in length. Many containers are 8' (2.43 m) wide and 8.5' (2.59 m) high, although they can come in any length, width, or height. The container can be made of any metal or plastic material but, typically, the container is made of steel. The containers may have corrugated sides, roof, and/or floor. Some have flat sides, roof, and/or floor. Typical containers are rectanguloid or box-type and have one side that also operates as a door. Either the entire side or part of the side is the door to access the interior of the container.

All container housing to date has been using existing containers and cutting into the container, welding the containers together, and reinforcing the containers to meet the desired configurations. This required significant manual labor in the field, specialized tools, torches, welders, etc., thus, resulting in high production cost. It would be beneficial to eliminate and/or reduce cutting into containers, welding the containers together, and reinforcing the containers.

Thus, a need exists to overcome the problems with the prior art systems, designs, and processes as discussed above.

SUMMARY OF THE INVENTION

The systems, apparatuses, and methods described provide a modular multi-container housing structure, a multi-container interlock, and methods for manufacturing the housing structure and the interlock that overcome the hereinafore-mentioned disadvantages of the heretofore-known devices and methods of this general type and that provide such features with a housing structure that is able to withstand hurricane wind forces that could approach 480 kilometers per hour (300 miles per hour).

The systems, apparatuses, and methods described eliminates or substantially reduces the need to cut into containers. The systems, apparatuses, and methods described eliminates the need to welding containers together. The systems, apparatuses, and methods described eliminates the need to reinforce containers used for modular housing. All of this is accomplished by producing the containers and modules in a factory for field assembly using nothing more than a hand-held power tool, such as a corded or cordless drill.

The modularized system is weather-tight once assembled and testing of the systems will assure that the modular housing will withstand winds of up to approximately 482.8 kph (approximately 300 mph), thus complying and exceeding current hurricane and tornado building codes. The unique systems, apparatuses, and methods of attaching the units together create a unified component without the need of manual fasteners or welding.

With the foregoing and other objects in view, there is provided, a modular multi-container housing structure connector for containers each having sides including a roof, a floor, and four lateral sides, the connector comprising a connector frame comprising vertical and horizontal struts shaped to connect to at least one of the sides of two adjacent containers and at least one interlock configured to secure the connector frame to the side of one container.

With the objects in view, there is also provided a modular multi-container housing structure connector for containers each having sides including a roof, a floor, and four lateral sides, the connector comprising a connector frame comprising two vertical struts and two horizontal struts each shaped to removably connect to a respective edge of an adjacent side of two adjacent containers and a plurality of interlocks each configured to secure at least one of the struts to the side of at least one of the two adjacent containers, and, responsive to the connector frame being connected to two adjacent sides of two adjacent containers by the plurality of interlocks, the connector frame and interlocks form a container-to-connector frame-to-container connection to establish a weather-tight housing structure with the two connected containers.

With the objects in view, there is also provided a modular multi-container housing structure comprising at least two containers each having sides including a roof, a floor, and four lateral sides and a container connector comprising a connector frame comprising two vertical struts and two horizontal struts each shaped to removably connect to a respective edge of an adjacent side of two adjacent containers and a plurality of interlocks each configured to secure at least one of the struts to the side of at least one of the two adjacent containers, and, responsive to the connector frame being connected to two adjacent sides of two adjacent containers by the plurality of interlocks, the connector frame and interlocks form a container-to-connector frame-to-container connection to establish a weather-tight housing structure with the two connected containers.

In accordance with another feature, the at least one interlock is a plurality of interlocks and the connector frame comprises two vertical struts and two horizontal struts each shaped and configured to connect to a respective edge of an adjacent side of two adjacent containers and, responsive to the connector frame being connected to two adjacent sides of two adjacent containers by the plurality of interlocks, forms a container-to-connector frame-to-container connection to establish a weather-tight housing structure with the two connected containers.

In accordance with a further feature, the at least one of the sides is selected from one of the roof, the floor, and one of the four lateral sides.

In accordance with an added feature, the housing structure is configured to withstand wind forces up to 480 kilometers per hour.

In accordance with an additional feature, the at least one interlock is shaped to secure the connector frame to the side of one container with a hand tool having an actuator.

In accordance with yet another feature, the shape of the at least one interlock that corresponds to the actuator of the hand tool to secure the at least one interlock to the connector frame comprises at least one of a screw drive and a nut drive.

In accordance with yet a further feature, the screw drive comprises at least one of a Phillips head orifice, a slotted orifice, a torx orifice, a tri-wing orifice, a spline orifice, a hex socket, a square orifice, and a triangle orifice.

In accordance with yet an added feature, the interlock is configured to removably lock with standard corner fittings of a container.

In accordance with yet an additional feature, the connector frame comprises at least one of a rectangular, one-piece frame, a square, one-piece frame, a rectangular, two-piece frame, a square, two-piece frame, a rectangular, four-piece frame, and a square, four-piece frame.

In accordance with again another feature, there is provided a water-proofing seal disposed between the connector frame and an adjacent side of the adjacent container.

In accordance with again a further feature, the connector frame further comprises a window frame system as well as a window's shutter system.

In accordance with a concomitant feature, the connector frame further comprises a door frame system.

In accordance with an associated feature, the connector frame further comprises a roof module frame system, including and not limited to gable roof, hip roof, Polynesian roof, curved roof, and/or shed roof. The roof module is connected from its bottom side to the connector frame connected above or on top of a shipping container.

With the foregoing and other objects in view, there is provided, a modular multi-container housing structure connection system for shipping containers having corner fittings defining orifices, comprising a plurality of modular interchangeable interlocks each having a lock part, movable between a locked position and an unlocked position, and shaped and configured to lock within an orifice of a corner fitting of a shipping container, a modular connector frame comprising a plurality of modular, interchangeable struts each having, a first corner interlock assembly defining a first hollow interlock assembly compartment shaped to contain therein at least one of the interchangeable interlocks, a second corner interlock assembly defining a second hollow interlock assembly compartment shaped to contain therein at least another one of the interchangeable interlocks, wherein the plurality of modular, interchangeable struts includes at least a pair of right and left vertical struts and a pair of upper and lower horizontal struts, at least a first subset of the interchangeable interlocks are disposed within each of the first and second hollow interlock assembly compartments and positioned such that, responsive to moving each lock part into the locked position, the pairs of vertical and horizontal struts are removably locked together to form a completely enclosed rectangular frame having four corners, and a second subset of the interchangeable interlocks are disposed in at least one of the first and second corner interlock assemblies at each of the four corners of the frame positioned and are configured to lock within an opposing orifice of a corner fitting of a shipping container responsive to the frame being placed against a side of the shipping container and to the second subset of the interchangeable interlocks being moved into the locked position.

With the objects in view, there is also provided a modular multi-container housing structure connection system for shipping containers having corner fittings defining orifices comprises a plurality of modular interchangeable interlocks shaped and configured to lock within an orifice of a shipping container, a modular connector frame comprising modular, interchangeable struts each having opposing first and second corner interlock assemblies each containing at least one of the modular interchangeable interlocks, the struts comprising a pair of right and left vertical struts and a pair of upper and lower horizontal struts, a first subset of the plurality of modular interchangeable interlocks is within the corner interlock assemblies and is positioned such that, when locked, the vertical and horizontal struts removably lock together to form a rectangular frame, and a second subset of the plurality of modular interchangeable interlocks is within the corner interlock assemblies of the frame positioned and configured to lock within an opposing orifice of a corner fitting of a shipping container when the frame is placed against a shipping container and when the second subset is locked.

In accordance with a further feature, there is provided a third subset of the interchangeable interlocks disposed in at least one of the first and second corner interlock assemblies at each of the four corners of the frame positioned and configured to lock within an opposing orifice of a corner fitting of a shipping container responsive to the frame being placed against a side of the shipping container and to the third subset of the interchangeable interlocks being moved into the locked position, a first shipping container having a first side comprising four corner fittings each defining at least one lock part orifice, a second shipping container having a second side opposing and facing the first side and comprising four corner fittings each defining at least one lock part orifice, and wherein the frame has a first face and a second face opposite the first face, and is disposed to face the lock parts of the second subset of the interchangeable interlocks towards the first side such that, responsive to the second subset of the interchangeable interlocks being moved into the locked position, each lock part of the second subset of the interchangeable interlocks removably locks within a respective opposing lock part orifice of each of the four corner fittings of the first side and water tightly seals the first face of the frame against the first side of the first shipping container and to face the lock parts of the third subset of the interchangeable interlocks towards the second side such that, responsive to the third subset of the interchangeable interlocks being moved into the locked position, each lock part of the third subset of the interchangeable interlocks removably locks within a respective opposing lock part orifice of each of the four corner fittings of the second side and water tightly seals the second face of the frame against the second side of the second shipping container.

In accordance with an added feature, each of the plurality of modular interchangeable interlocks is identical in shape and is configured to be any of the first and second subsets of the interchangeable interlocks.

In accordance with an additional feature, each of the plurality of modular interchangeable interlocks is identical in shape and configured to be any of the first, second, and third subsets of the interchangeable interlocks.

In accordance with yet another feature, each of the plurality of modular interchangeable interlocks comprises a pivot boss, a body, and a driveshaft, the lock part has threads and is configured to pivot on the pivot boss with respect to the body, and the driveshaft comprises threads operably connected to and corresponding with the threads of the lock part and a connector shaped to interact with a standard power tool and, responsive to rotation of the connector by the power tool, to pivot the lock part about the pivot boss between the unlocked position and the locked position.

In accordance with yet a further feature, the driveshaft has a longitudinal axis, is fixed in place with respect to the body, and is rotatable about the longitudinal axis.

In accordance with yet an added feature, there is provided a washer and nut assembly fixing the driveshaft in place in the body with the driveshaft being freely rotatable about the longitudinal axis.

In accordance with yet an additional feature, the connector has a head comprising one of an internal Philips head connector, an internal flat head connector, an external hexagonal nut connector, an external star nut connector, and an external square nut connector.

In accordance with again another feature, each of the plurality of modular, interchangeable struts comprises a first end at which the first corner interlock assembly defines the first hollow interlock assembly compartment shaped to contain therein at least three of the interchangeable interlocks and a second end, opposite the first end, at which the second corner interlock assembly defines the second hollow interlock assembly compartment shaped to contain therein at least another three of the interchangeable interlocks.

In accordance with again a further feature, there is provided at least one accessory comprising at least one of a stairway, a façade, siding, a window, a window treatment, a window casement, a roof, a roof segment, a wall, a door, and a door casement, each accessory comprising at least one hollow interlock assembly compartment shaped to receive therein at least one of the modular interchangeable interlocks.

In accordance with again an added feature, responsive to the at least one modular interchangeable interlock being disposed in the at least one hollow interlock assembly compartment and to the lock part of the at least one modular interchangeable interlock being moved into the locked position, the at least one modular interchangeable interlock removably locks the respective accessory to a respective opposing lock part orifice of one of the corner fittings of one of the first and second shipping containers.

In accordance with again an additional feature, at least one of the first and second shipping containers have dimensions of one of 8' wide by 8.5' high by 20' long, 8' wide by 8.5' high by 40' long, 8' wide by 8.5' high by 40' long, 8' wide by 8.5' high by 10' long, 8' wide by 9.5' high by 40' long, and 8' wide by 9.5' high by 45' long.

In accordance with still another feature, the first and second shipping containers and the modular connector frame comprise at least one school room.

In accordance with still a further feature, the first and second shipping containers and the modular connector frame comprise at least one laboratory.

In accordance with still an added feature, the first and second shipping containers and the modular connector frame comprise at least one clean room.

In accordance with a concomitant feature, the first and second shipping containers and the modular connector frame comprise a hurricane shelter configured withstand winds of up to 300 mph.

Although the systems, apparatuses, and methods are illustrated and described herein as embodied in a modular multi-container housing structure, a multi-container interlock, and methods for manufacturing the housing structure and the interlock, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 19 is a fragmentary, side elevational view of a portion of a securing tab/twistlock cone of the interlock of FIG. 21 installed against a shipping container's corner fitting in a rotated unlocked position;

FIG. 20 is a fragmentary, top plan view of the portion of the securing tab/twistlock cone of FIG. 21 in both the unlocked position and, with dashed lines, in a rotated partially or fully locked position;

FIG. 21 is a fragmentary, perspective view of an exemplary embodiment of a container-to-connector frame-to-container securing interlock;

FIG. 24 is a fragmentary, side elevational and partially cross-sectional view of a securing tab/twistlock cone, with a spring-loaded internal rod, of the container-to-connector frame-to-container securing interlock system of either of FIG. 22 or 23 within a securement chamber and locking in place to a shipping container's corner fitting;

FIG. 25 is a plan view of the securing tab/twistlock cone of FIG. 24 with helical spiral fins of the securing tab locked on walls of the shipping container's corner fitting, the opening of the connector frame's securement chamber and the shipping container's corner fitting in which the securing tab extends being shown in dashed lines;

FIG. 26 is a fragmentary, cross-sectional view of the securing tab/twistlock cone, with helical spiral fins, and a shipping container's corner fitting of FIGS. 22 to 24 with the securing tab in a first rotated position outside the shipping container's corner fitting;

FIG. 27 is a fragmentary, cross-sectional view of the securing tab/twistlock cone of FIG. 26 with the securing tab in a second rotated position partially inside the shipping container's corner fitting;

FIG. 28 is a fragmentary, cross-sectional view of the securing tab/twistlock cone of FIG. 26 with the securing tab in a third rotated position within the shipping container's corner fitting;

FIG. 29 is a fragmentary, perspective view of an alternative embodiment of a securing interlock mechanism of a container-to-connector frame-to-container connection;

FIG. 30 is a fragmentary, perspective view of an alternative embodiment of a securing interlock mechanism of a container-to-connector frame-to-container connection;

FIG. 47 is an exploded, enlarged perspective and partially transparent view of an exemplary embodiment of the interlock mechanism shown in FIG. 37 within a portion of a connector frame;

FIG. 48 is an exploded, enlarged perspective view of the interlock mechanism shown in FIG. 47;

DETAILED DESCRIPTION OF THE EMBODIMENTS

Figure 1:
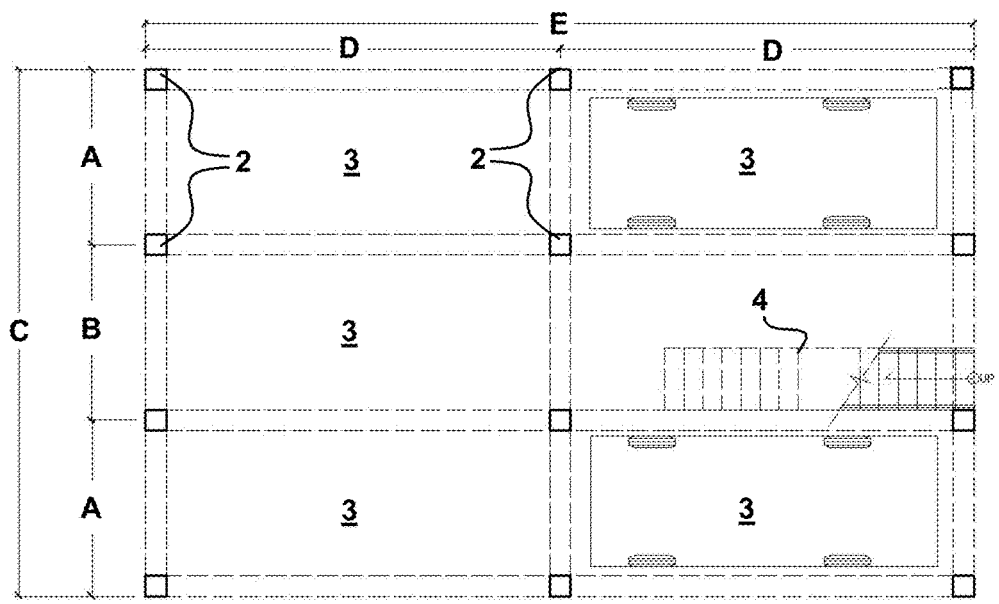
FIG. 1 is a floor plan for a ground floor of an exemplary embodiment of a modular, multi-container, living structure.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described herein are various configurations for a container-to-connector frame-to-container connection systems and processes for installation of the connection systems. Included in the various connections are horizontal container-to-container connection systems, vertical container-to-container connection systems, window-to-container connection systems, door-to-container connection systems, and shutters for doors, sliding and pinned, and shutters for windows, sliding and pinned. Roof modules include, for example, gable roof, curved roof, shed roof, Polynesian roof, and hip roof, on connector frame connection and/or on-legs connection allowing in-between space for hot water/MIAC systems, and solar panels. Various configurations of a connection interlock are described to secure the container-to-connector frame-to-container connection systems to shipping containers.

Figure 2:
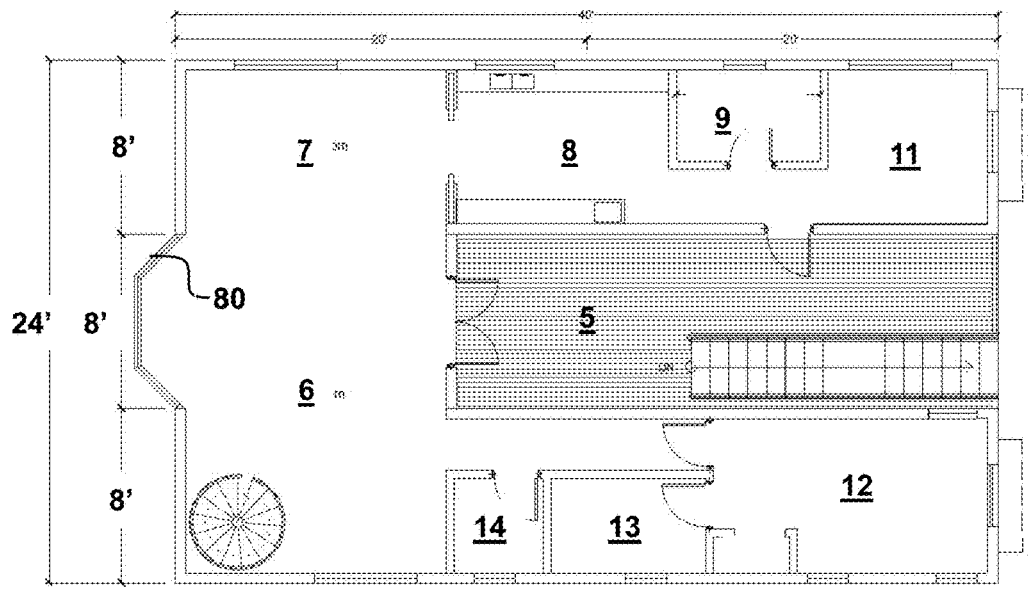
FIG. 2 is a floor plan for a first floor of the multi-container structure of FIG. 1.
Figure 3:
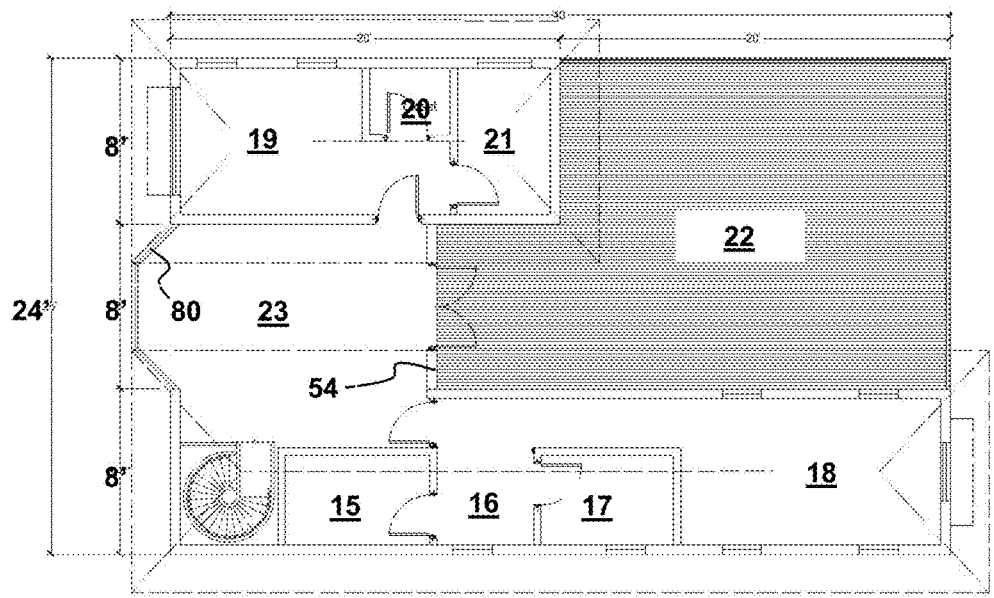
FIG. 3 is a floor plan for a second floor of the multi-container structure of FIG. 1.
Figure 4:
FIG. 4 is a front elevational view of an exemplary embodiment of the multi-container structure of FIGS. 1 to 3.
Figure 5:
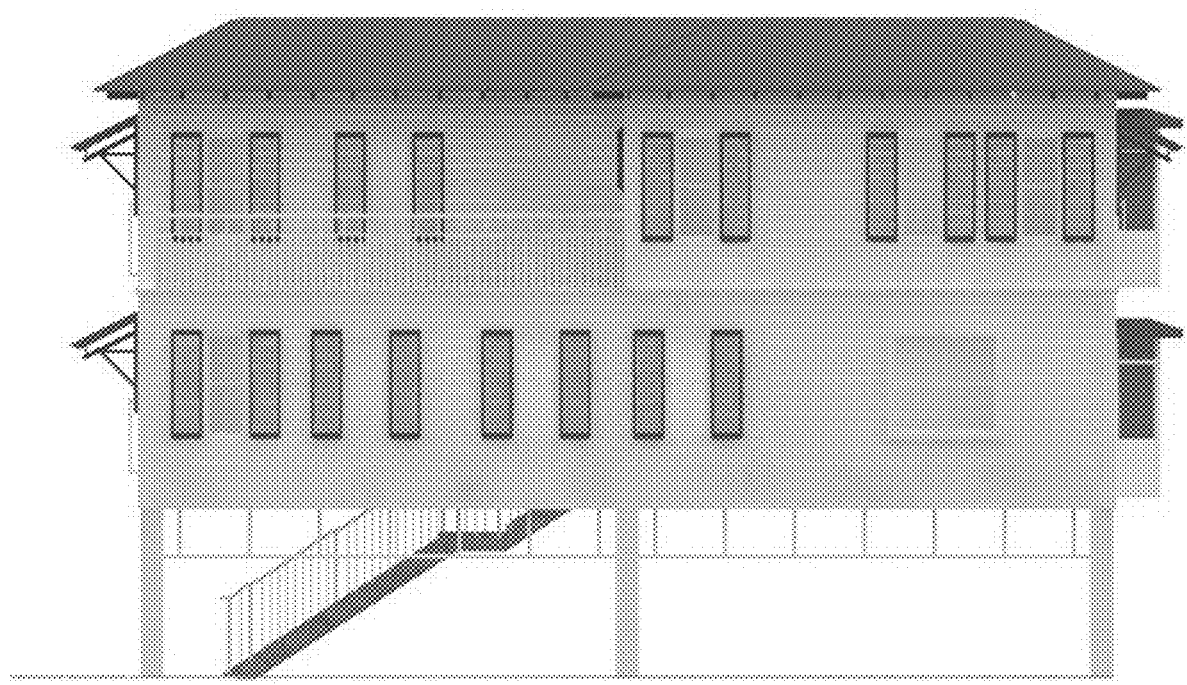
FIG. 5 is a right side elevational view of the multi-container structure of FIG. 4.
Figure 6:
FIG. 6 is a perspective view of the multi-container structure of FIG. 4 from the front right corner.
Figure 7:
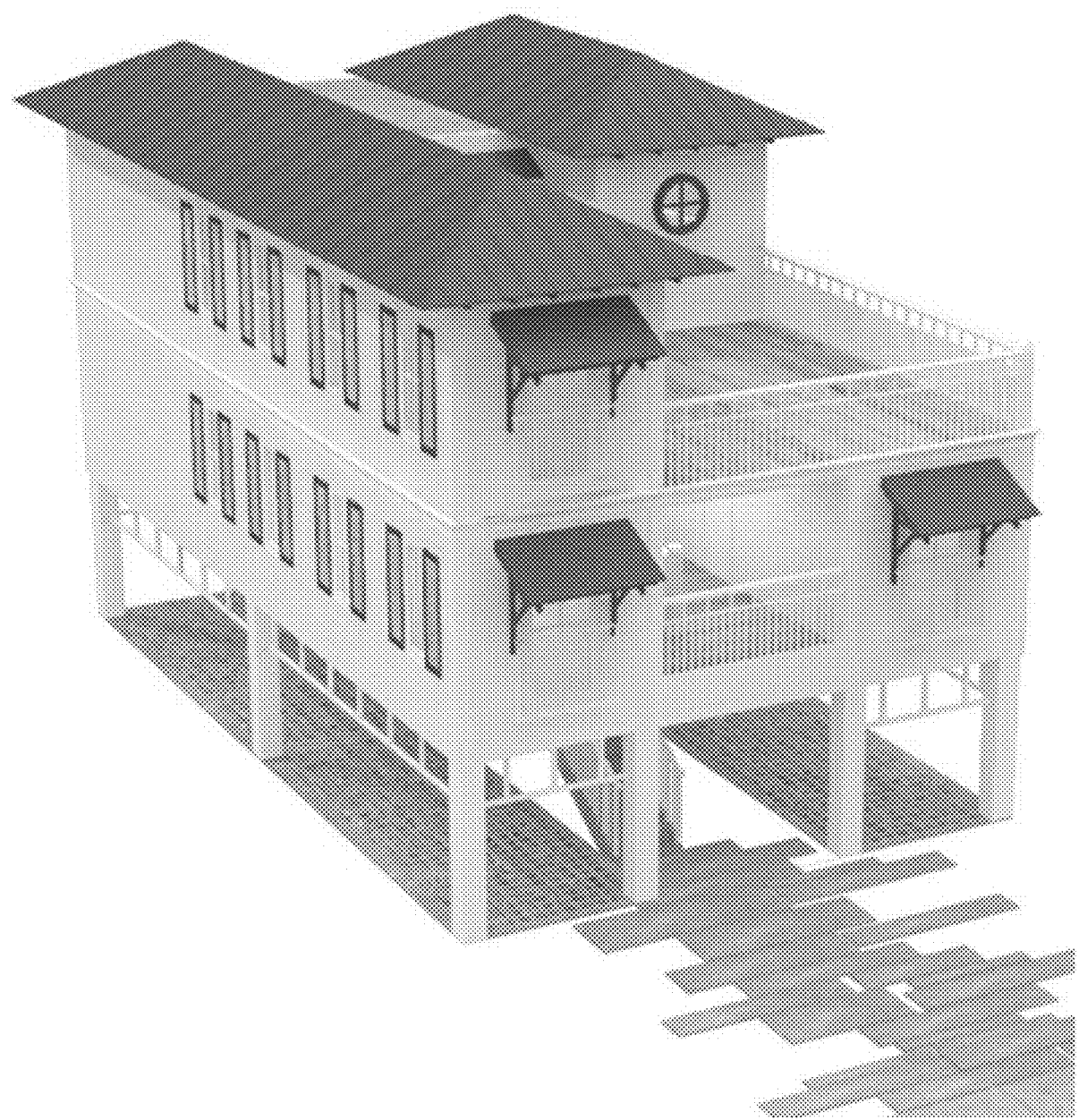
FIG. 7 is a perspective view of the multi-container structure of FIG. 4 from above the front left corner.

Described now are exemplary embodiments. Referring now to the figures of the drawings in detail and first, particularly to FIGS. 1 through 8, there is shown a first exemplary embodiment of a modular multi-container housing structure 1 employing a container-to-connector frame-to-container connection 100 comprising multi-container interlocks and/or interlock parts as described in further detail below. In this exemplary embodiment, FIGS. 4 to 7 show a completely assembled multi-container housing structure 1 and FIGS. 1 to 3 show a floor plan for the housing structure 1 made from a set of nine (9) shipping containers (seven (7) shipping containers 20' long 10-1 to 10-7, e.g., each having an outside width of 8' and a height of 8'6", and 2 inner/in-between shipping containers 10-8 to 10-9). FIG. 1 depicts the ground level of the housing structure 1. Here, a set of twelve columns 2 are driven into the ground for support of the housing structure 1. The columns are set apart to rest at the lower corners of each of the containers 10. The short leg separation distance A can be any width and, in an exemplary embodiment, is 8'. The two smaller containers 10 are in the middle section of the structure 1 and, therefore, the container separation distance B also is 8'. Thus, the width C of the structure 1 can be, for example, 24'. The long leg separation distance D can be any width and, in an exemplary embodiment, is 20'. Thus, the depth E of the structure 1 can be, for example, 40'. In this exemplary floor plan, the ground level is approximately 1,020 $ft^2$ of covered space with storage or parking areas 3 and a stairway 4.

FIG. 2 depicts the first level of the housing structure 1. Here, a first set of two of the containers 10-1, 10-2 are on the left set of six columns 2 and second set of two others of the containers 10-3, 10-4 are on a right set of six columns 2 to define an interior space therebetween that includes an entranceway 5 at the top of the stairway 4 and part of a living room 6 in container 10-8. The second set of the two containers 10-3, 10-4 define, from left to right in FIG. 2, a dining room 7, a kitchen 8, a laundry room 9, and an office/breakfast room 11. A first set of the two containers 10-1, 10-2 define, from right to left in FIG. 2, a guest bedroom 12, a guest bathroom 13, a powder room 14, and part of the living room 6 with a bottom portion of a spiral stairway. As such, the first level has approximately 719 $ft^2$ of enclosed air-conditioned space and 224 $ft^2$ of covered enclosure.

FIG. 3 depicts the second level of the housing structure 1. Here, a third set of two of the containers 10-5, 10-6 are secured on top of on the first set of containers 10 with container-to-connector frame-to-container connection 100 and another container 10-7 is secured/connected on top of one 10-4 of the second set of containers 10 with a vertical container-to-connector frame-to-container connection. The third set of the two containers 10-5, 10-6 define, from left to right in FIG. 3, the upper part of the spiral stairway, a master closet 15, a dressing room 16, a master bath 17, and a master bedroom 18. In-between the sets of containers there is a defined exterior terrace/balcony space 22. The last container 10-7 defines, in FIG. 3, a guest room 19 with a closet 20 and guest bathroom 21. The last container 10-7 is also secured and connected to a middle container 10-9 with a horizontal container-to-connector frame-to-container connection. The middle container 10-9 is secured on top of the first middle container 10-8 with vertical container-to-connector frame-to-container connection. The middle container 10-9 is also secured and connected between the container 10-6 of the third set of two of the containers 10 and a last container 10-7 with horizontal container-to-connector frame-to-container connection on both adjacent sides. The middle container 10-9 defines the space for the den 23. As such, the second level has approximately 569 $ft^2$ of enclosed air-conditioned space and 224 $ft^2$ of covered enclosure.

Figure 8:
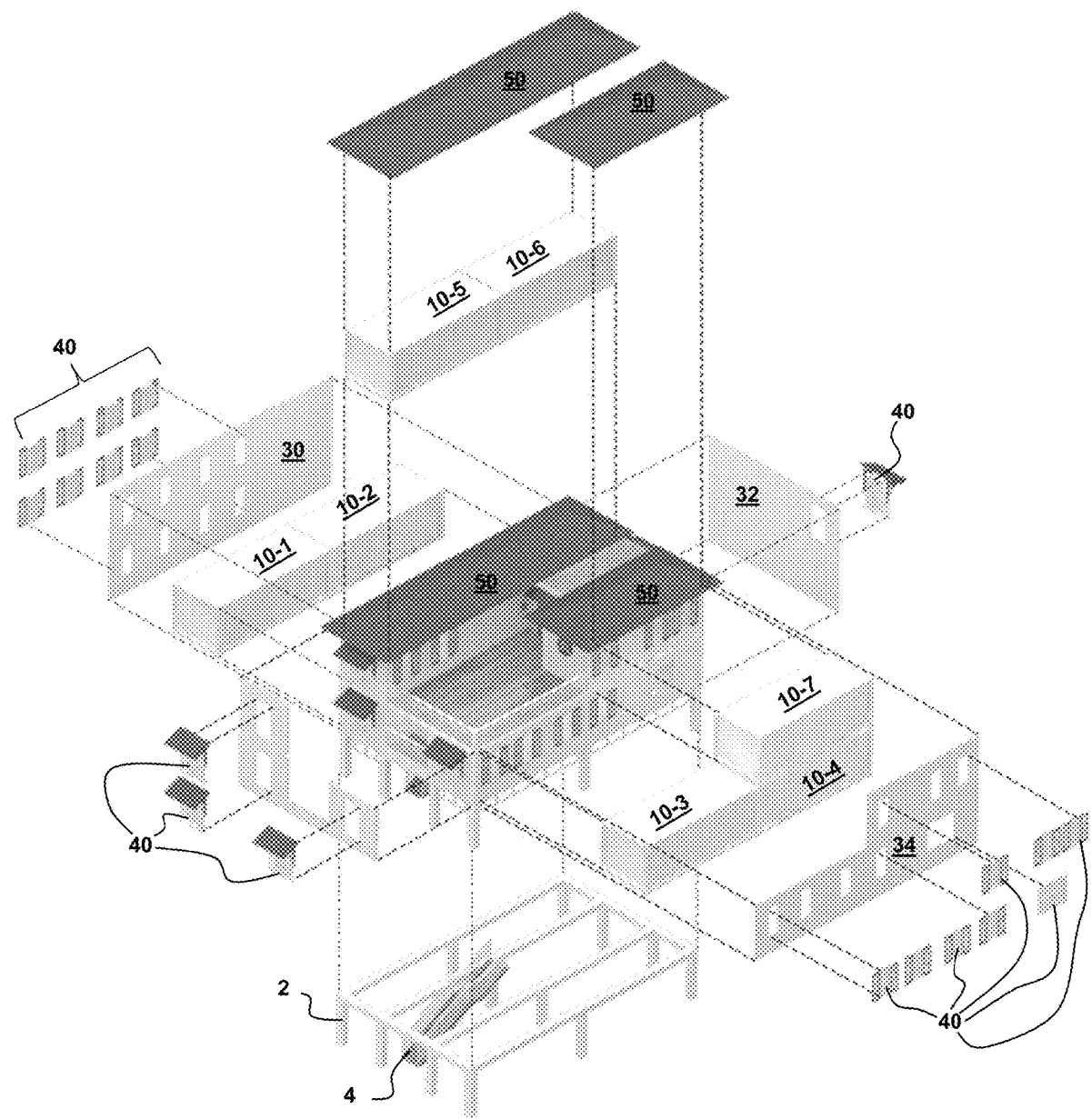
FIG. 8 is an exploded, perspective view of the multi-container structure of FIG. 4 above the front right corner with architectural elements including windows, shutters, doors, flooring, roof, siding, and stairs.

The exploded view of FIG. 8 illustrates the additional components that are added to the containers 10 to form the complete housing structure 1. Exterior wall façades or sidings 30, 32, 34 are shaped to fit the exterior walls of the containers to which they are respectively attached and each define openings at respective locations for exterior windows and doors. Attached to the opening in the façades or sidings 30, 32, 34 are window casements 40 that can provide the entire window assembly including exterior components or that can provide only the exterior components, the window being installed separately in the respective openings defined by the containers 10. Roof segments or modules 50 are placed on top of each container 10 where desired. Additionally, between adjacent containers 10-6, 10-7, for example, there is a middle container 10-9 and a flat roof or overhang 52 is present to provide shade or a watertight ceiling for a room between containers 10. In this exemplary embodiment, the middle container 10-9 and a roof segment/module create the enclosure of the den 23.

Figure 9:
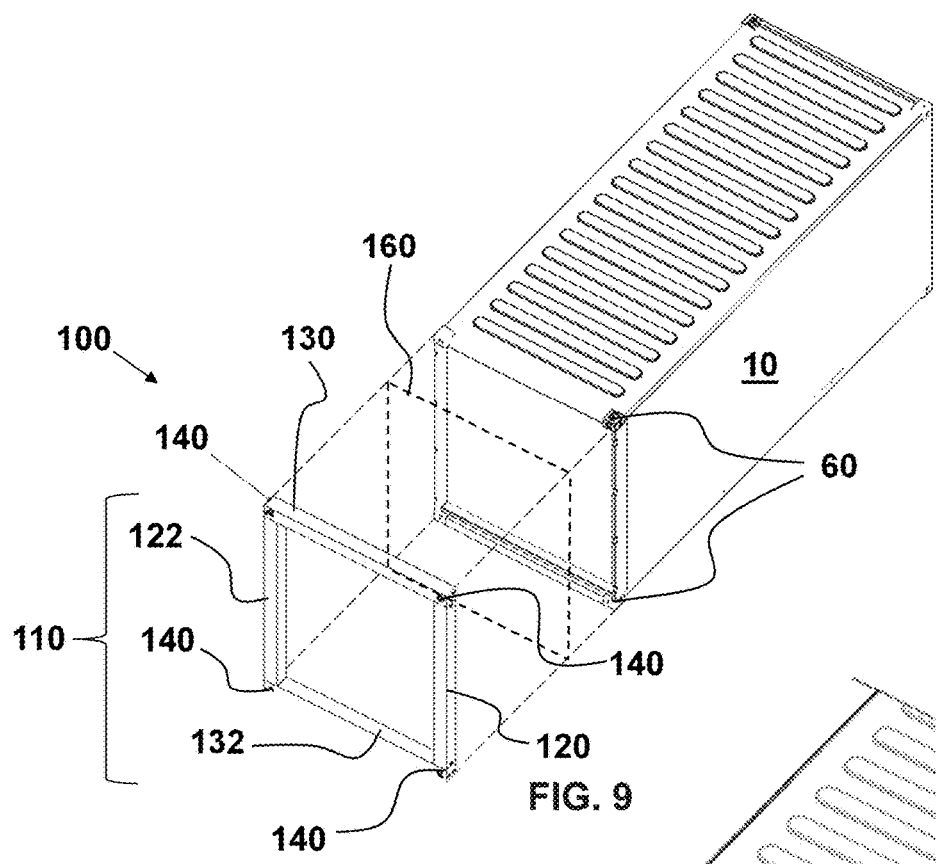
FIG. 9 is a perspective view of a diagrammatic representation of an exemplary embodiment of a container-to-connector frame-to-container connection for a modular, multi-container, living structure in a step before connection of a complete connector frame to a first shipping container's corner fittings.

In an exemplary process for creating a horizontal container-to-connector frame-to-container connection 100, reference is made to FIGS. 9 to 15. A container-to-connector frame-to-container connection 100 comprises a vertical connector frame 110 having two vertical struts (a left strut 122 and a right strut 120), two horizontal struts (an upper strut 130 and a lower strut 132), and four corner interlock assemblies 140, the latter of which will be explained in greater detail below. In a first exemplary embodiment of the container-to-connector frame-to-container connection 100, the four struts 120, 122, 130, 132 and the corner interlock assemblies 140 are connected together in an assembled, vertical connector frame 110, as shown in FIG. 9. The vertical connector frame 110 is, in one movement, placed against an end/side of the container 10 (in the case of FIG. 9, an open end) and the corner interlock assemblies 140 of the four corners of the vertical connector frame 110 are locked respectively to each corner fitting 60 of the container 10. To ensure a water-tight seal between the vertical connector frame 110 and edges of the container 10, a seal 160 is placed therebetween (shown with dashed lines). In an exemplary embodiment, the seal 160 is a continuous circuit having a shape corresponding to the shape of the connector frame 110 and the edges of the container 10. Thus, the seal 160 in FIG. 9, is substantially square/rectangular in shape (it is rectangular if a longitudinal length of the horizontal struts 130, 132 is different from the longitudinal length of the vertical struts 120, 122).

Figure 10:
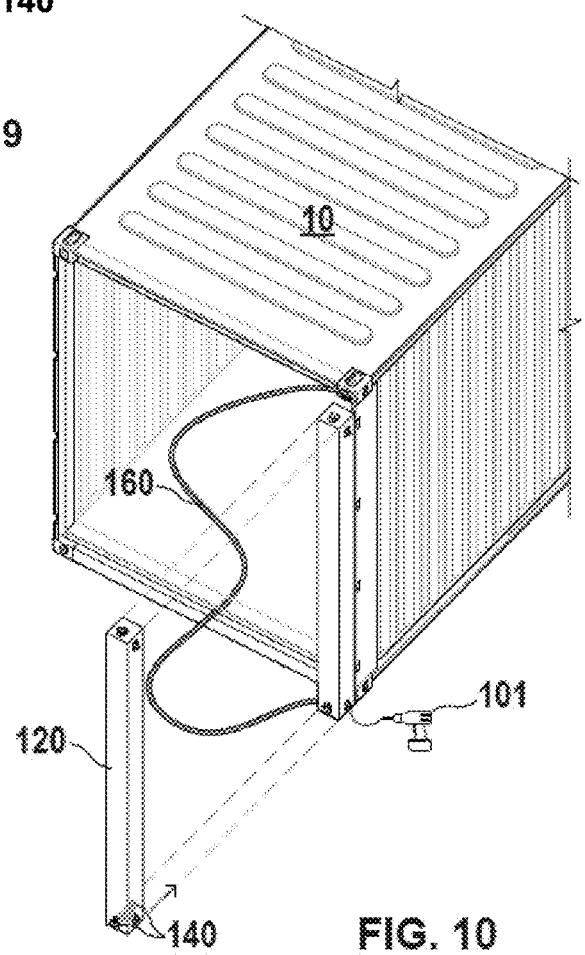
FIG. 10 is a perspective view of the container-to-connector frame-to-container connection of FIG. 9 in a modular, multi-container, living structure in steps both before and after connection of the connector frame's right vertical strut to the first shipping container's corresponding corner fittings with a water-tight seal therebetween.
Figure 11:
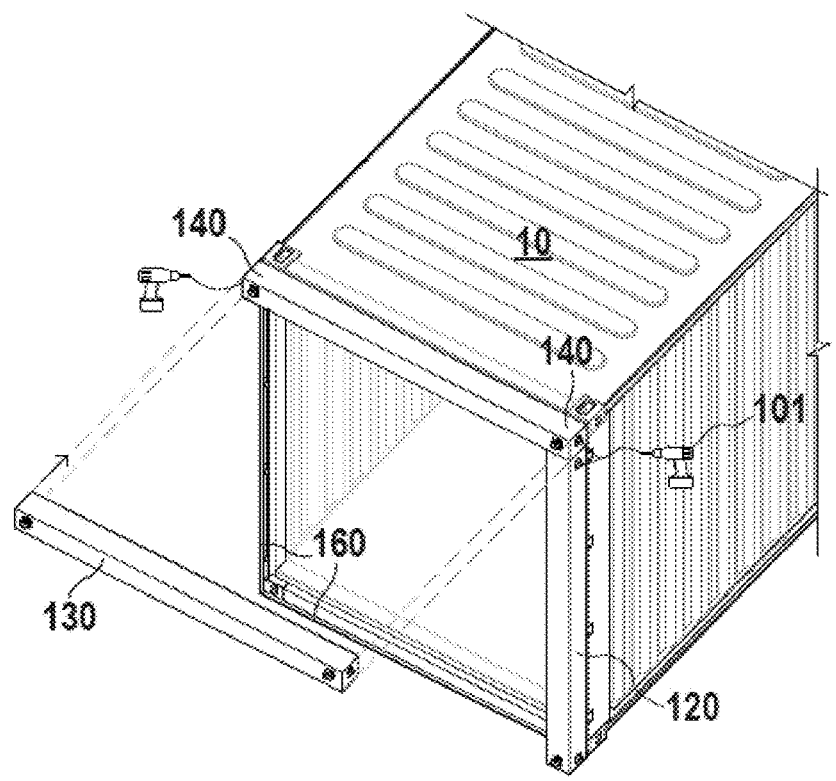
FIG. 11 is a perspective view of the container-to-connector frame-to-container connection of FIG. 10 in a piece-by-piece assembly method after connection of the first vertical strut of FIG. 11 and in steps before and after an upper horizontal strut of the connector frame is connected to the corresponding upper corner fittings of the first shipping container with the seal therebetween.
Figure 12:
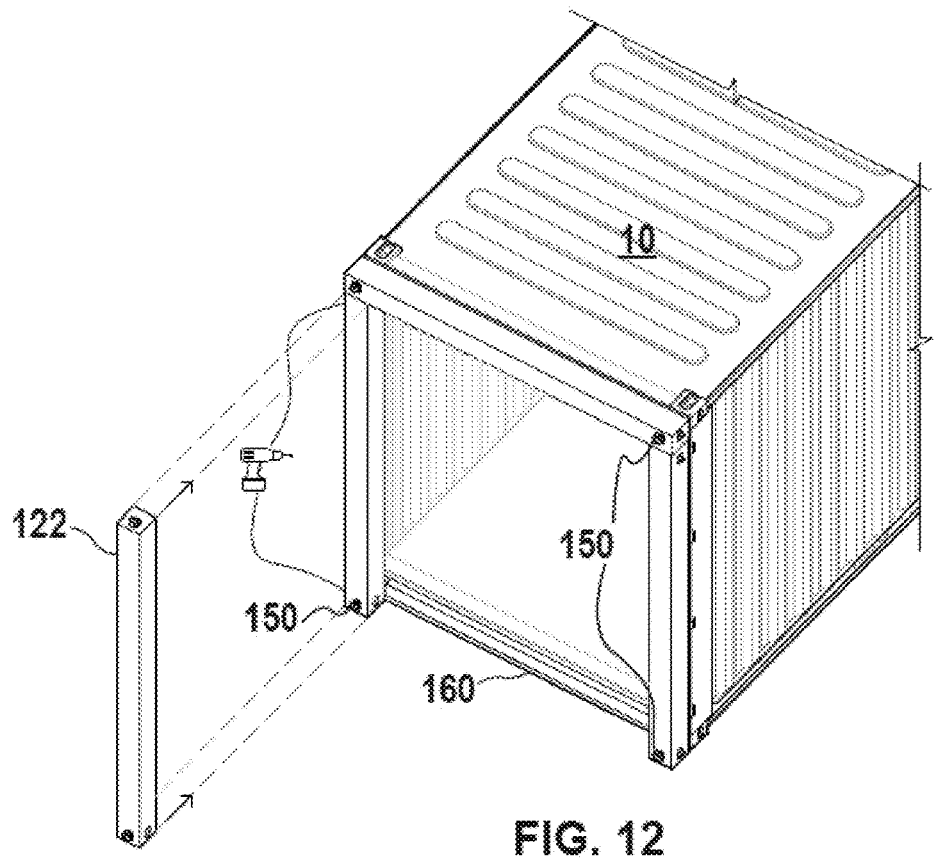
FIG. 12 is a perspective view of the container-to-connector frame-to-container connection of FIG. 11 in a step after connection of the right vertical strut and the upper horizontal strut of the connector frame, and in steps before and after the left vertical strut of the connector frame is connected to the corresponding lower left shipping container's corner fitting and to the upper left corner interlock assembly of the connector frame.
Figure 13:
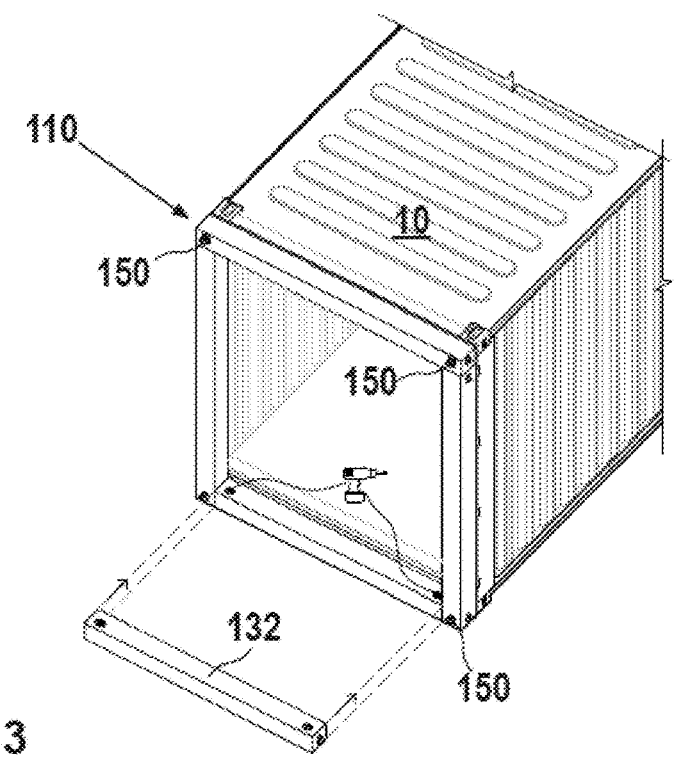
FIG. 13 is a perspective view of the container-to-connector frame-to-container connection of FIG. 12 in steps after connection of the right and left vertical struts and the upper horizontal strut of the connector frame to the first shipping container's corner fittings, and before and after connection of a lower horizontal strut of the connector frame.

In an alternative configuration, four pieces of the connector frame 110 are attached one at a time to respective edges of the container 10. This configuration is depicted in the progression of FIGS. 10 to 13. In FIG. 10, the right vertical strut 120 is connected to the right edge of the container 10 with corner interlock assembly 140 at the lower right corner. A right side of the circumferential seal 160 is placed therebetween (the seal 160 is shown in a partially collapsed configuration in FIG. 10). The seal can be a rectangle/square that is the same shape as the container 10 end/side and, therefore, as the remaining three struts 122, 130, 132 are connected to the corners 60 of the shipping container 10 (with respective corner interlock assemblies 140), the seal 160 is allowed to rest between each strut and the adjacent edge of the shipping container 10. An exemplary material of the seal 160 is rubber. The first removable connection occurs by actuating the corner interlock assembly 140, for example, with an actuator of a handheld power tool, such as a bit of a cordless drill. Rotation of a lock in the corner interlock assembly 140 secures the corner interlock assembly 140 to a first of the four end corner fittings 60 of the container 10. A second part, the upper horizontal strut 130 and another of the corner interlock assemblies 140 (upper right and upper left) are connected in a similar way, as shown in FIG. 11. Both upper conner fittings are connected to the two upper corner interlock assembly 140 connections of the upper horizontal strut 130 (part of the vertical connector frame) as shown on FIG. 11. Also, the connector frame struts connect or interlock with one another. In this case, the upper horizontal strut 130 connects to both upper corner fittings of the container and also locks into place with the right vertical strut on the upper right corner interlock assembly 140 connections. FIG. 11 also shows placement of the waterproofing sealant/rubber seal 160 that protects and prevents the container-to-connector frame-to-container connections from water/moisture infiltration. Continuing the process, shown in FIG. 12, a third part of the connector frame 110, the left vertical strut 122, is connected to the container 10 lower left corner fitting and to the second part, upper horizontal strut, through the corner interlock assemblies 140 (left vertical strut's upper and lower interlock assemblies. It is noted that the left vertical strut has two interlocks (placed on the upper and lower locations of the strut). One of these interlock assemblies connects to the upper horizontal strut and the other interlock assembly connects to the lower left corner fitting of a first shipping container. With the seal 160 now between the first, second, and third parts of the vertical connector frame 110, the lower extent of the seal 160 is the only one visible in FIG. 12. In FIG. 12, interlocks 150 at the upper right, the lower right, and the lower left are illustrated. These interlocks 150 are used to connect the vertical connector frame 110 to a second container (not illustrated) to the opposite side of the vertical connector frame 110 so that the second container can be secured to the first container 10. Finally, as shown in FIG. 13, the fourth part of the vertical connector frame 110, the lower horizontal strut 132, along with the corner interlock assemblies 140 (lower left and lower right), is connected, with the last part of the circumferential seal 160 between all four of the parts of the vertical connector frame 110.

Once the connector frame 10 is completely attached to a first shipping container 10, it is then ready to secure (e.g., in a water-tight manner with a second seal 160) to a second shipping container at a side of the connector frame 10 opposite the adjacent shipping container 10. With locking of the interlocks 150 of the connector frame 10 to the second shipping container using a second seal 160, a water-tightly sealed connection between the two containers is established.

Figure 14:
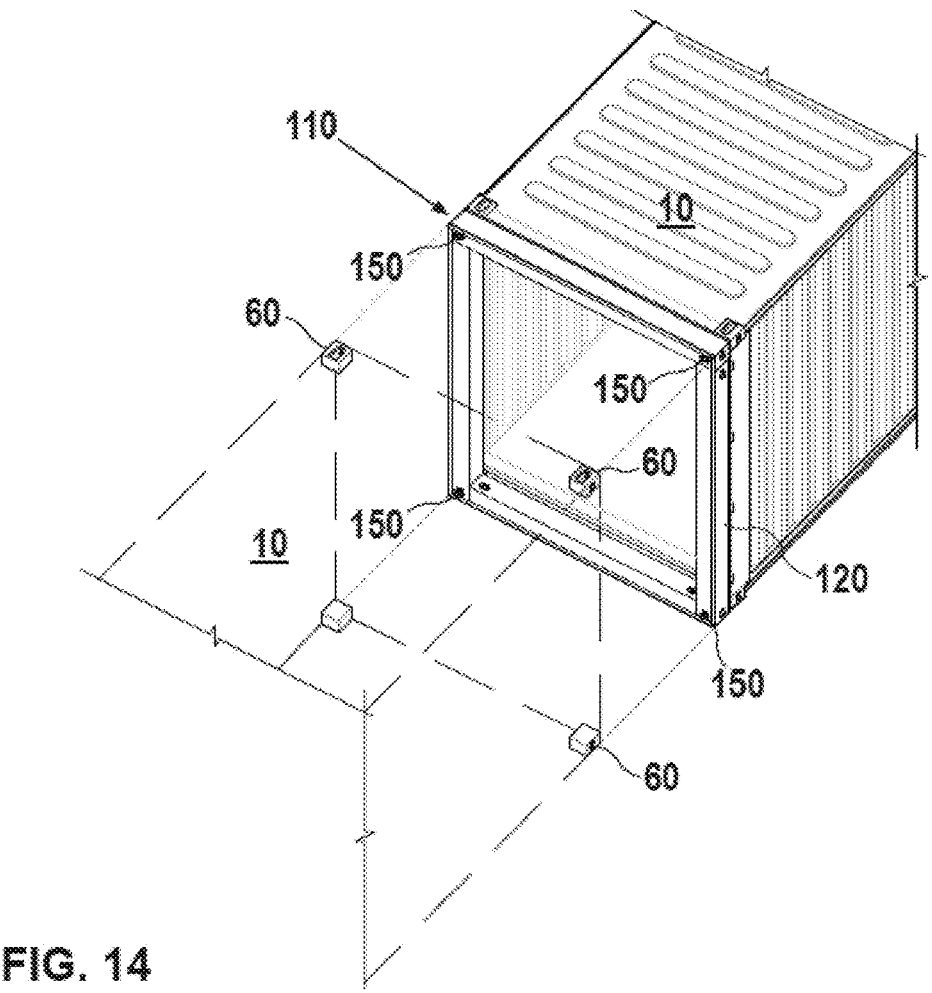
FIG. 14 is a perspective view of the container-to-connector frame-to-container connection of FIG. 13 in a step after connection of the complete connector frame to the first shipping container's corner fittings and before connection of the connector frame to corner fittings of a second, adjacent shipping container, shown in dashed lines, with a non-illustrated seal therebetween.
Figure 15:
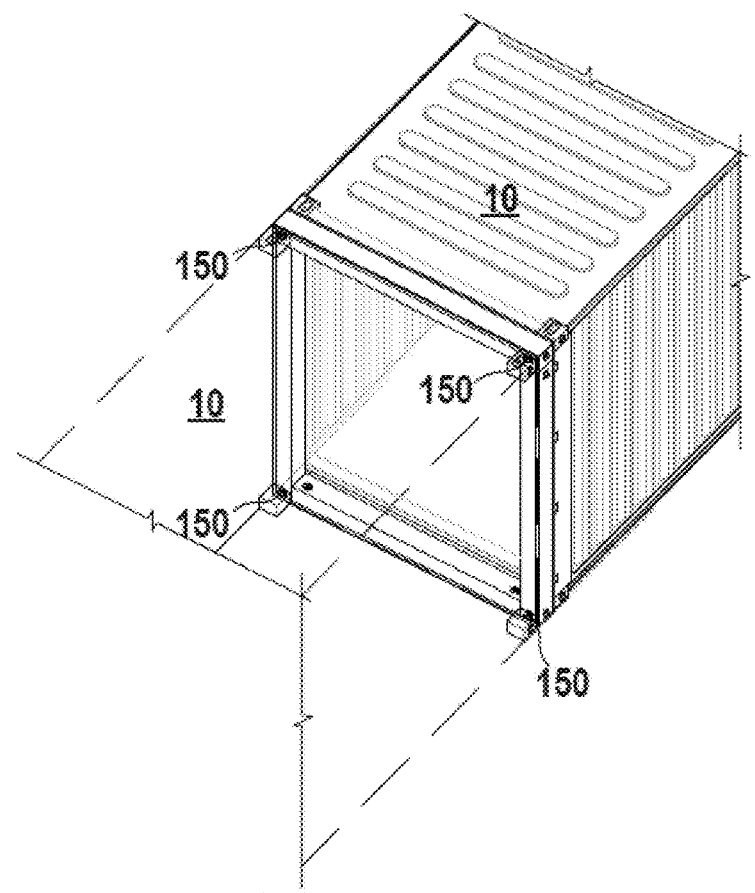
FIG. 15 is a perspective view of the container-to-connector frame-to-container connection of FIG. 14 in a step after the horizontal connection of the second shipping container to the connector frame with a non-illustrated sealant or caulking disposed therebetween.

FIGS. 14 and 15 show, with hidden lines, the container-to-connector frame-to-container connection 100 of FIG. 13 in steps after connection of the complete connector frame to the first shipping container's 10 corner fittings 60 and, in addition to, before and after connection of the connector frame 110 to corner fittings 60 of an adjacent shipping container 10 (shown in dashed lines). FIG. 14 shows the second container spaced away from the vertical connector frame 110 and FIG. 15 shows the corner fittings 60 of the second container 10 attached to the vertical connector frame 110. Placement of a water-proofing seal 160 on each connecting surface of the connector frame 110 to a container 10 protects and prevents the container-to-connector frame-to-container connection 10 from water/moisture infiltration.

The interlocks 150 of the corner interlock assemblies 140 allow the four struts 120, 122, 130, 132 to come together, interlocking with one another as a single system, referred to herein as the connector frame 110, while also allowing the connector frame 110 to interlock with the shipping container's corner fittings 60.

Figure 16:
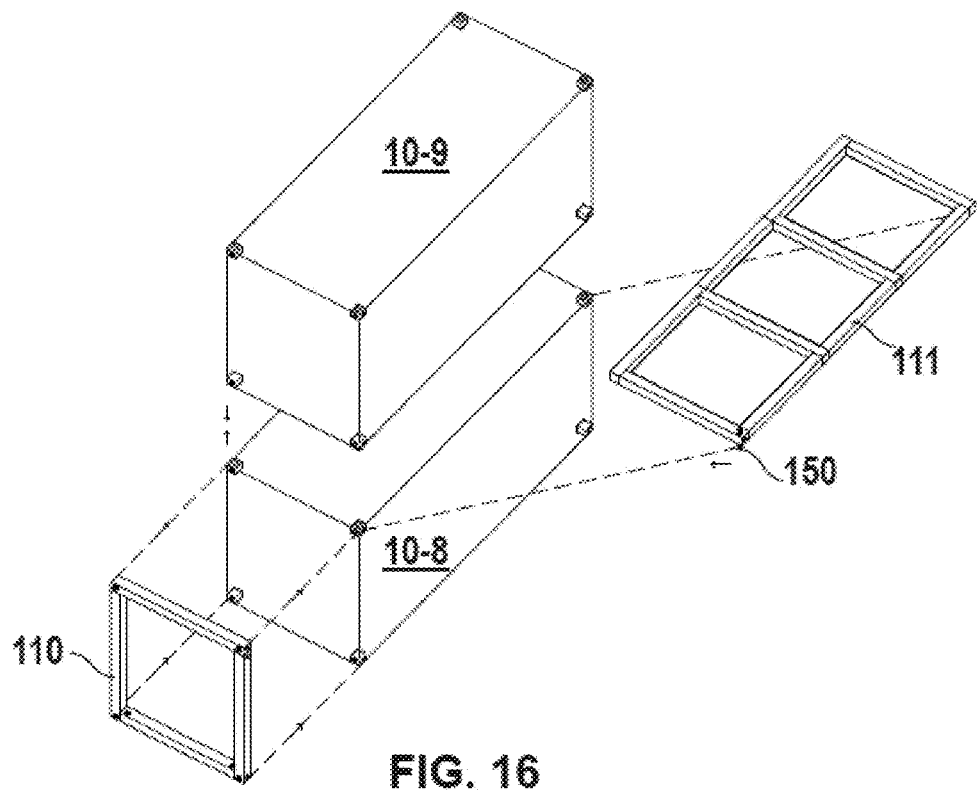
FIG. 16 is an exploded, perspective view of exemplary embodiments of container-to-connector frame-to-container connections in a modular, multi-container, living structure with two shipping containers one above the other, with a first, vertical connector frame shown in an exploded view away from a forward end of the lower-positioned shipping container, and with a second, horizontal connector frame between a bottom side of the upper shipping container and a top side of the lower shipping container.
Figure 17:
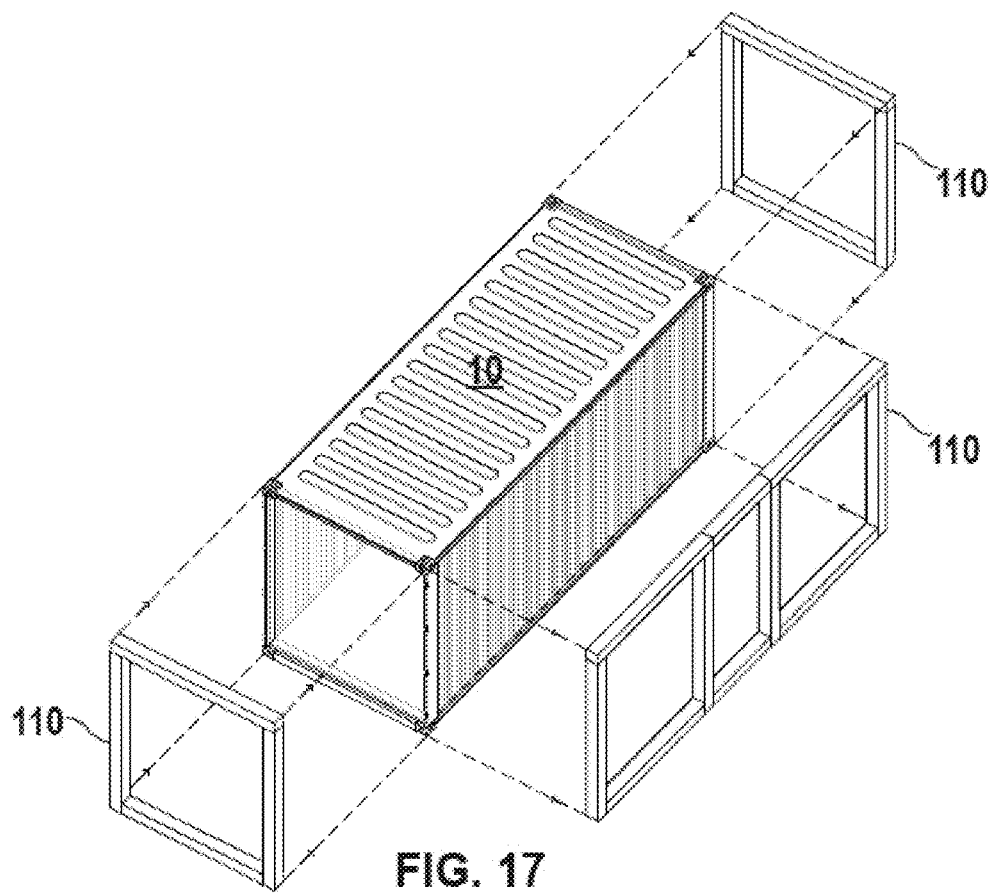
FIG. 17 is an exploded, perspective view of exemplary embodiments of container-to-connector frame-to-container connections in a modular, multi-container, living structure with a first, vertical connector frame shown away from a rear end frame of a shipping container, with a second, vertical connector frame shown away from a front end frame of the shipping container, and with a third, vertical, side connector frame shown away from a right side of the shipping container.

FIG. 16 shows one vertical connector frame 110 and one horizontal connector frame 111. The horizontal connector frame 111 is configured to connect a first container 10-8 to a second container 10-9 vertically, in this exemplary embodiment, the second container 10-9 is connected above the first container 10-8. In FIG. 17, there are three vertical connector frames 110, the one to the left in the figure being connected to a first open end of the container 10. Thus, the container 10 can be connected end-to-end to two different containers (not illustrated) at each of the container's 10 ends and to another different container (not illustrated) at one side of the container 10. In a desirable configuration, a sealant (such as caulking) or a seal 160 is disposed between each connecting surface.

Figure 18:
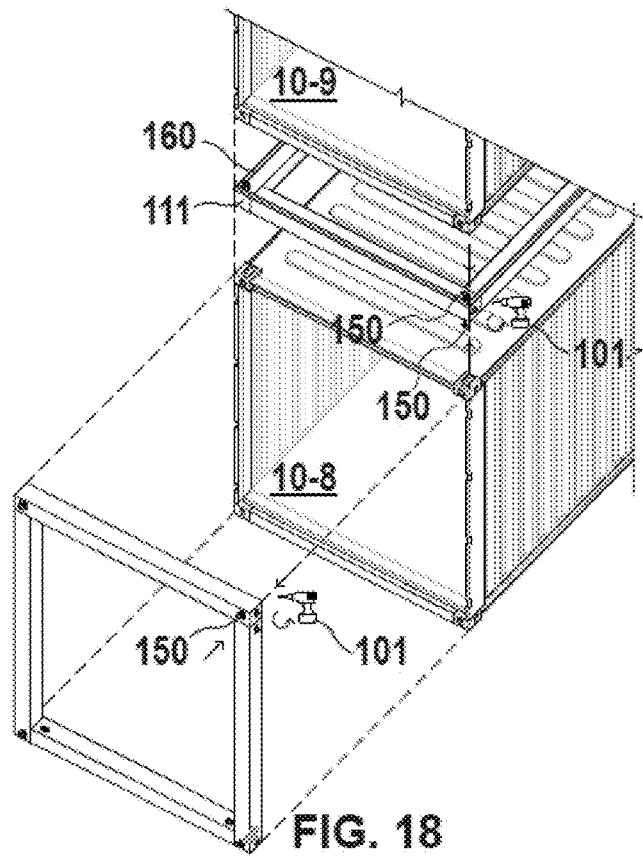
FIG. 18 is a fragmentary, exploded, perspective view of the exemplary embodiments of container-to-connector frame-to-container connections in a modular, multi-container, living structure with a first connector frame system shown horizontally placed away from a rear end frame of a lower shipping container and a second horizontal connector frame shown spaced from and between a bottom side of an upper shipping container and a top side of the lower shipping container and a waterproofing sealant on the top and bottom of the horizontal connector frame system.

As shown in FIGS. 16 and 18, by actuating the interlocks 150 of the horizontal connector frame 111, the second container 10-9 is tightened into place above the first container 10-8, thereby merging and interlocking the two shipping containers 10-8, 10-9 to one another. In an exemplary embodiment, additional caulking or sealant or a seal 160 can be applied around all of the edges to water-tightly seal all connections and protect the same from water/moisture infiltration.

Figure 22:
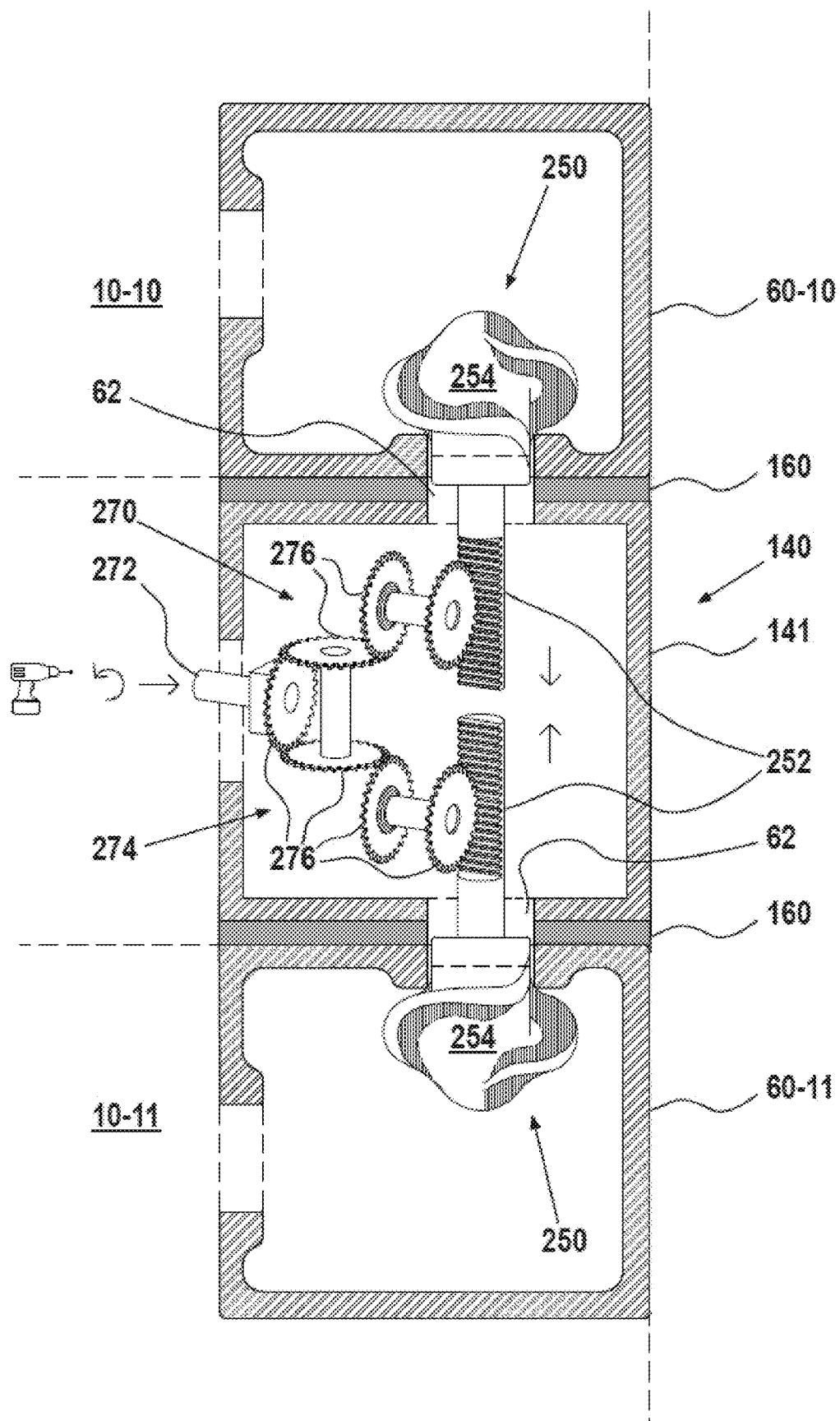
FIG. 22 is a fragmentary, longitudinally cross-sectional view of a further exemplary embodiment of a container-to-connector frame-to-container securing interlock in a locked state securing two adjacent shipping containers' corner fittings together to an intermediate connector frame.
Figure 23:
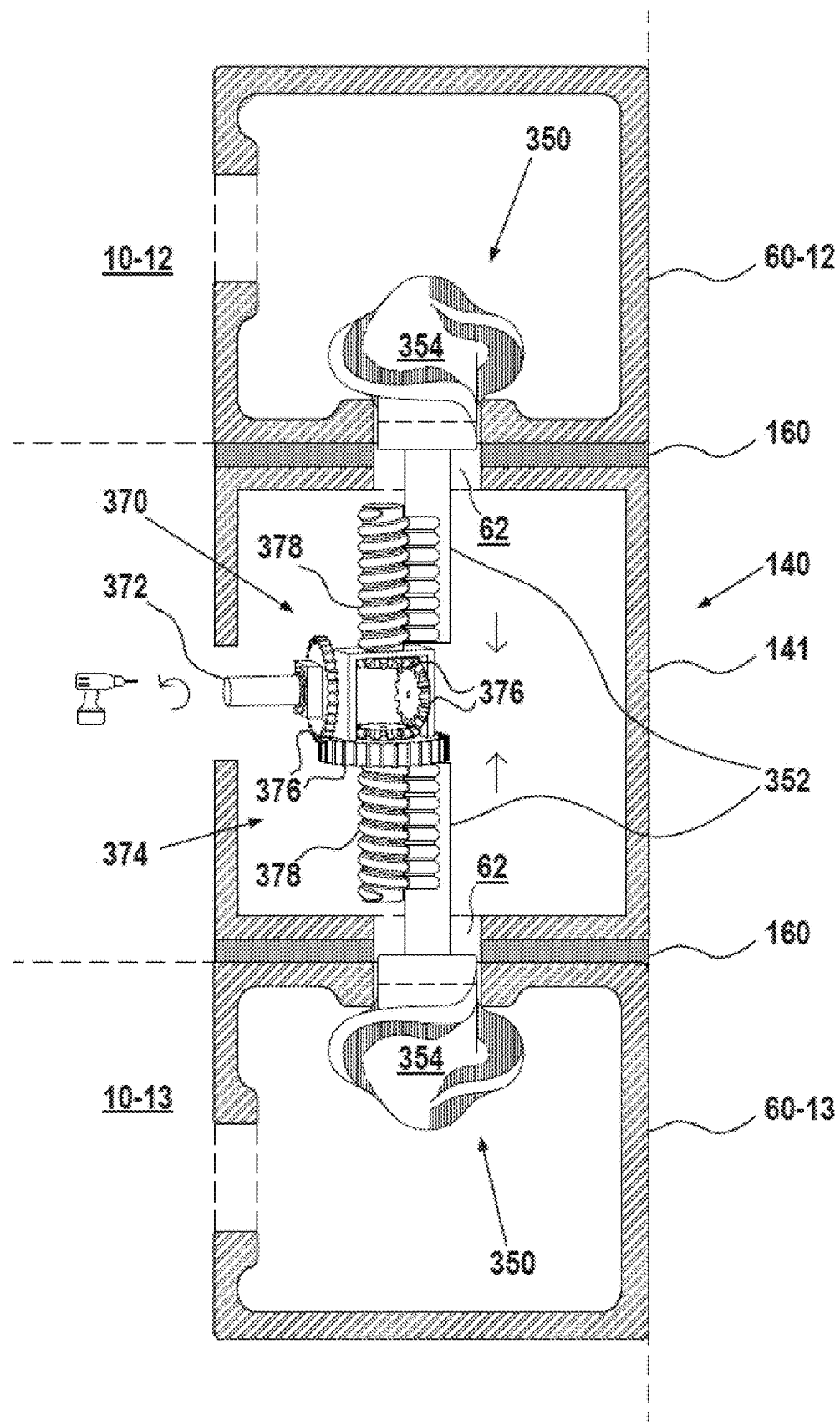
FIG. 23 is a fragmentary, longitudinally cross-sectional view of another exemplary embodiment of a container-to-connector frame-to-container securing interlock in a locked state securing two adjacent shipping containers' corner fittings together to an intermediate connector frame.

FIGS. 19 to 21 illustrate a first exemplary configuration of an interlock 150 of the corner interlock assembly 140. In this exemplary embodiment, the interlock 150 is a securing tab twistlock. The interlock 150 has a shaft 152 that is shaped to extend into a corner fitting 60 of a container 10. This interlock 150 has two parts at the distal end of the shaft 152. A first fixed lock part 154 is fixed to the shaft 152 and a conically shaped second lock part 156 is moveable and/or rotatable with respect to the shaft 152. The first and second lock parts 154, 156 have an exterior circumferential shape corresponding to an orifice 62 that exists at the corner fitting 60 of a container 10. These orifices 62 are standardized for the containers 10. Thus, when the two parts 154, 156 are aligned, they can extend into the orifice 62. However, when the rotatable second lock part 156 is moved out of alignment with respect to the first fixed part 154, the exterior shape of the two parts 154, 156 is expanded to prevent movement of the parts 154, 156 out from or into the orifice 62. Of course, the fixed and rotating/movable connection to the shaft 152 can be reversed on the first and second lock parts 154, 156 as desired. The exemplary embodiment of the first and second lock parts of FIGS. 21 to 23 illustrates this configuration. In FIG. 21, the first and second lock parts 154, 156 are orthogonal or at an angle to one another. In this orientation, the exterior projection of the circumference or periphery of the parts 154, 156 is larger than when the two parts 154, 156 are aligned. By rotating the second lock part 156 with respect to the first lock part 154 (see FIG. 22), the parts 154, 156 can provide a lock having an unlocked state (not illustrated) and a locked state, which is illustrated in FIGS. 19 and 21.

An exemplary configuration of an interlocking mechanism 170 that controls the interlocks 150 on opposite sides of the corner interlock assembly 140 is shown in FIG. 21. The shaft 152 and the two lock parts 154, 156 are on opposing sides of the corner interlock assembly 140; a body 141 of the corner interlock assembly 140 is illustrated diagrammatically with dashed lines. The interlocking mechanism 170 includes an interlock driveshaft 172, a gearbox 174 with ring and gears 176, and a lock control shaft (worm drive) 178—the worm drive 178 and the shaft 152 form a worm-rack drive. In the exemplary embodiment, the interlock driveshaft 172 is shaped to fit a standard, handheld power tool 101, such as a drill. Rotation of the interlock driveshaft 172 rotates the gears 176 of the gearbox 174, thereby rotating the opposing lock control shafts 178. With rotation of the lock control shafts 178 and opposite horizontal movements of the shafts 152, for example, in the form of a worm rack, the rotatable second lock part 156 can be moved out of alignment after the parts 154, 156 are inserted into the orifices 62 of the corner fitting 60 to lock the parts 154, 156 within the corner fitting 60, thereby removably fastening a portion of the connector frame 110, 111 to a container 10.

Another exemplary configuration of an interlock mechanism 270 that controls a further exemplary embodiment of a lock part or twist lock 254 of a corner interlock assembly 140 is illustrated in FIG. 22. The interlocks 250 are on opposite sides of the corner interlock assembly 140 and are configured to lock two opposing containers 10-10, 10-11 (indicated with dashed lines) to one another at the adjacent pair of corner fittings 60-10, 60-11. In the exemplary embodiments described herein, the lock parts 254 are on opposing sides. Thus, a respective pair of a shaft 252 and a lock part 254 are on opposing sides of the corner interlock assembly 140. Alternatively or additionally in any of the herein-mentioned embodiments, the lock parts 254 can be at angles to one another, for example, there can be two lock parts at 90-degrees from one another, three lock parts at 0, 90, and 180-degrees about the corner interlock assembly 140, and four lock parts at 0, 90, 180, and 270-degrees on each of four sides of the corner interlock assembly 140, and so on. The body 141 of the corner interlock assembly 140 surrounds an interlock driveshaft 272 and a gearbox 274 with rings, pinions, and gears 276. As compared to the configuration of FIG. 21, there is no lock control shaft 178 because the rings, pinions, and gears 276 directly interact with the shaft (rack) 252 in a pinion gear rack drive way. In this embodiment, the interlock driveshaft 272 is shaped to fit the standard power tool 101, such as a drill. Rotation of the interlock driveshaft 272 rotates the gears 276 of the gearbox 274, thereby moving the opposing shafts 252. The lock part 254 here has an outer screw shape or securing tab/twist-lock cone shape with helical spiral fins that increases in diameter and is shown in greater detail in FIGS. 24 to 28, for example. Thus, with movement of the shafts 252, each lock part 254 not only extends towards or away from the orifices 62 of the corner fitting 60, they also screw into and through the orifices 62 such that, when the trailing edge of each lock part 254 passes the distal perimeter of each respective orifice 62, a further rotation places that trailing edge on the interior wall adjacent the respective orifice 62, which is shown in FIGS. 22, 23, 24, 25, and 28. This rotated orientation effectively locks the corner fitting 60-10, 60-11 to the corner interlock assembly 140, thereby preventing movement of the two containers 10-10, 10-11 with respect to the corner interlock assembly 140. Also shown in FIG. 22 is a seal 160 disposed between each container 10-10, 10-11 and the corner interlock assembly 140. This seal 160 is made of a material that allows the sandwich joint to be water-tight.

Another exemplary configuration of an interlock mechanism 370 that controls the lock part 354 of a corner interlock assembly 140 is illustrated in FIG. 23. In the exemplary embodiment, the interlocks 350 are on opposite sides of the corner interlock assembly 140 and are configured to lock two opposing containers 10-12, 10-13 (indicated with dashed lines) to one another at the adjacent pair of corner fittings 60-12, 60-13. Thus, a respective pair of the shaft 352 and the lock part 354 are on opposing sides of the corner interlock assembly 140. The body 141 of the corner interlock assembly 140 surrounds an interlock driveshaft 372, a gearbox 374 with rings and gears 376, and lock control shafts 378. The interlock driveshaft 372 is shaped to fit the standard power tool 101, such as a drill. In this embodiment, rotation of the interlock driveshaft 372 rotates the gears 376 of the gearbox 374, thereby rotating the opposing lock control shafts 378. With rotation of the lock control shafts 378, for example, in the form of a worm rack, the lock control shaft 378 is rotated to move the shaft 352 into and out from each respective orifice 62. The lock part 354 has an outer screw shape or securing tab/twist-lock cone shape with helical spiral fins that increases in diameter and is shown in greater detail in FIGS. 24 to 28, for example. Thus, with rotation of the lock control shafts 378, each lock part 354 moves into and through the orifices 62 such that, when the trailing edge of each lock part 354 passes the distal perimeter of each respective orifice 62, rotation of the lock part 354 places that trailing edge on the interior wall adjacent the respective orifice 62, as shown in FIGS. 23, 24, 25, and 28. This rotated orientation effectively locks the corner fitting 60-12, 60-13 to the corner interlock assembly 140, thereby preventing movement of the two containers 10-12, 10-13 with respect to the corner interlock assembly 140. Also shown in FIGS. 23 and 24 is a seal 160 disposed between each container 10-12, 10-13 and the corner interlock assembly 140. This seal 160 is made of a material that allows the sandwich joint to be water-tight.

As indicated above, in both versions, FIGS. 23 and 22, the shafts 352/252 have the same rack configurations; however, in these two figures the gearbox mechanism is different—in FIG. 23 a lock control shaft/worm 378 is included, while in FIG. 22 it does not. A worm-rack drive such as the configuration shown in FIGS. 21 and 23 only can extend the shaft 152, 352 into and out from the orifice 62. To rotate the lock part 254/354 or one of the lock parts 154, 156, another control is provided. More specifically, the lock part 254/354 is fixed to a rotatable rod 356, which is housed inside the lumen of the hollow shaft 352. In one exemplary configuration, the rod 356 is spring loaded with a bias device 358 to allow it to spring outwards (and through the orifice 62) and, with an appropriate cam and follower that is not illustrated, can rotate 90 degrees to place the locking surfaces against the inner adjacent wall of the corner fitting 60. It is this rotated orientation that locks the corner fitting 60 to the corner interlock assembly 140.

Another exemplary configuration of an interlock mechanism 470 that controls the lock part of a corner interlock assembly 140 is illustrated in FIG. 29. The interlock mechanisms herein fit within the corners of the connector frame. In the exemplary embodiment, the non-illustrated interlocks are on opposite sides of the corner interlock assembly 140 and are configured to lock two opposing containers to one another at the adjacent pair of corner fittings. Thus, a respective pair of the shaft 452 and the lock part are on opposing sides of the corner interlock assembly 140. The corner interlock assembly 140 surrounds an interlock driveshaft 472 and gears 476. The interlock driveshaft 472 is shaped to fit the standard power tool 101, such as a drill. In this embodiment, rotation of the interlock driveshaft 472 rotates the gears 476, thereby moving the opposing shafts 452 in the form of a rack and pinion. With rotation of the gears 476, the shafts 452 move into and out from each respective orifice 62.

Another exemplary configuration of an interlock mechanism 570 that controls the lock part of a corner interlock assembly 140 is illustrated in FIG. 30. In the exemplary embodiment, the non-illustrated interlocks are on opposite sides of the corner interlock assembly 140 and are configured to lock two opposing containers to one another at the adjacent pair of corner fittings. Thus, a respective pair of the shaft 552 and the lock part are on opposing sides of the corner interlock assembly 140. The corner interlock assembly 140 surrounds an interlock driveshaft 572 and gears 576. The interlock driveshaft 572 is shaped to fit the standard power tool 101, such as a drill. In this embodiment, rotation of the interlock driveshaft 572 rotates the gears 576, thereby moving and/or rotating the opposing lock control shafts 578 and moving the shafts 552 in the form of a worm rack drive.

With rotation of the gears 576, the shafts 552 move into and out from each respective orifice 62.

Figure 31:
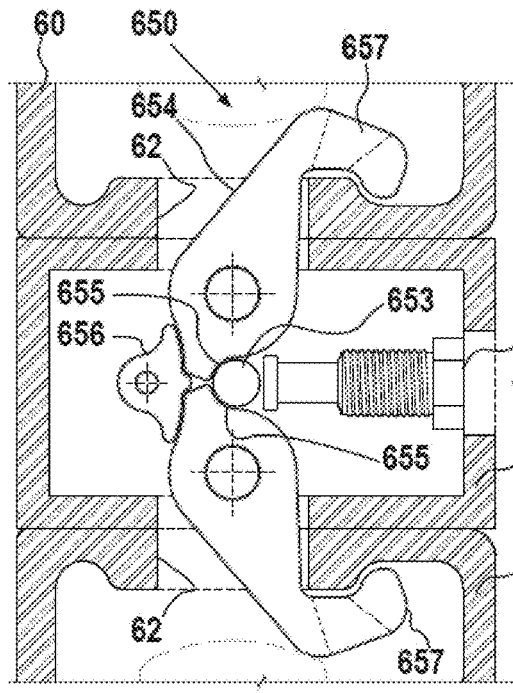
FIG. 31 is a fragmentary, cross-sectional view of another exemplary embodiment of a container-to-connector frame-to-container securing interlock in a locked state securing two adjacent shipping containers' corner fittings together.

FIG. 31 illustrates an exemplary configuration of another exemplary embodiment of a corner interlock assembly 140 with an interlock 650. In this exemplary embodiment, the interlock 650 is a pivoting cam lock. The interlock 650 has a rotating driveshaft 652 that is shaped to extend into and retract out from the body 141 of the corner interlock assembly 140 when rotated, such as a bolt with a thread, herein, any of the gears or thread(s) can be referred to as a lock rotation portion or a lock extension portion. The driveshaft 652 is fixed with respect to the body 141 of the corner interlock assembly 140 but rotatable about its longitudinal axis to move along that axis. A proximal end of the driveshaft 652 has a tool connector shaped to fit a standard power tool 101, such as a drill. This connector can be a Philips or flat head internal connector or the connector can be an external nut connector having a polygonal shape, such as a hexagon, a star, or a square to name a few. The interlock 650 has a first cam part 653 operatively connected to the distal end of the driveshaft 652 and a second cam part 656 that is fixed with respect to the body 141 of the corner interlock assembly 140. Pivotally connected to the body 141 are a pair of opposing lock parts 654, having a shape that is a mirror image of one another and disposed on opposing sides of the first and second cam parts 653, 656. The lock parts 654 each pivot about pivot axes that are fixed with respect to the body 141 of the corner interlock assembly 140 and each lock part 654 extends orthogonally with respect to the longitudinal extent of the driveshaft 652 to position a lock hook 657 at the distal end of the lock part 654 into respective opposing orifices 62 of the corner fitting 60 of adjacent containers 10. When the driveshaft 652 is rotated in an inward direction, the distal end of the driveshaft 652 moves the first cam part 653 against cam surfaces 655 of the lock parts 654 to pivot each of the lock parts 654 about their rotation axis guided and supported by surfaces of the second cam part 656. In a retracted position of the driveshaft 652, the lock hook 657 is within the orifice 62 but does not bend out of the opposing sides of the orifice 62. In an extended position of the driveshaft 652, which is shown in FIG. 31, the lock hook 657 is not only extended within the orifice 62 but is in a rotated position to place a hook surface of the lock hooks 657 against a near wall of the corner fitting 60 adjacent orifice 62. In this locked orientation, the two opposing lock hooks 657 removably secure the corner interlock assembly 140 to the corner fittings 60 to prevent movement of the containers 10 with respect to the connector frame 110, 111, of which the corner fitting 60 is a part.

Figure 32:
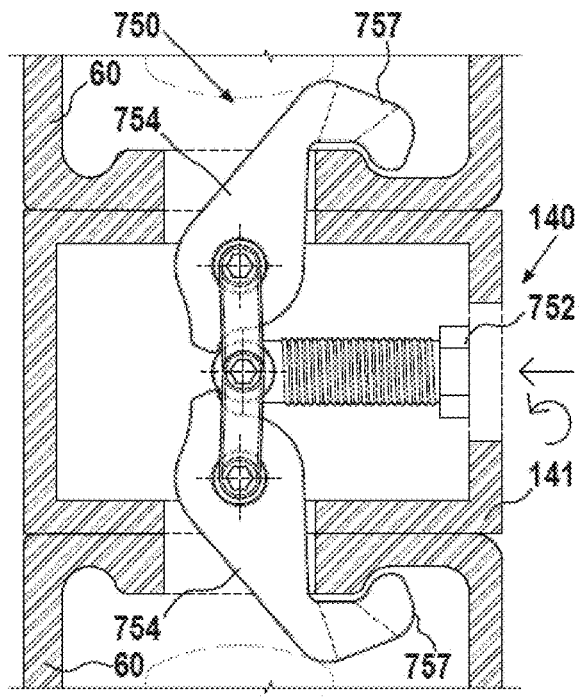
FIG. 32 is a fragmentary, cross-sectional view of a further exemplary embodiment of a container-to-connector frame-to-container securing interlock in a locked state securing two adjacent shipping containers' corner fittings together.
Figure 33:
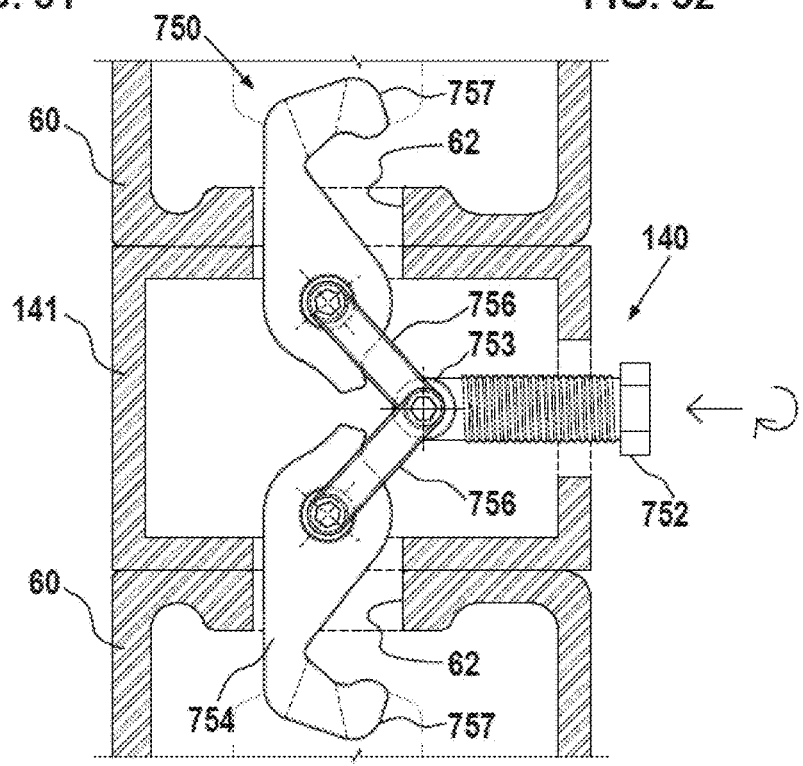
FIG. 33 is a fragmentary, cross-sectional view of the container-to-connector frame-to-container securing interlock of FIG. 32 in an unlocked state.

FIGS. 32 and 33 illustrate an exemplary configuration of another exemplary embodiment of a corner interlock assembly 140 with an interlock 750. In this exemplary embodiment, the interlock 750 is a pivoting cam lock. The interlock 750 has a rotating driveshaft 752 that is shaped to extend into and retract out from the body 141 of the corner interlock assembly 140 when rotated, such as a bolt with a thread. The driveshaft 752 is fixed with respect to the body 141 of the corner interlock assembly 140 (not illustrated) but is rotatable about its longitudinal axis to move along that axis. A proximal end of the driveshaft 752 has a tool connector shaped to fit a standard power tool 101, such as a drill. This connector can be a Philips or flat head internal connector or the connector can be an external nut connector having a polygonal shape, such as a hexagon, a star, or a square to name a few. The interlock 750 has a pivot bearing 753 operatively connected to the distal end of the driveshaft 752. The pivot bearing 753 is pivotally connected to proximal ends of two force struts 756. Pivotally connected to the body 141 are a pair of opposing lock parts 754, having a shape that is a mirror image of one another. The lock parts 754 each pivot about the pivot points, which are fixed with respect to the body 141 of the corner interlock assembly 140, and each lock part 754 extends orthogonally with respect to the longitudinal extent of the driveshaft 752 to position a lock hook 757 at the distal end of the lock part 754 into respective opposing orifices 62 of the corner fitting 60 of adjacent containers 10. When the driveshaft 752 is rotated in an inward direction, the distal end of the driveshaft 752 moves the pivot bearing 753 inwards with respect to the body 141. Thus, the force struts 756 are moved inwards, thereby rotating each of the lock parts 754 about their rotation axis. In a retracted position of the driveshaft 752 shown in FIG. 33, the lock hook 757 is within the orifice 62 but does not extend past planes defined by the opposing sides of the orifice 62. In an extended position of the driveshaft 752, with the driveshaft 752 moved inwards into the body 141, the lock parts 754 rotate to start placing inner surfaces of the lock hook 757 against an inner surface of the corner fitting 60, in an intermediate position. With further rotation of the driveshaft 752, the force struts 756 are moved further into the body 141 to pivot the lock parts 754 further against the inner wall of the corner fitting 60 into a locked orientation, shown in FIG. 32. In the locked orientation, the two opposing lock hooks 757 removably secure the corner interlock assembly 140 to the corner fittings 60 to prevent movement of the containers 10 with respect to the connector frame 110, 111, of which the corner fitting 60 is a part.

Figure 34:
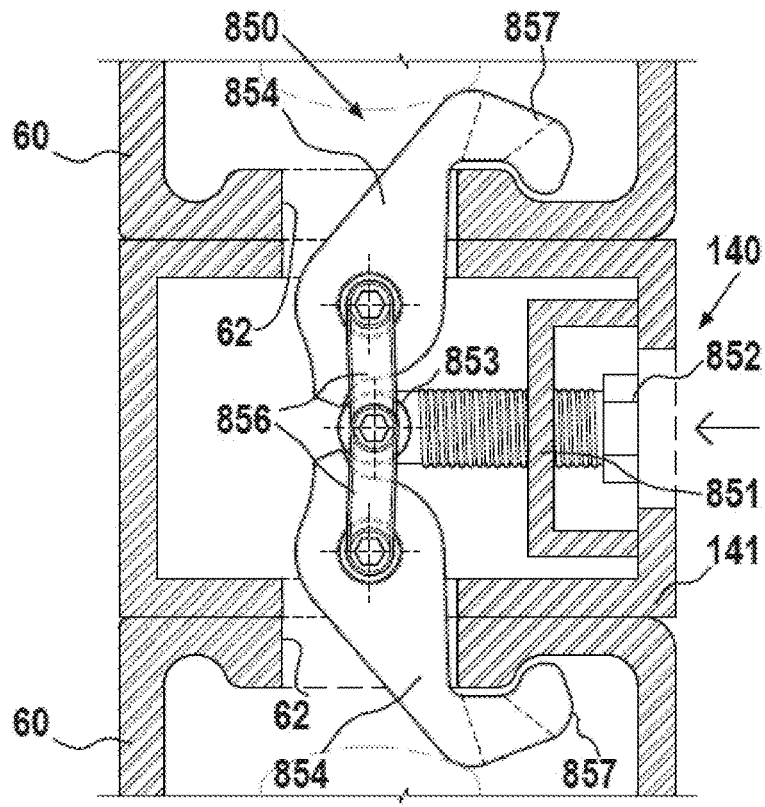
FIG. 34 is a fragmentary, cross-sectional view of a further exemplary embodiment of a container-to-connector frame-to-container securing interlock in a locked state securing two adjacent shipping containers' corner fittings together.
Figure 35:
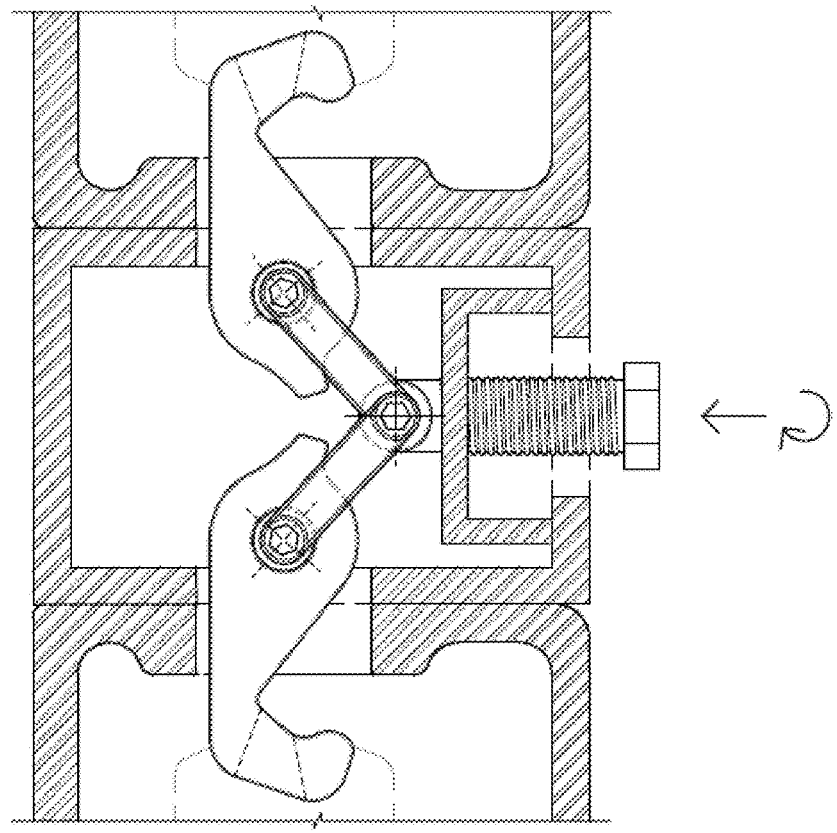
FIG. 35 is a fragmentary, cross-sectional view of the container-to-connector frame-to-container securing interlock of FIG. 34 in an unlocked state.

FIGS. 34 and 35 illustrate an exemplary configuration of another exemplary embodiment of a corner interlock assembly 140 with an interlock 850. In this exemplary embodiment, the interlock 850 is a pivoting cam lock. The interlock 850 has a rotating driveshaft 852 that is shaped to extend into and retract out from the body 141 of the corner interlock assembly 140 when rotated, such as a bolt with a thread. The driveshaft 852 is fixed with respect to the body 141 of the corner interlock assembly 140 with a frame 851 and is rotatable about its longitudinal axis to move along that axis. A proximal end of the driveshaft 852 has a tool connector shaped to fit a standard power tool 101, such as a drill. This connector can be a Philips or flat head internal connector or the connector can be an external nut connector having a polygonal shape, such as a hexagon, a star, or a square to name a few. The interlock 850 has a pivot bearing 853 operatively connected to the distal end of the driveshaft 852. The pivot bearing 853 is pivotally connected to proximal ends of two force struts 856. Pivotally connected to the body 141 are a pair of opposing lock parts 854, having a shape that is a mirror image of one another. The lock parts 854 each pivot about the pivot points, which are movable with respect to the body 141 of the corner interlock assembly 140, as is shown in the transition from FIG. 34 to FIG. 35. Each lock part 854 extends at an angle with respect to the longitudinal extent of the driveshaft 852 to position a lock hook 857 at the distal end of the lock part 854 into respective opposing orifices 62 of the corner fitting 60 of adjacent containers 10. When the driveshaft 852 is rotated in an inward direction, as shown in FIG. 34, the distal end of the driveshaft 852 moves the pivot bearing 853 with respect to the body 141 to, thereby, translate the pivot axes of the lock parts 854 towards the frame 851. With this movement of the force struts 856, each of the lock parts 854 rotate about their rotation axis. In a retracted or unlocked position of the driveshaft 852 shown in FIG. 35, the lock hook 857 is within the orifice 62 but does not extend past planes defined by the opposing sides of the orifice 62 (see dashed lines). In a threaded-in position of the driveshaft 852, shown in FIG. 34, the lock parts 854 are translated distally and are rotated to place inner surfaces of the lock hook 857 against an inner surface of the corner fitting 60 into a locked orientation. In the locked orientation, the two opposing lock hooks 857 removably secure the corner interlock assembly 140 to the corner fittings 60 to prevent movement of the containers 10 with respect to the connector frame 110, 111, of which the corner fitting 60 is a part.

Figure 36:
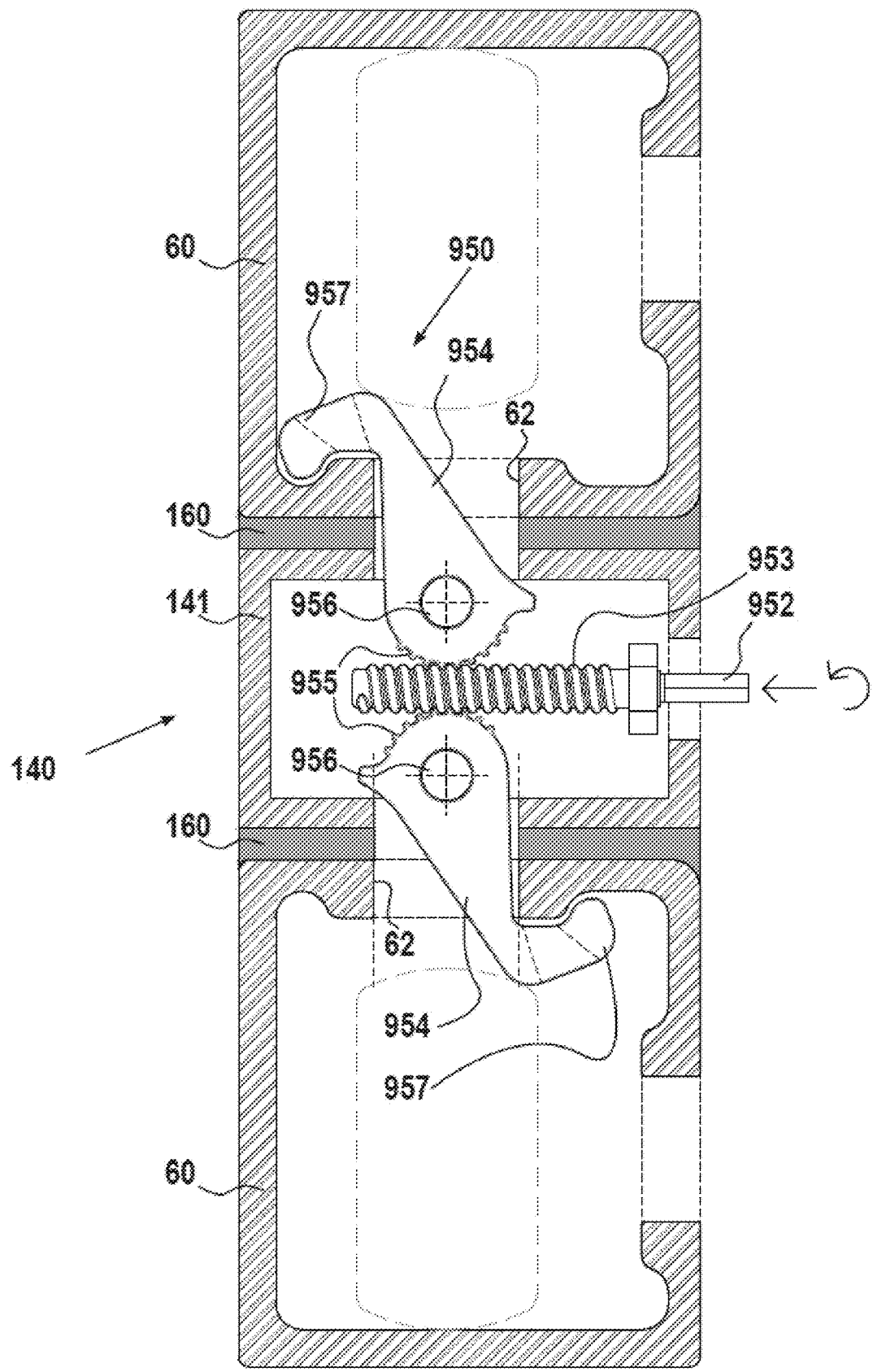
FIG. 36 is a fragmentary, cross-sectional view of a further exemplary embodiment of a container-to-connector frame-to-container securing interlock positioned within an interlock chamber of a connector frame and in a locked state securing two adjacent shipping containers' corner fittings together about the connector frame, the interlock having a worm gear mechanism.

FIG. 36 illustrates an exemplary configuration of another exemplary embodiment of a corner interlock assembly 140 with an interlock 950. In this exemplary embodiment, the interlock 950 is a worm screw and wheel. The interlock 950 has a rotating driveshaft 952, in the form of a worm screw, which that extends into the body 141 of the corner interlock assembly 140. The driveshaft 952 is fixed in place with respect to the body 141 of the corner interlock assembly 140 but is rotatable about its longitudinal axis. A proximal end of the driveshaft 952 has a tool connector shaped to fit a standard power tool 101, such as a drill. This connector can be a Philips or flat head internal connector or the connector can be an external nut connector having a polygonal shape, such as a hexagon, a star, or a square to name a few. A distal portion of the driveshaft 952 contains threads 953, in particular, worm threads that are operatively connected to corresponding worm threads 955 at a proximal end of each of a pair of opposing lock parts 954. The lock parts 954 are fixed with respect to the body 141 of the corner interlock assembly 140 at a pivot point 956 and are configured to pivot about the pivot point 956. The opposing lock parts 954 have shapes that are mirror images of one another. Each lock part 954 extends orthogonally with respect to a longitudinal extent of the driveshaft 952 to position a lock hook 957, at the distal end of each lock part 954, into respective opposing orifices 62 of the corner fitting 60 of adjacent containers 10. When the driveshaft 952 is rotated in a locking direction, the worm threads 953 of the driveshaft 952 rotate the lock parts 954 about the pivot point 956 with respect to the body 141 to, thereby, move the lock hook 957 of each lock part from within the orifice 62 to a side of the orifice 62 against a near inner wall of the corner fitting 60 into a locked position shown in FIG. 36. In the locked orientation, the two opposing lock hooks 957 removably secure the corner interlock assembly 140 to the corner fittings 60 to prevent movement of the containers 10 with respect to the connector frame 110, 111, of which the corner fitting 60 is a part. In a retracted or unlocked position of the driveshaft 952, the lock hook 957 is within the orifice 62 but does not extend past planes defined by the opposing sides of the orifice 62 (see dashed lines).

Figure 37:
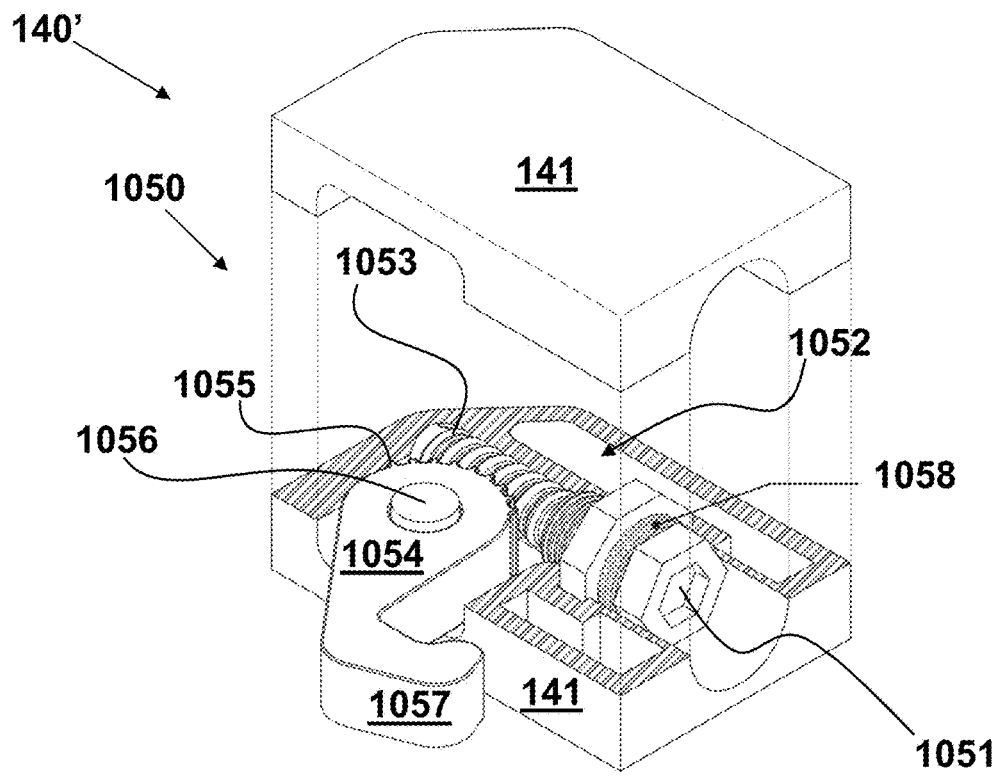
FIG. 37 is a fragmentary, exploded, perspective and partially cross-sectional view of a further exemplary embodiment of a container-to-connector frame-to-container modular securing interlock positioned within an interlock chamber in a locked state.
Figure 38:
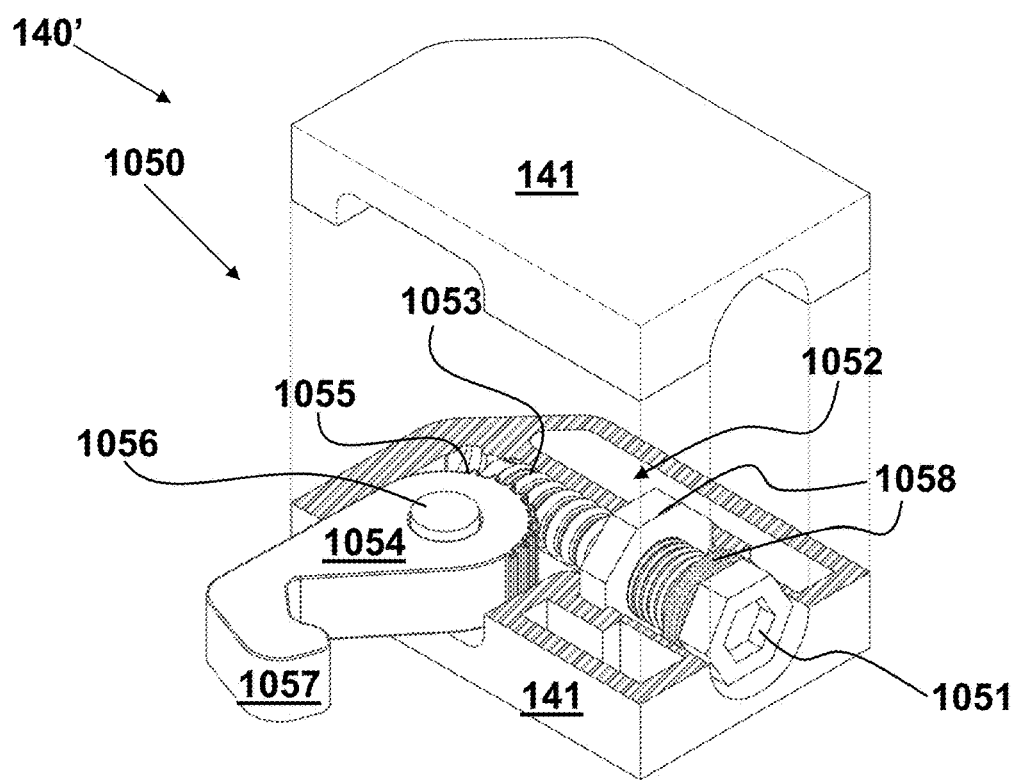
FIG. 38 is a fragmentary, exploded, perspective and partially cross-sectional view of the container-to-connector frame-to-container modular securing interlock of FIG. 37 in an unlocked state.
Figure 39:
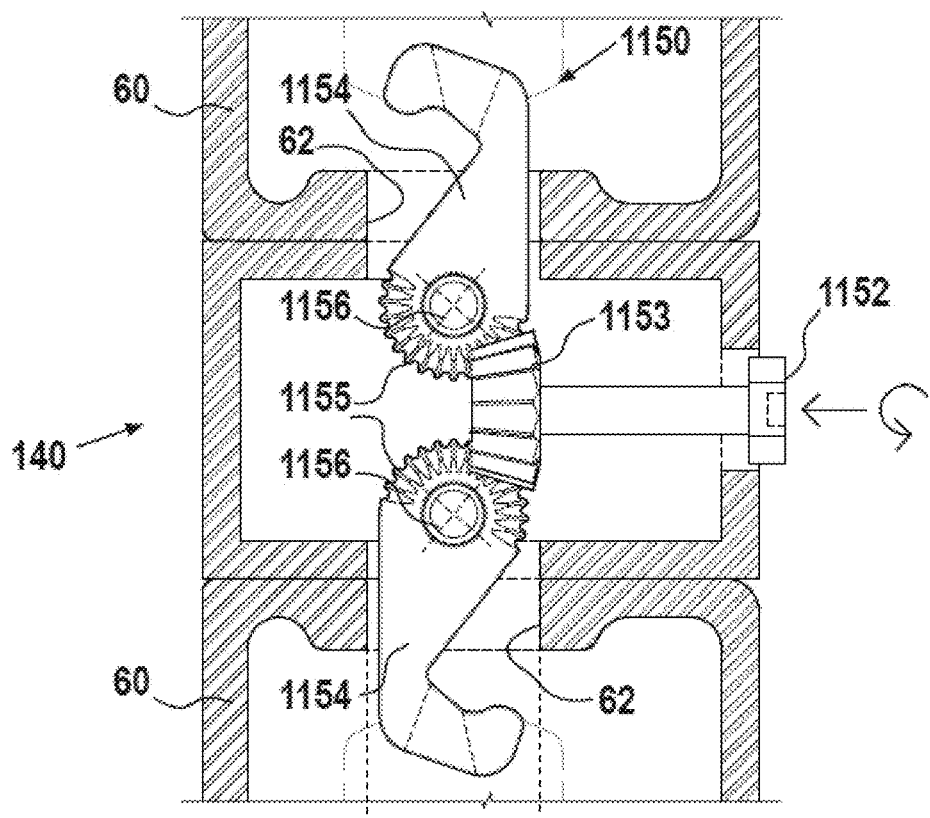
FIG. 39 is a fragmentary, cross-sectional view of a further exemplary embodiment of a container-to-connector frame-to-container modular securing interlock positioned within an interlock chamber of a connector frame and in an unlocked state securing two adjacent shipping containers' corner fittings together about the connector frame, the interlock having bevel gears mechanism.
Figure 40:
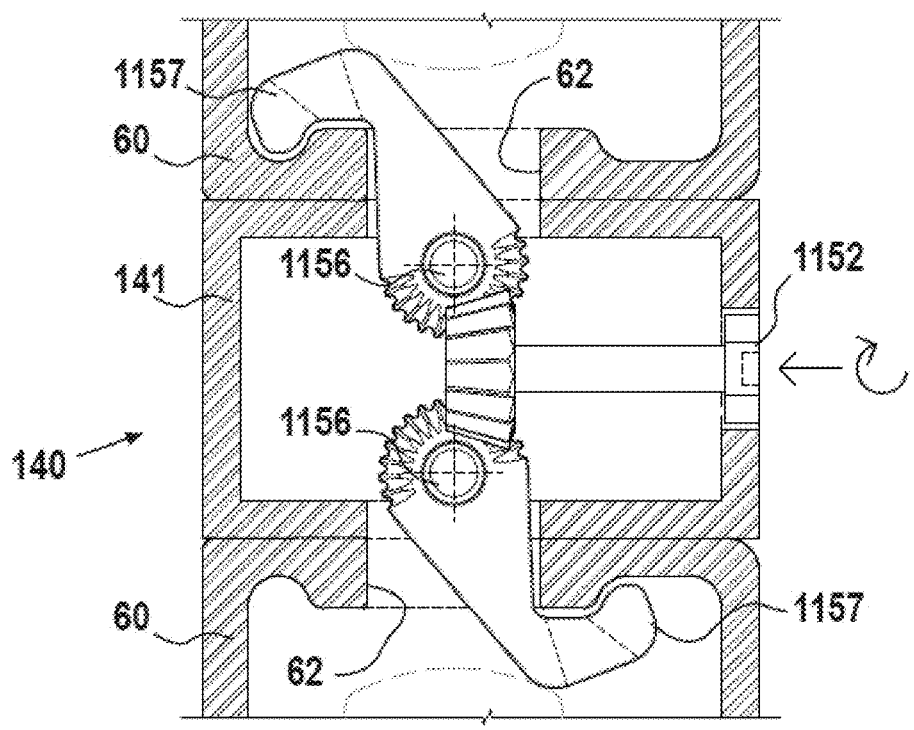
FIG. 40 is a fragmentary, cross-sectional view of the container-to-connector frame-to-container modular securing interlock of FIG. 39 in a locked state.
Figure 41:
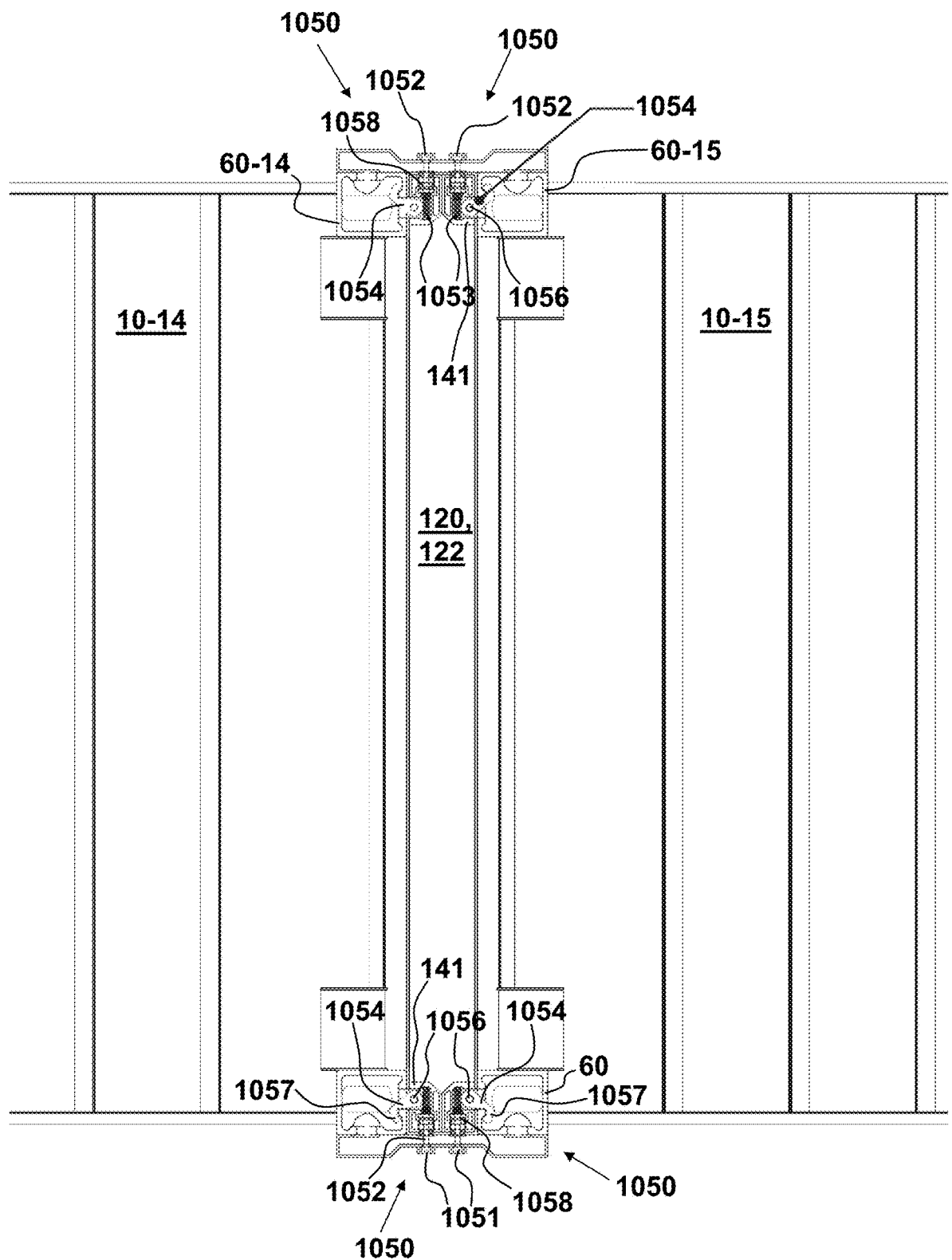
FIG. 41 is a fragmentary, plan, partially cross-sectional, and partially transparent view of a set of four container-to-connector frame-to-container modular securing interlocks of FIG. 37 positioned within interlock chambers of a connector frame assembly in a locked state securing the corner fittings of two adjacent shipping containers together.

FIGS. 37 and 38 show an alternative to the configuration of the corner interlock assembly 140 with the worm screw and wheel embodiment of FIG. 36. These figures depict one half of the corner interlock assembly 140' showing a modular interlock part 1050 forming half of an interlock. As will be described in further detail below, the other half of the interlock is a modular interlock part 1050 that is a mirror image of the one shown in FIGS. 37 and 38 and places the lock part 1054 at a position that is a mirror image to the one shown to secure to corner fittings 60 of containers 10 (other possible configurations of the corner interlock assembly 140 include, e.g., positions that are not opposite but orthogonal, such as at 90° and 270°). FIG. 41, for example, illustrates two complete corner interlock assemblies 140 (one upper and one lower) that each have two of the modular interlock parts 1050 and, together, connect one side of a first container 10-14 to another side of a second container 10-15. These four halves/two sets comprise one half of the four corners of a connector frame 110.

The modular interlock part 1050 comprises a driveshaft 1052 with threads 1053 in the form of a worm screw and the lock part 1054 with threads 1055 in the form of a worm wheel. The hex-shaped connector 1051 of the driveshaft 1052 is shaped to fit to a standard power tool 101, such as a drill. The driveshaft 1052 is fixed in place with respect to the body 141 with a washer and nut assembly 1058 but is rotatable about its longitudinal axis. The distal worm screw threads 1053 operatively connect to corresponding worm threads 1055 at the proximal end of the lock part 1054. The lock part 1054 is also fixed with respect to the body 141 at a pivot point or boss 1056 and, therefore, can pivot about the pivot point 1056. The lock part 1054 extends orthogonally with respect to the longitudinal extent of the driveshaft 1052 to position a lock hook 1057 through an opposing orifice 62 of a corner fitting 60 of an adjacent container 10 (not illustrated in FIGS. 37 and 38). When the driveshaft 1052 is rotated in a locking direction, the worm threads 1053 of the driveshaft 1052 rotate the lock part 1054 about the pivot point 1056 to move the lock hook 1057 from an unlocked position shown in FIG. 38 to a side of the orifice 62 against a near inner wall of the corner fitting 60 into a locked position, which is shown in FIG. 37. When in the locked position or orientation, the lock hook 1057 removably secures the corner interlock assembly 140 to the corner fittings 60 to prevent movement of a container 10 with respect to a connector frame 110, 111, of which the corner fitting 60 is a part. As can be seen in FIG. 41, the four lock hooks 1057 of the four modular interlock parts 1050 are in the locked state. The modular interlock part 1050 has a worm wheel/gear lock part 1054 with and ability to rotate or pivot from a 0° angle in an unlocked state to an approximately ±45° angle in a locked state (or 135°/225° angles depending where the interlocking mechanism is placed as shown in FIG. 41).

Figure 42:
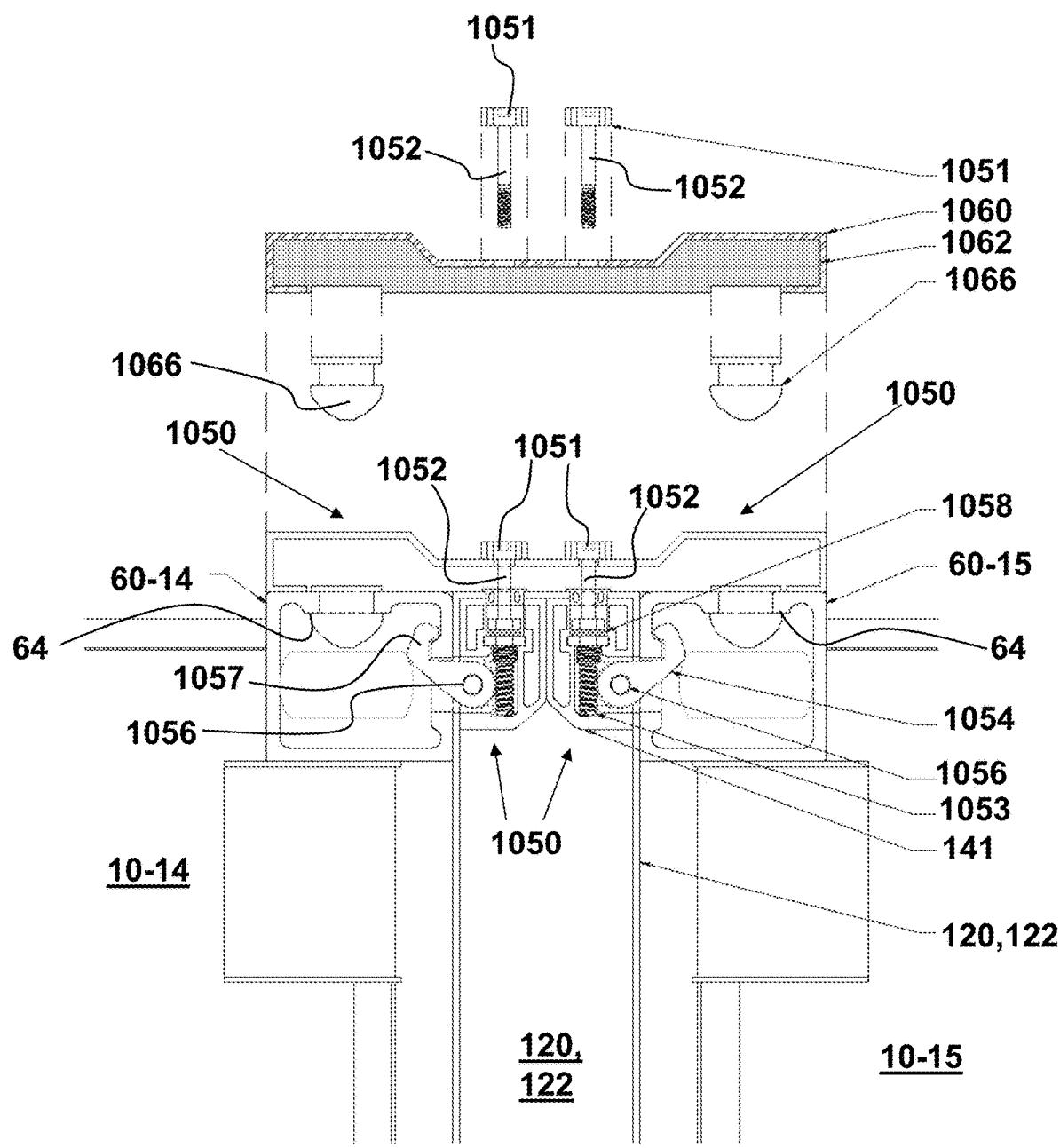
FIG. 42 is a fragmentary, enlarged, detailed plan view and partially cross-sectional view of the assembly of FIG. 41 with two of the container-to-connector frame-to-container modular securing interlocks of FIG. 37 positioned within the interlock chambers of a connector frame assembly in a locked state and an exploded plan and partially cross-sectional view of an exemplary embodiment of a container-to-connector frame-to-container sealing assembly.

FIG. 42 is an enlarged portion of the upper center of FIG. 41. Here, there is shown two adjacent containers 10-14, 10-15 with respective corner fittings 60-14, 60-15. A portion of a vertical connector frame 110 that connects the two opposing containers 10-14, 10-15 together is depicted. Two of the modular interlock parts 1050 having the lock parts 1054 in mirror opposition are disposed between the two corner fittings 60-14, 60-15. These lock parts 1054 extend into respective orifices 62 of the corner fittings 60-14, 60-15 and the lock parts 1054 are in a locked state where the two lock hooks 1057 are rotated out to the side of the orifices 62 to place the ends of the lock hooks 1057 on respective inner walls of the corner fittings 60-14, 60-15. Also shown in FIG. 42 is a sealant flange channel 1060, which can, in an exemplary embodiment, have an exterior metal wall and an interior seal 1062 that is made of, for example, rubber or foam insulation. In this exemplary embodiment, the flange channel 1060 is removably secured to the side of the vertical connector frame 110. The sealant flange channel 1060 is locked in place on the sides of the containers and the connector frame after the connector frame has been locked, in order to provide a water-tight seal connection between the two adjacent containers (corner fittings and the vertical edges of the two adjacent containers) with respect to the connector frame, as shown in FIG. 43.

The cap inserts 1066 have a perimeter shape corresponding to a shape of side orifices 64 of the corner fittings 60-14, 60-15. In such a configuration, when the flange channel 1060 is moved against the side/top side of the connector frame 110 and the side/top side edges of the facing containers 10-14, 10-15, the cap inserts 1066 removably secure the corner fitting's orifices 64, and can be made of a material that is water-tight, providing a water-tight connection and insulation against liquid penetration to the interior of the corner fittings 60-14, 60-15. This deformable insert cap 1066, made of rubber, for example, is first moved against the container corner fitting and press-fits against into the orifice of it in order to water-tightly seal the orifice. Later the sealant metal flange channel is moved and locked into place. In one exemplary embodiment, the cap 1066 is slightly larger than the orifice 64 and press-fits into the orifice 64 to water-tightly seal the orifice 64 from above. In another exemplary embodiment, a separate hollow female insert 1068 is fixed (removably or permanently) into the orifice 64 and the cap 1066 has a shape corresponding to the female hollow and fits into the hollow to water-tightly seal the orifice 64.

FIG. 42 also shows the various components of the modular interlock part 1050, such as the lock part 1054 as a worm wheel, which acts as a gear locking element pivoting in an unlocked or locked position depending on the worm screw of the driveshaft 1052 applying torque with use of a power tool 101. Also, the washer and nut assembly 1058 includes a wedge lock washer in the locking mechanism to use tension over friction and secure the bolt/screw that might be susceptible and inclined to loosening due to heavy loads or extreme vibrations from winds up to 300 mph. In addition, the connector 1051 as a reverse thread/inner hex screw is used to attach the sealant flange channel, preferably of metal, and to secure and tighten the overall container-to-connector frame-to-container connection.

Figure 43:
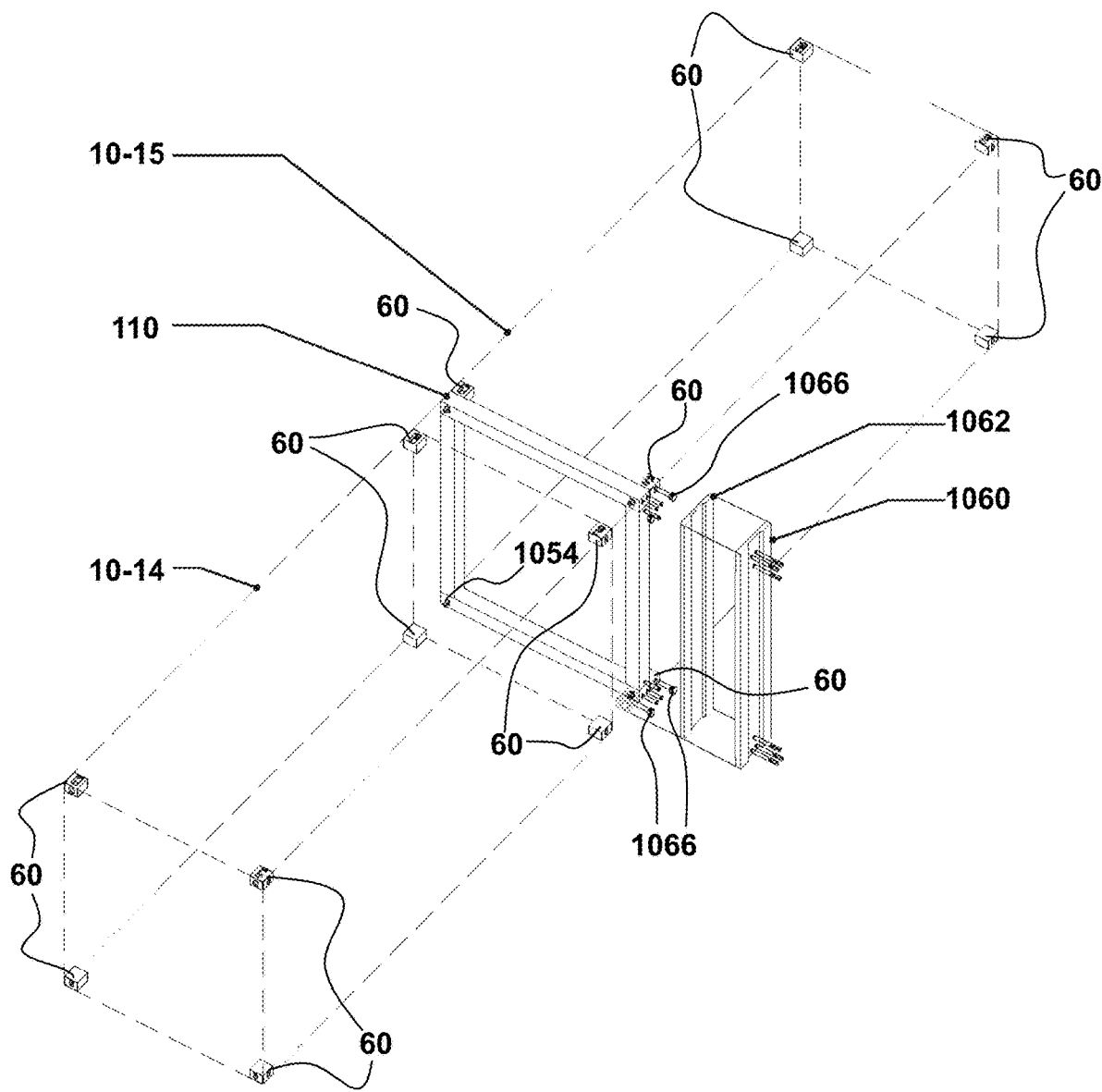
FIG. 43 is a perspective and partially transparent view of an exemplary embodiment of a connector frame system connected and locked to the corner fittings of a shipping container shown in dashed lines and to be connected to the corner fittings of a second shipping container shown in dashed lines in a horizontal container-to-connector frame-to-container connection with an exploded, perspective view of an exemplary embodiment of a lateral sealant, metal flange channel.

FIG. 43 shows an alternative configuration and view of the parts in FIGS. 41 and 42. Here, in the exploded view, the sealant flange channel 1060 is to be attached to the right vertical strut 120 of the vertical connector frame 110. The interior seal 1062 of the sealant flange channel 1060 is separated from the sealant flange channel 1060, and both parts are separated from the right vertical strut 120 of the connector frame 110. The connector frame 110 is secured to the first container 10-15 and is to be connected to the corner fittings 60 of the second shipping container 10-14, both containers 10-14, 10-15 shown in dashed lines.

Figure 44:
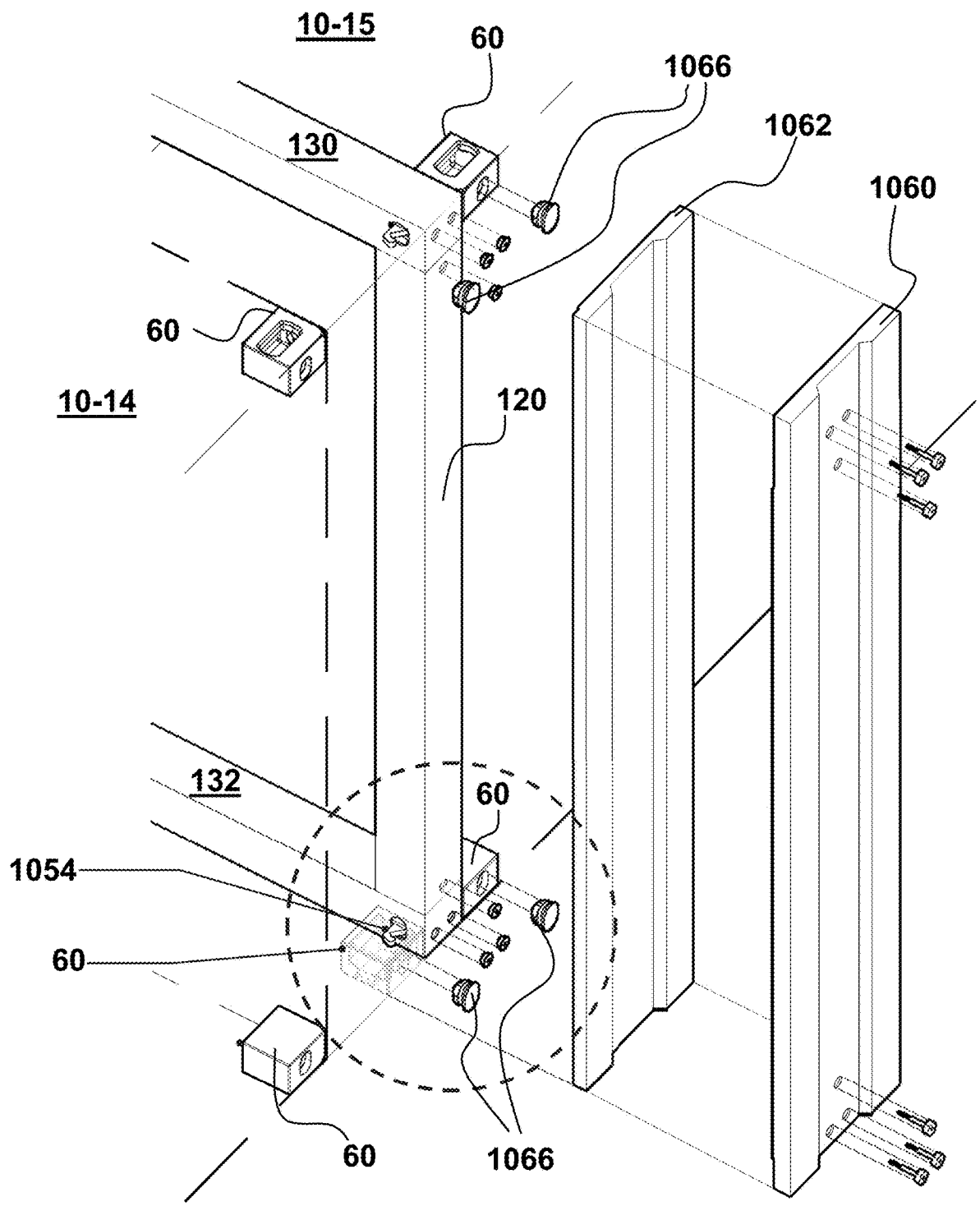
FIG. 44 is a fragmentary, enlarged, perspective and partially transparent view of the connector frame system and the lateral sealant, metal flange channel of FIG. 43 with the internal and horizontal interlock mechanism in an unlocked state.
Figure 45:
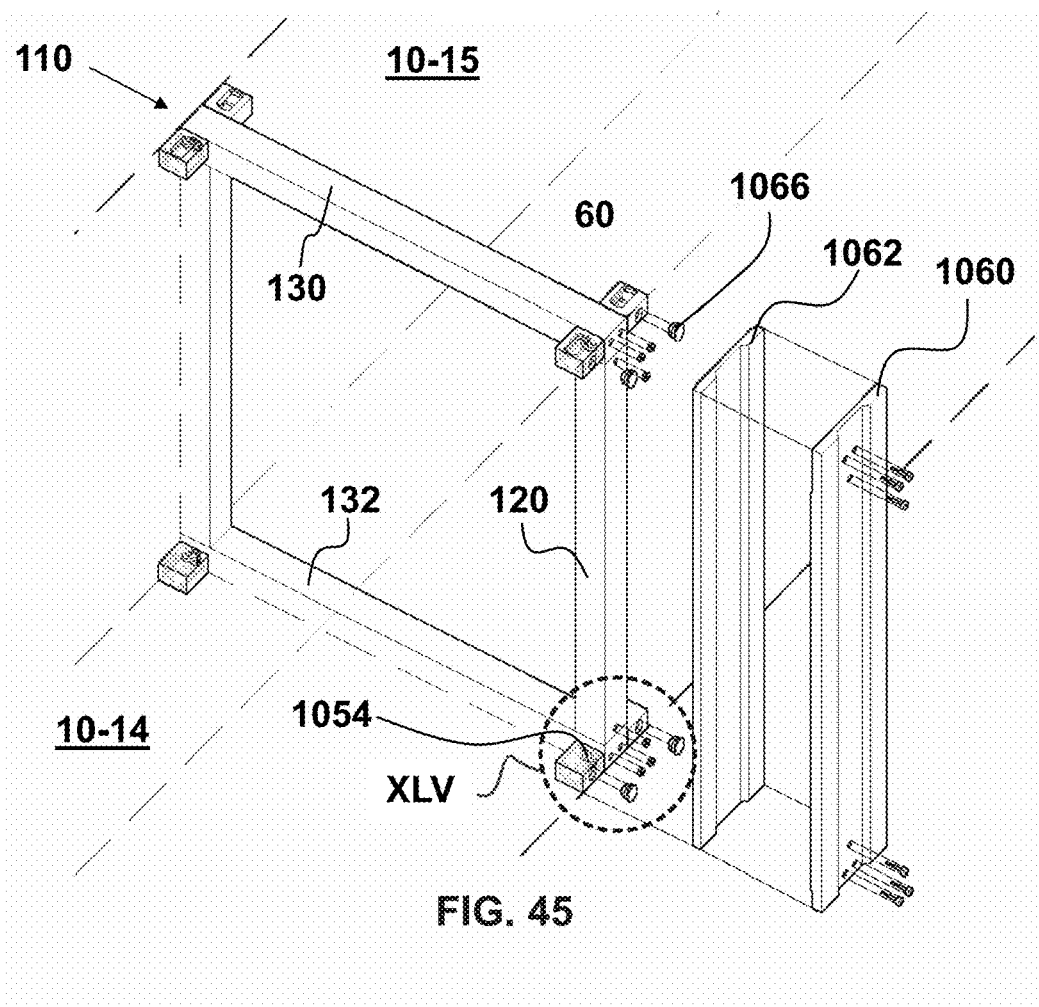
FIG. 45 is a fragmentary, enlarged, perspective and partially exploded and transparent view of the connector frame system with the horizontal interlocks in a locked state connecting and locking the connector frame system to the corner fittings of two adjacent shipping containers (shown in dashed lines) in a horizontal container-to-connector frame-to-container connection with an exploded view of the lateral sealant, metal flange channel of FIG. 43 separated from the side of the connector frame system and shipping containers.
Figure 46:
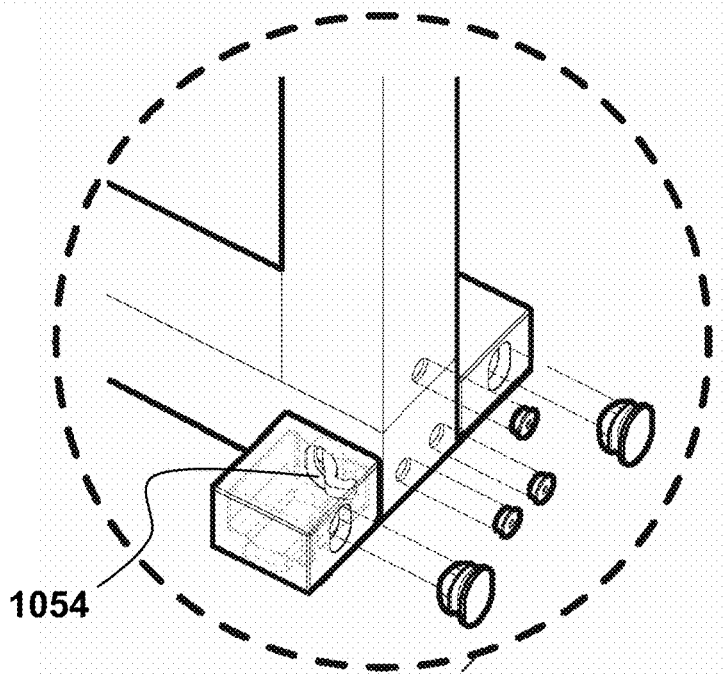
FIG. 46 is a fragmentary, enlarged, perspective view of a portion of the connector frame system of FIG. 45 with the locking mechanism in the locked state.

In this exemplary process for creating a horizontal container-to-connector frame-to-container connection in FIGS. 41 to 44, the vertical connector frame 110 is connected to the corner fittings 60 of the shipping containers 10-14, 10-15 without a seal 160 placed between the connector frame 110 and the containers 10-14, 10-15. Instead, the fluid-tight seal is provided by the sealing assembly comprising the sealant flange channel 1060 and the interior seal 1062 and their associated parts. The connection of the interior seal 1062 between the sealant flange channel 1060 and the right vertical strut 120 and the two opposing corners of the containers 10-14, 10-15 protects and prevents the shipping container-to-connector frame-to-shipping container connection from water/moisture infiltration at that junction. With locking of the interlock mechanisms of the connector frame to the second shipping container, a sealed connection between the two containers (vertical or horizontal or lateral) is established. Further water-tight sealing is provided by another set of the sealant flange channel 1060 and the interior seal 1062 at the upper horizontal strut 130 and/or the left vertical strut 122 and/or the lower horizontal strut 132. An enlarged view of the water-tight connection between the sealant flange channel 1060 and the interior seal 1062 and the right vertical strut 120 is shown in FIG. 44. In this view, the lock part 1054 to the container 10-14 is in the unlocked position or state. In contrast, in the shipping container-to-connector frame-to-shipping container connection of FIGS. 45 and 46, the lock part 1054 to the container 10-14 is in the locked position or state; the vertical connector frame 110 is locked to both containers 10-14, 10-15.

Figure 49:
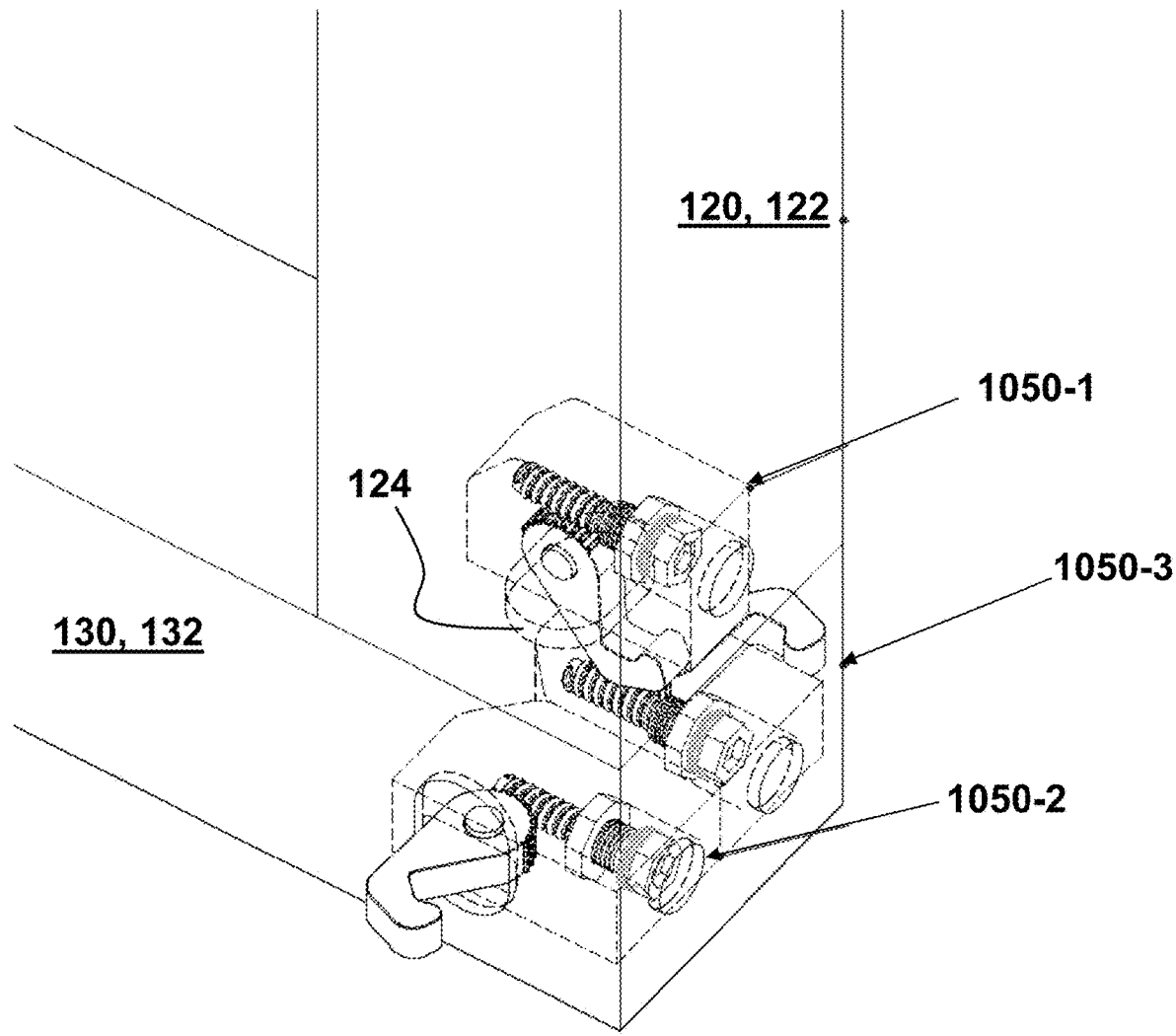
FIG. 49 is an enlarged, partially hidden, perspective view of the embodiment of the connector frame system and internal interlock mechanisms of FIG. 47 with a left lock part in an unlocked state and with the upper and right lock parts in a locked state.

FIG. 47 shows an exemplary embodiment of how three of the modular interlock parts 1050-1, 1050-2, 1050-3 can be used to connect two of the struts 120, 122, 130, 132 together and how to one of those struts 130, 132 is connected to two corner fittings 60 of containers 10. In this embodiment, a vertical strut 120, 122 houses one of the modular interlock parts 1050-1 at a bottom end thereof. Once the modular interlock part 1050-1 is in place therein (as shown to the left in FIG. 47), the lock part 1054-1 is used to secure the vertical strut 120, 122 to the horizontal strut 130, 132 through an orifice 124, as shown in FIG. 49. Two of the modular interlock parts 1050-2, 1050-3 are inserted into the end of the horizontal strut 130, 132. Once these two modular interlock parts 1050-2, 1050-3 are secured therein (as shown above in FIG. 47), the two opposing lock parts 1054-2, 1054-3 are pivoted into the respective orifices 62 of two opposing corner fittings 60 of the containers 10, thereby locking the connector frame 110 to the containers 10. FIG. 48 illustrates the parts of the modular interlock part 1050-2 separated in an exploded view.

Figure 50:
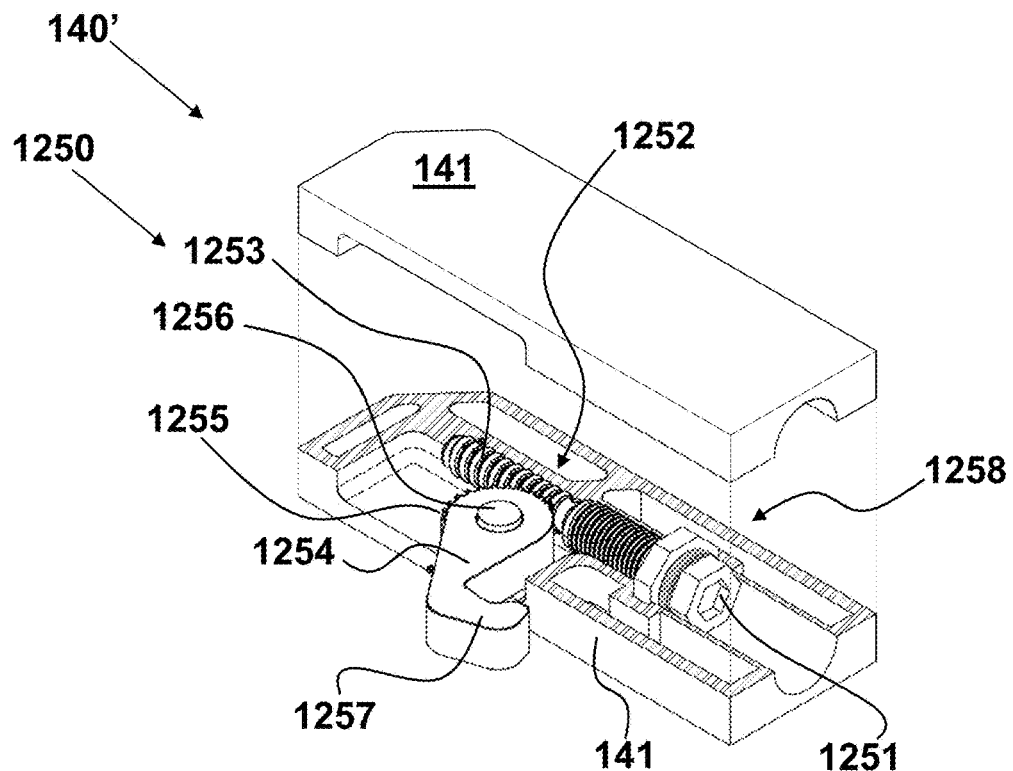
FIG. 50 is a fragmentary, exploded, perspective and partially cross-sectional view of a further exemplary embodiment of a modular securing interlock in a locked state for any of connector frame, window frame, and/or door frame systems.
Figure 51:
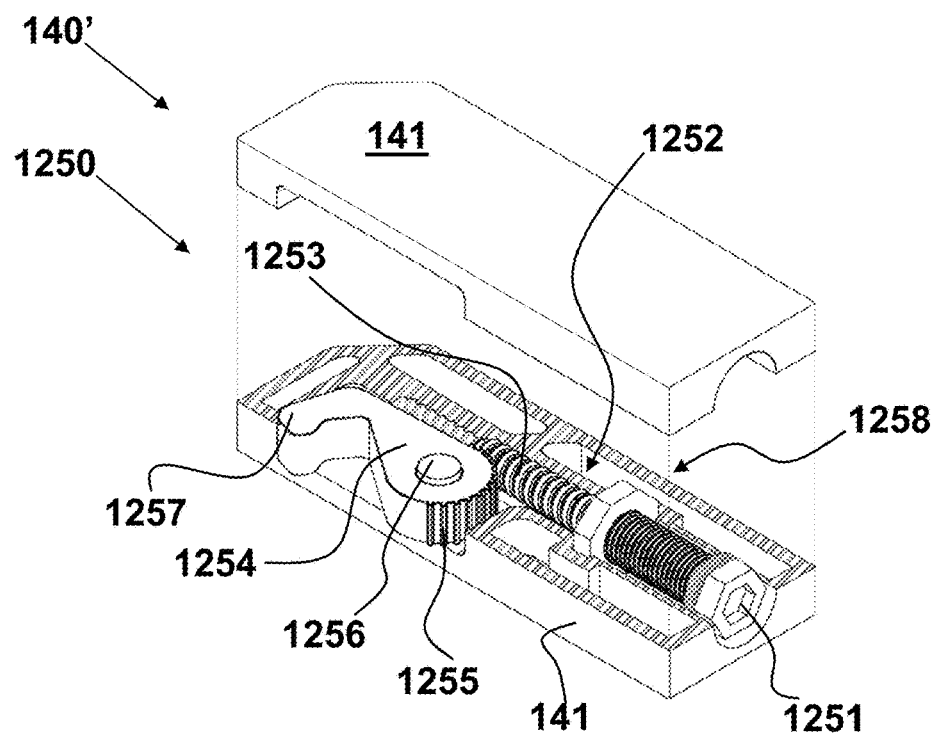
FIG. 51 is a fragmentary, exploded, perspective and partially cross-sectional view of the modular securing interlock of FIG. 50 in an unlocked state.

FIGS. 50 and 51 show another alternative to the configuration of the corner interlock assembly 140 with the worm screw and wheel embodiment of FIG. 36. These figures depict one half of the corner interlock assembly 140' showing a modular interlock part 1250 forming half of an interlock. As will be described in further detail below, the other half of the interlock is a modular interlock part 1250 that is a mirror image of the one shown in FIGS. 50 and 51 and places the lock part 1254 at a position that is a mirror image to the one shown to secure to corner fittings 60 of containers 10 (other possible configurations of the corner interlock assembly 140 include, e.g., positions that are not opposite but orthogonal, such as at 90° and 270°). The modular interlock part 1250 comprises a driveshaft 1252 with threads 1253 in the form of a worm screw and the lock part 1254 with threads 1255 in the form of a worm wheel. The hex-shaped connector 1251 of the driveshaft 1252 is shaped to fit to a standard power tool 101, such as a drill. The driveshaft 1252 is fixed in place with respect to the body 141 with a washer and nut assembly 1258 but is rotatable about its longitudinal axis. The distal worm screw threads 1253 operatively connect to corresponding worm threads 1255 at the proximal end of the lock part 1254. The lock part 1254 is also fixed with respect to the body 141 at a pivot point 1256 and, therefore, can pivot about the pivot point 1256. The lock part 1254 extends orthogonally with respect to the longitudinal extent of the driveshaft 1252 to position a lock hook 1257 through an opposing orifice 62 of a corner fitting 60 of an adjacent container 10 (not illustrated in FIGS. 50 and 51). When the driveshaft 1252 is rotated in a locking direction, the worm threads 1253 of the driveshaft 1252 rotate the lock part 1254 about the pivot point 1256 to move the lock hook 1257 from an unlocked position shown in FIG. 51 to a side of the orifice 62 against a near inner wall of the corner fitting 60 into a locked position, which is shown in FIG. 50. When in the locked position or orientation, the lock hook 1257 removably secures the corner interlock assembly 140 to the corner fittings 60 to prevent movement of a container 10 with respect to a connector frame 110, 111 of which the corner fitting 60 is a part. As compared to the modular interlock part 1050, the modular interlock part 1250 has the ability to rotate or pivot from a perpendicular, 90° angle in an unlocked state to an approximately −45° angle in a locked state. Because this modular interlock part 1250 has more flexibility on pivoting points and angles, the size of the interlock's body 141 is modified and enlarged in accordance with the length of the worm screw driveshaft 1252 that allows the worm wheel 1255 of the lock part 1254 to rotate/pivot when applying torque.

Figure 52:
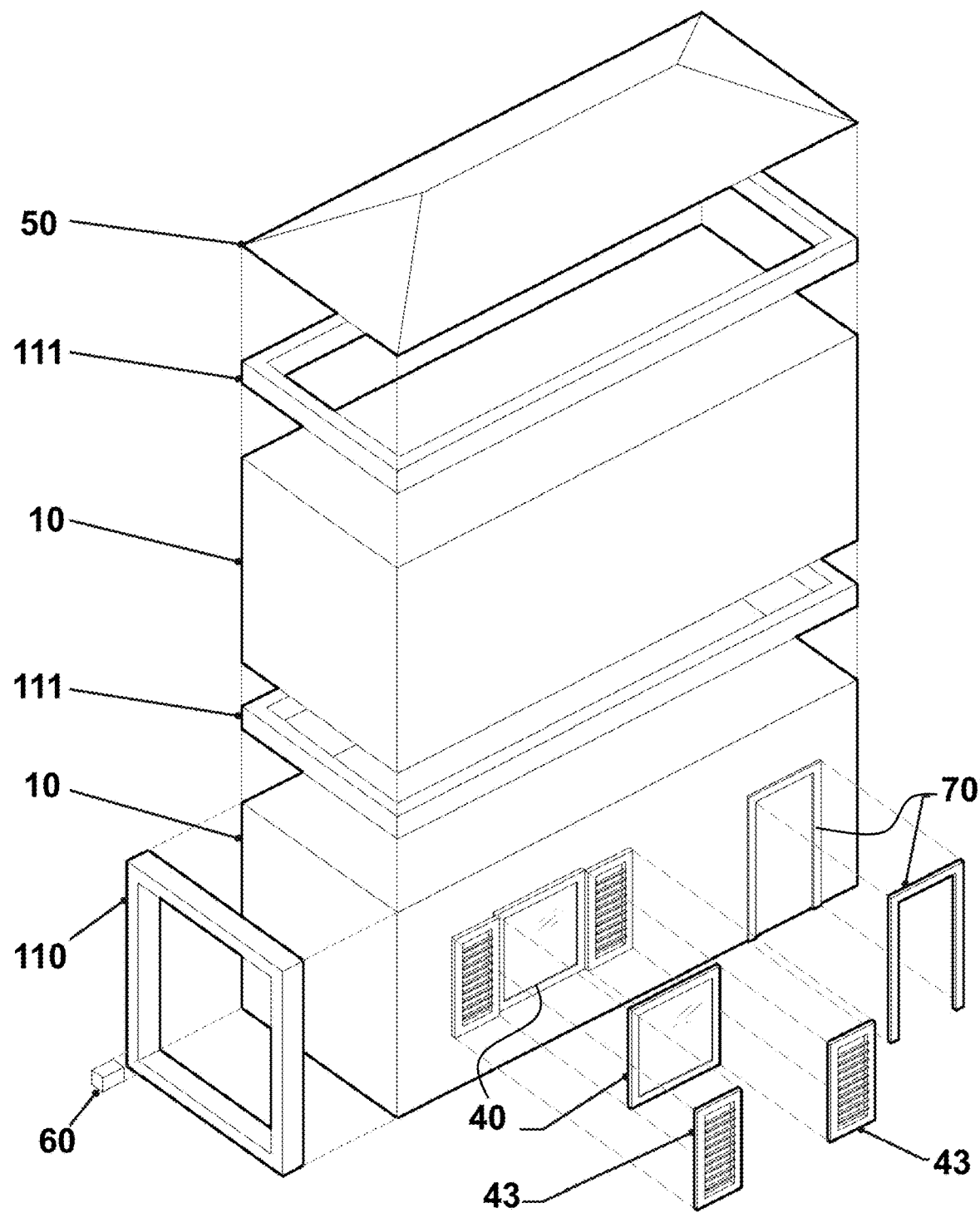
FIG. 52 is an exploded, perspective view of an exemplary embodiment of a vertical container-to-connector frame-to-container connection system between two shipping containers, one on top of the other, and with a horizontal container-to-connector frame-to-container connection on the lower shipping container, with a container-to-connector frame-to-roof module connection system above the top shipping container and below a roof module to connect the roof module to the upper shipping container, and with door, window, and shutter module connector frames systems to be connected and locked in place on the right side of the lower shipping container.

As explained herein with regard to FIG. 8, the inventive embodiments of the connector frame and the embodiments of the interlock are applicable not only to securing containers 10 to one another in any orientation (e.g., above, below, any side), but they are also applicable in various forms to the other components or accessories of the modular multi-container housing structure 1. These accessories include, but are not limited to, the stairways 4, façades 30, windows 40, window treatments 42, window shutter modules 43, and window casements 40, roof and roof segments 50, walls 54, and doors and door casements 70, most of which are also shown in FIG. 52. Any of the above described interlocks 140, 150, 250, 350, 650, 750, 850, 950, 1150 or modular interlock parts 1050, 1250 can be used in any way or combination to secure the stairways 4, façades 30, windows 40, window treatments 42, window shutter modules 43, and window casements 40, roof and roof segments 50, walls 54, and doors and door casements 70 to the containers 10.

Figure 53:
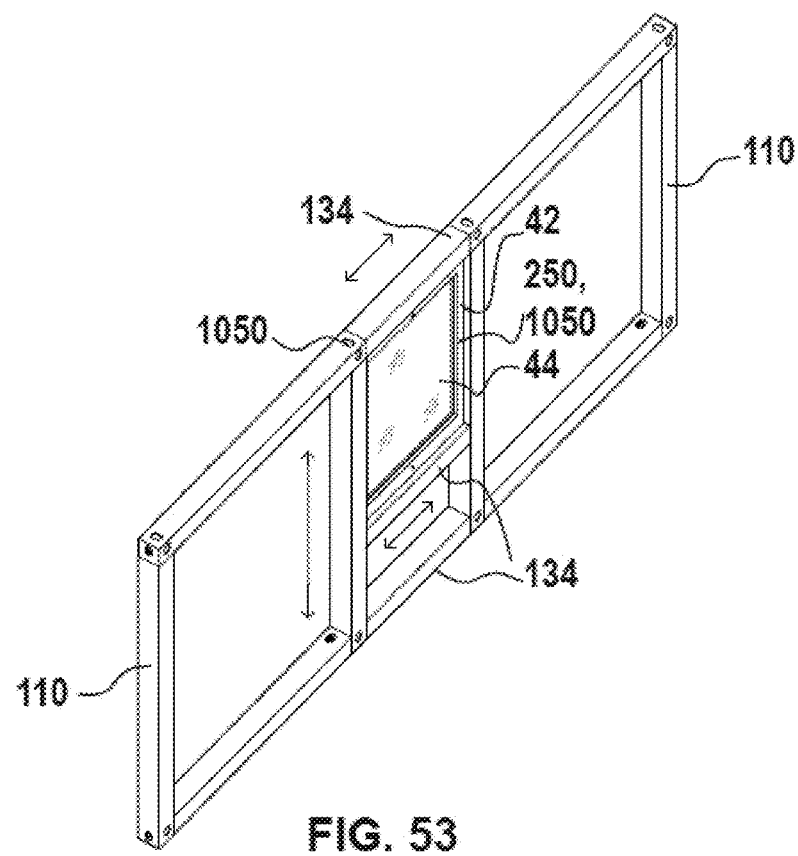
FIG. 53 is a perspective view of an exemplary embodiment of a modular window frame system having internal interlocking mechanisms connecting the window frame system to a pair of connector frames, which assembly of connector frames being ready to be connected to corner fittings of a shipping container in a container-to-connector frames-to-container connection.
Figure 54:
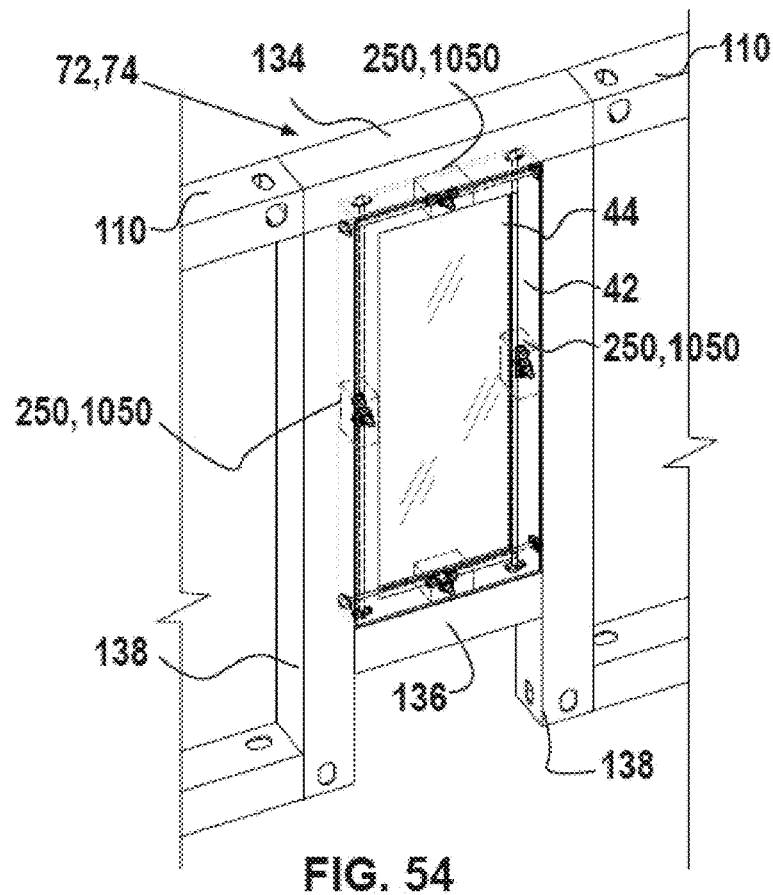
FIG. 54 is a fragmentary, perspective view of an exemplary embodiment of a window frame system having internal interlocking mechanisms in both vertical and horizontal positions connecting an exemplary embodiment of a window frame system to a pair of connector frames, which assembly of connector frames being ready to be connected to corner fittings of a shipping container in a container-to-connector frames-to-container connection.

Because a standard shipping container 10 has dimensions of 8' (2.43 m) wide, 8.5' (2.59 m) high, and 20' (6.06 m) long, two of the vertical connector frames 110 will not extend over the entire 20' of the side length of the container. However, two vertical connector frames 110 can be combined with a 4' wide vertical window frame extension 134, as shown in FIG. 53, to extend and encompass an entire long side, top, or bottom of the container 10. In this exemplary embodiment, the window frame extension 134 is a set of three horizontal struts having the same connector compartments and orifices 124 as the connector frames 110, 111 but are shorter for the embodiment of a 20' long container 10. Therefore, appropriate modular interlock parts (e.g., 1050) can be used to secure the two connector frames 110 respectively at the left and right ends of the three window frame extensions 134. In another exemplary configuration, when there is a need to lock two containers (top to bottom or side by side) together, then a single vertical or horizontal connector frame is rectangular in shape if a longitudinal length of the horizontal struts 130, 132 is different from the longitudinal length of the vertical strut 120, 122, as shown in FIG. 52, to extend and encompass an entire long side, top, or bottom of the container 10. The window frame 42, itself, can have the same cross-sectional shape as the struts 120, 122, 130, 132, 134, the same internal compartments for securing therein the modular interlock parts 250, 1050 as the struts 120, 122, 130, 132, 134, and the same orifices 124 as the struts 120, 122, 130, 132, 134. Therefore, with an appropriate sealed groove or other connection at the inside surfaces of the window frame 42, a pane or panes of glass 44 can be secured into the center opening defined by the window frame 42, as shown in FIGS. 53 and 54, for example, to make a complete, ready-to-hang window within the opening defined by the two upper window frame extensions 134 and the two opposing vertical struts of the adjacent container frames 110. Such exemplary configurations are shown in FIGS. 53 and 54.

FIG. 54, however, illustrates an alternative embodiment to the configuration of FIG. 53 where the lowest window frame extension 134 is not included. This configuration illustrates how one window frame extension 134 and two vertical door frame extensions 138 can be connected between two opposing vertical connector frames 110. If desired, a bottom, shorter, horizontal, window frame extension 136 can be added for additional support, but this is not a requirement. As can be seen in FIG. 54, the shorter window frame extension 136 is disposed below the window frame 42. Removing this second, shorter, window frame extension 136 allow one to easily see that the three struts 74, 138, 138 form both a door frame 72 and an orifice in which the window frame 42 can be secured.

It is noted that the modular interlock parts 250, 1050 are shown only securing a modular window frame 42 in between two of the connector frames 110 in a vertical orientation. While windows are mostly hung vertically, a horizontal orientation connected to connector frame 111 is also envisioned, for example, to create a skylight, with the window glass 44 being a single sheet, such as that shown in FIGS. 53 and 54, or it can be a bay-type window, such as that shown in FIGS. 64 to 66.

Figure 55:
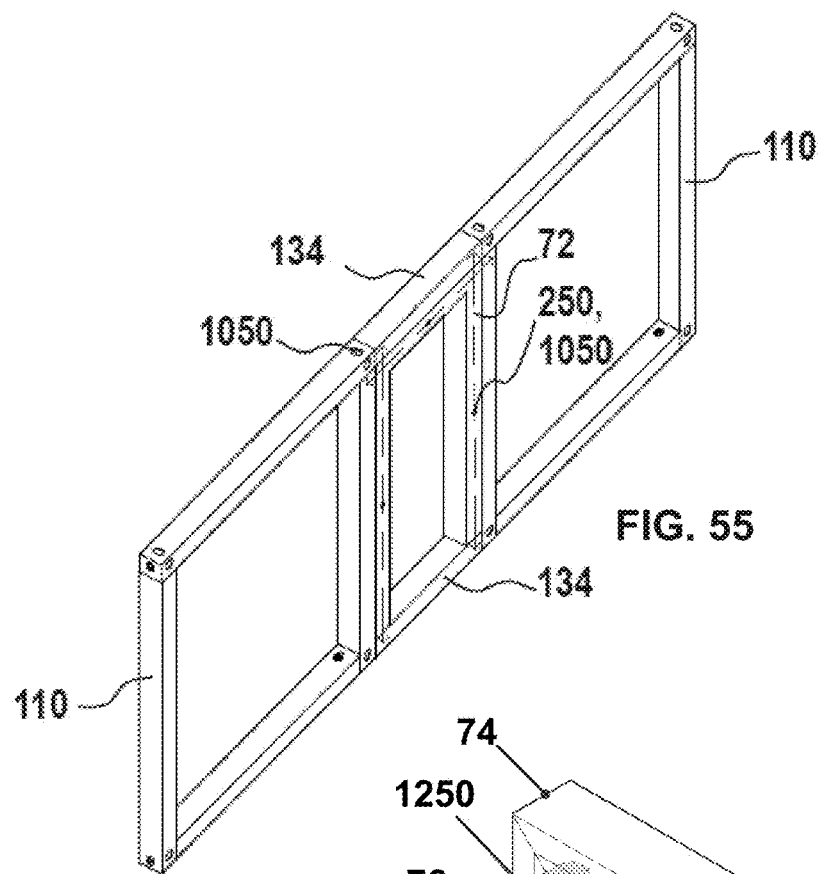
FIG. 55 is a perspective view of an exemplary embodiment of a door frame system having internal interlocking mechanisms in both vertical and horizontal positions connecting an exemplary embodiment of a door frame system to a pair of connector frames, which assembly of connector frames being ready to be connected to corner fittings of a shipping container in a container-to-connector frame-to-container connection.

FIG. 55 illustrates a door frame system having interlocks 250, 1050 in both vertical and horizontal positions connecting an exemplary embodiment of a door frame system to a pair of connector frames 100, which assembly of connector frames 100 are ready to be connected to corner fittings 60 of a shipping container 10 in a container-to-connector frame-to-container connection.

Figure 56:
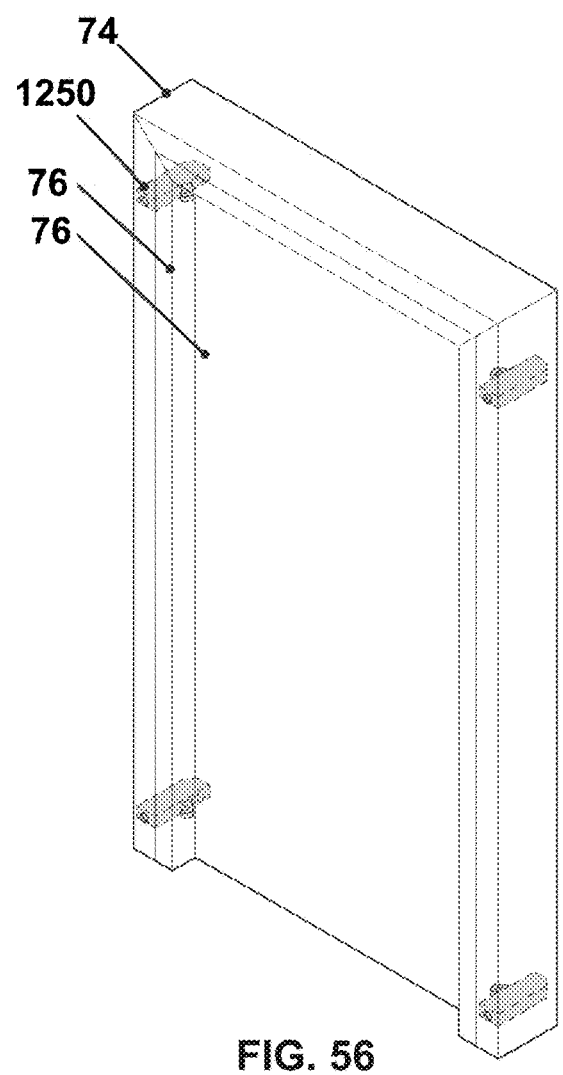
FIG. 56 is a perspective view of an exemplary embodiment of a door frame-to-connector frame system connection having internal interlocking mechanisms shown in FIGS. 50 and 51.
Figure 57:
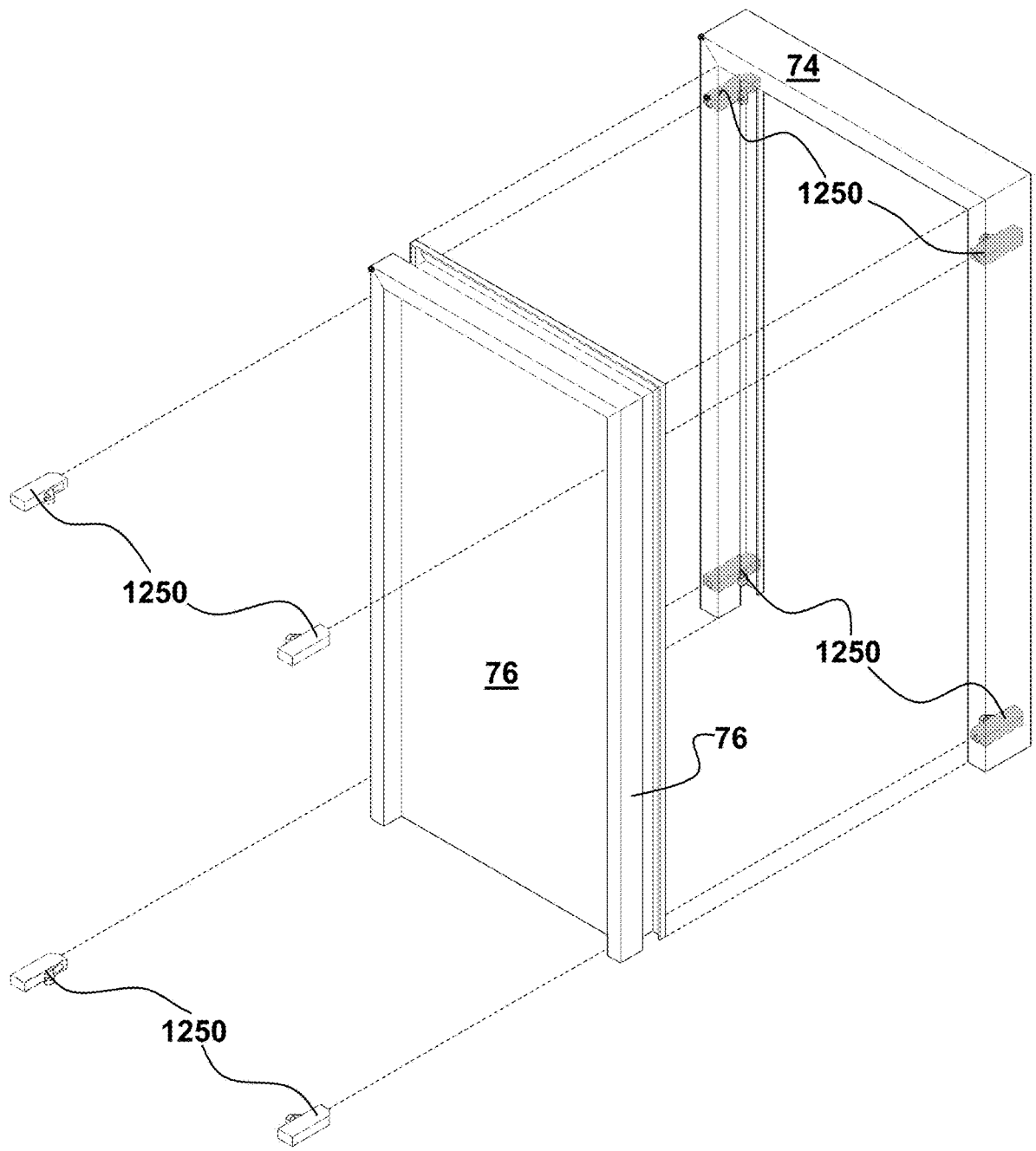
FIG. 57 is an exploded perspective view of the door frame system of FIG. 56.

Another exemplary configuration of a doorframe is depicted in FIGS. 56 and 57. Therein, a connector doorframe 74 has vertical struts and a horizontal strut connected together at angular joints and a set of modular interlock parts (here, e.g., four of 1250) are shown for connecting, in a central orifice thereof, a modular, pre-hung door 76. In FIG. 57, the modular, pre-hung door 76 and the set of modular interlock parts 1250 are depicted separated from one another.

Figure 58:
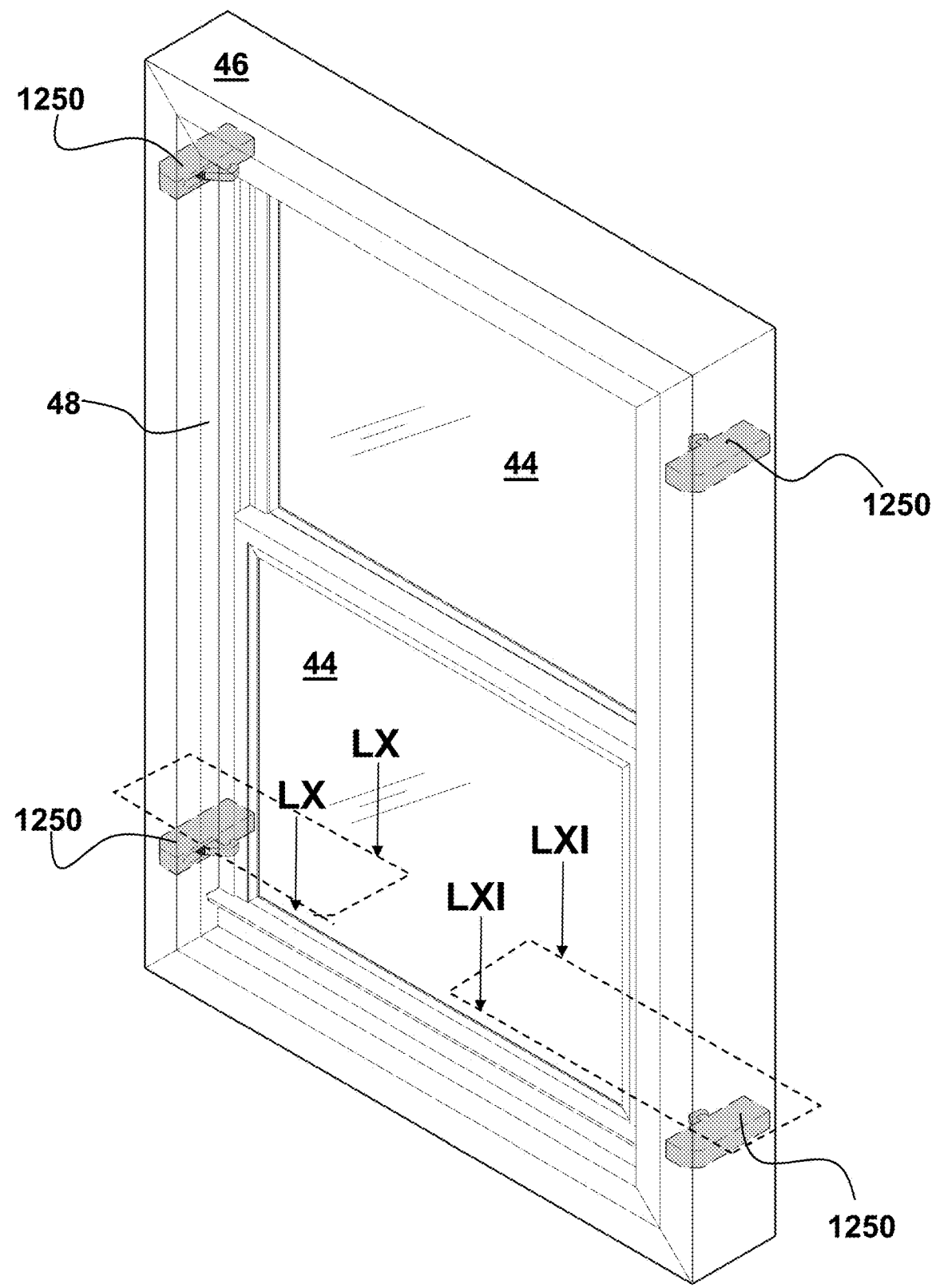
FIG. 58 is a perspective side view of an exemplary embodiment of a window frame-to-connector frame system connection containing internal interlocking mechanisms shown in FIGS. 50 and 51.
Figure 59:
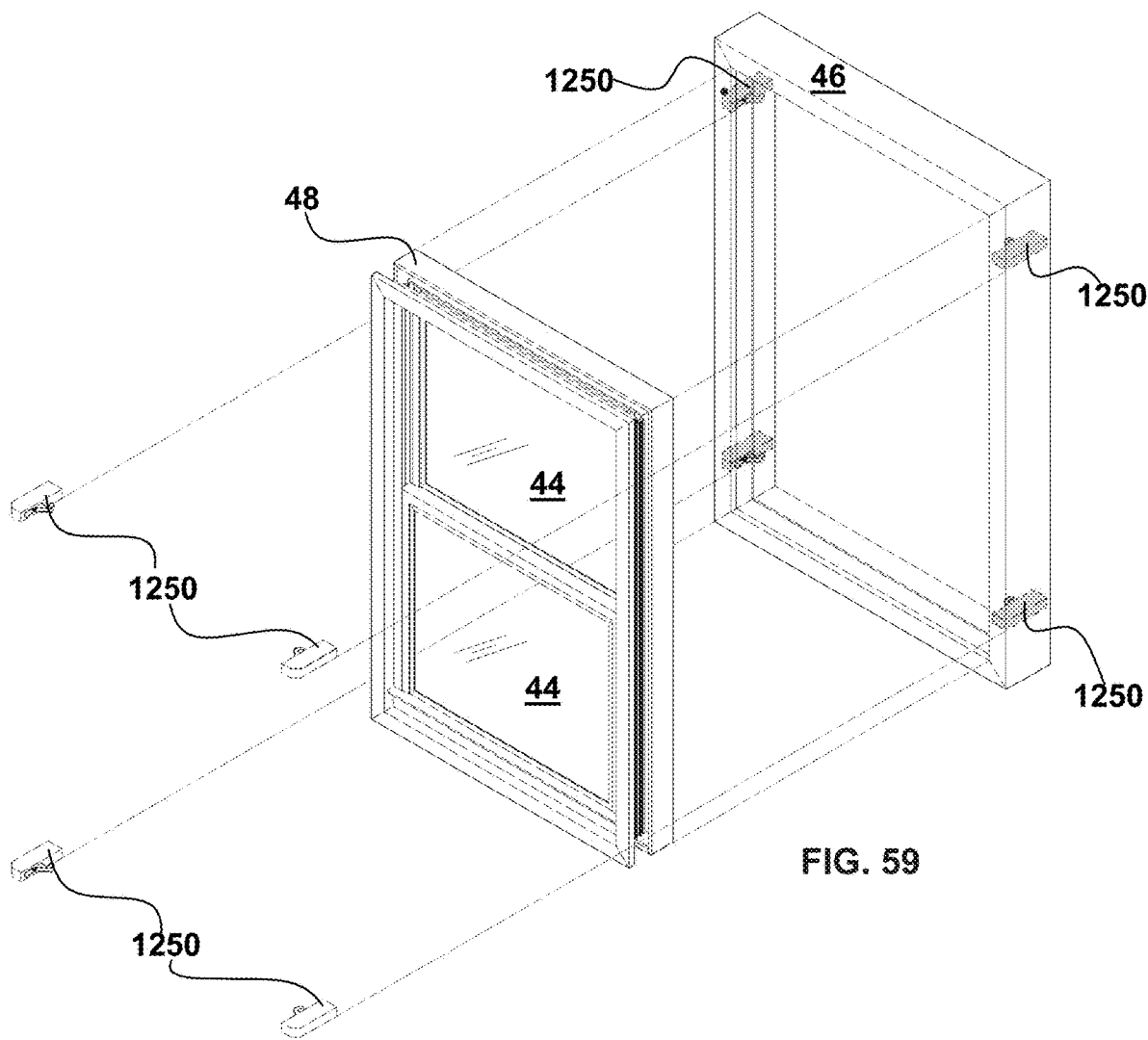
FIG. 59 is an exploded perspective view of the window system of FIG. 58.
Figure 60:
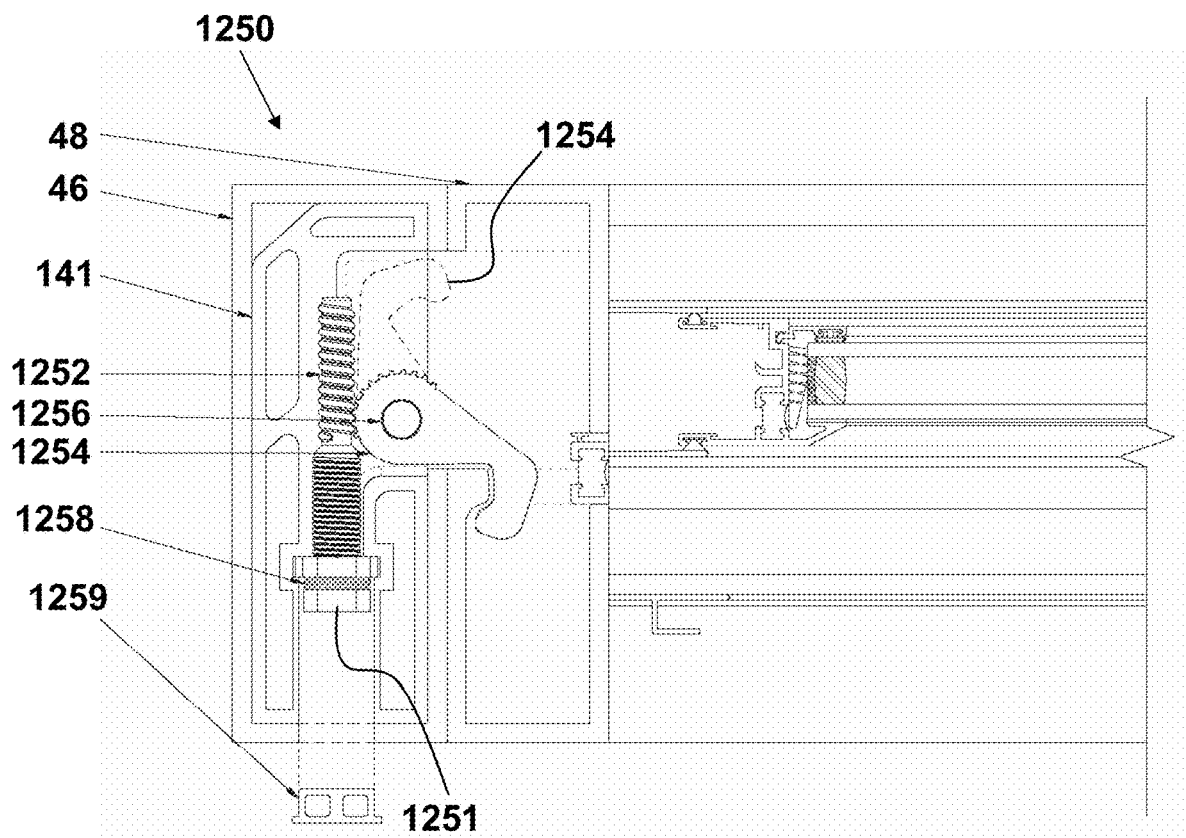
FIG. 60 is a fragmentary, plan and partially cross-sectional view of a left portion of the lower jamb of the window frame-to-connector frame system connection shown in FIG. 58 having a modular interlock part of FIGS. 50 and 51 in a locked state and, in dashed lines, the lock part in an unlocked state.
Figure 61:
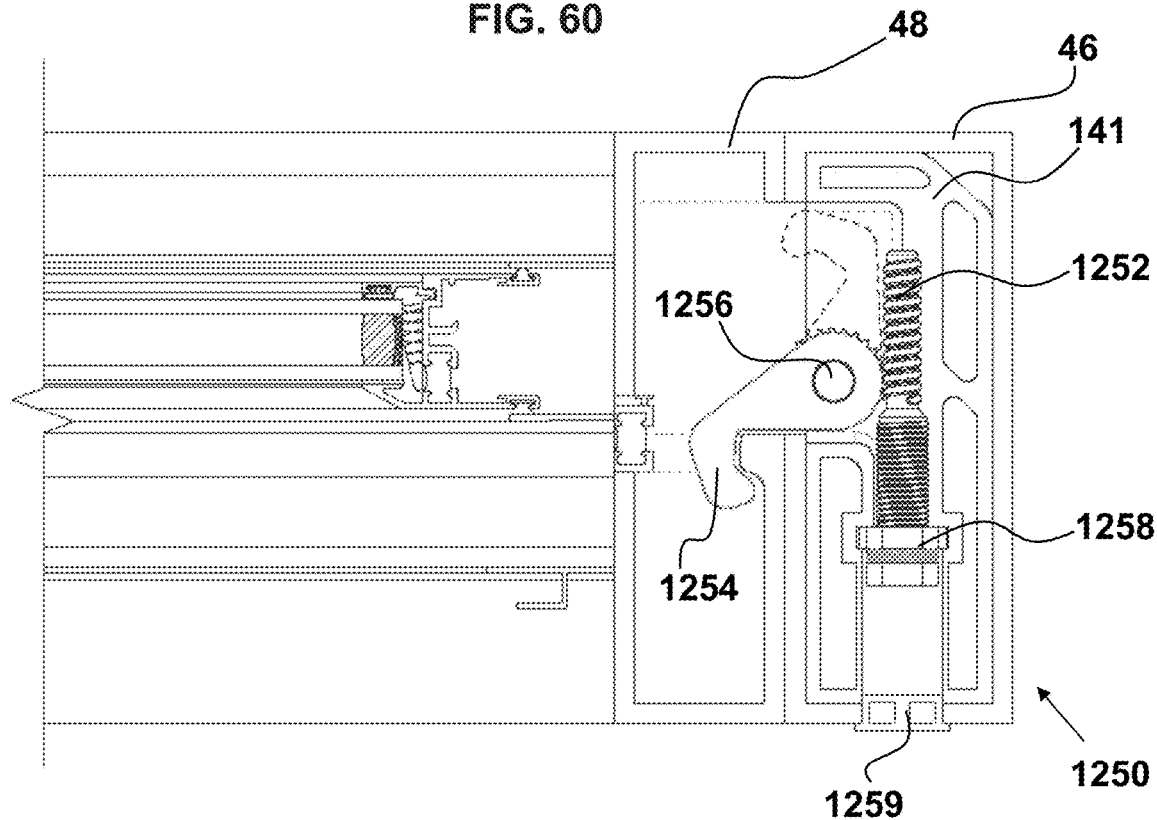
FIG. 61 is a fragmentary, plan and partially cross-sectional view of a right portion of the lower jamb of the window frame-to-connector frame system connection shown in FIG. 58 having a modular interlock part of FIGS. 50 and 51 in a locked state and, in dashed lines, the lock part in an unlocked state.
Figure 62:
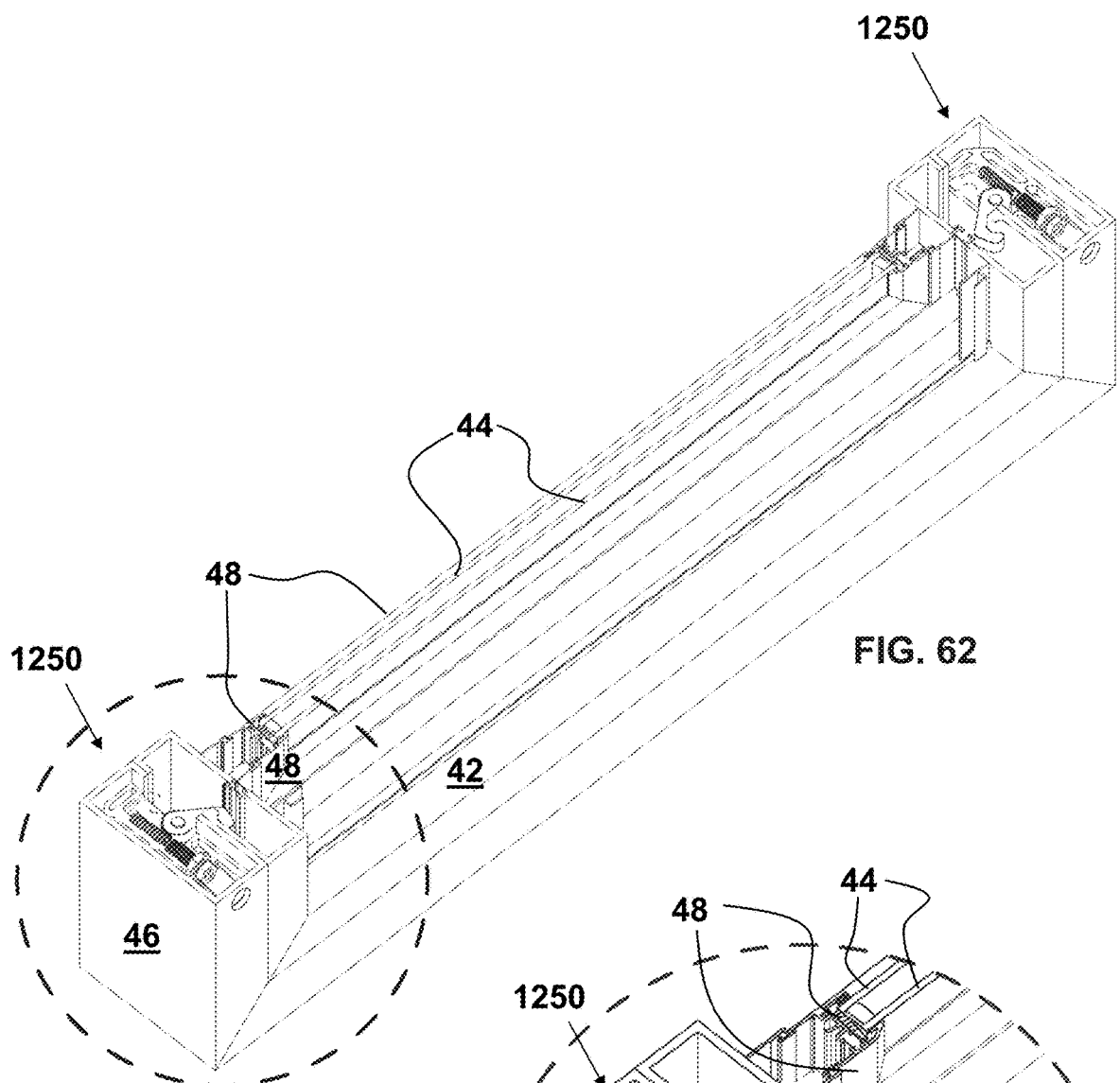
FIG. 62 is a perspective and cross-sectional view of an exemplary embodiment of a horizontal window frame-to-connector frame system connection shown in FIG. 58 having a securing interlock shown in FIG. 50 positioned within an interlock chamber of a connector frame in a locked state.
Figure 63:
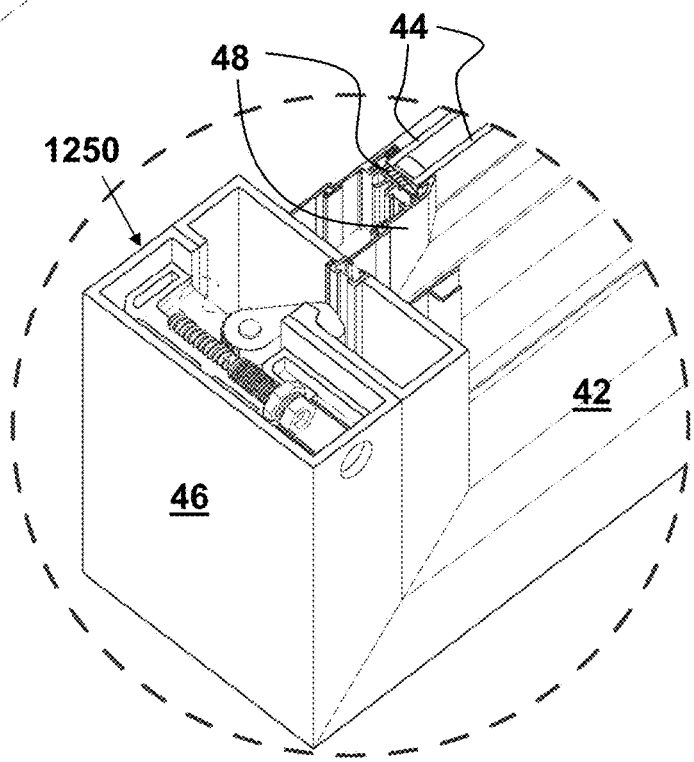
FIG. 63 is a fragmentary, enlarged, perspective and cross-sectional view of a portion of the horizontal window frame-to-connector frame system connection shown in FIG. 62.

An exemplary configuration of a window frame is depicted in FIGS. 58 and 59. Therein, a connector window frame 46 has vertical and horizontal struts connected together at angular joints and a set of modular interlock parts (here, e.g., four of 1250) are shown for connecting, in a central orifice thereof, a modular, pre-hung window 48. In FIG. 59, the modular, pre-hung window 48 and the set of modular interlock parts 1250 are depicted separated from one another. The assembly of the connector frame 46 allows for the early and safe installation of the window to be locked in place, thus protecting the glass and frames from damage during construction. FIGS. 60, 61, 62, and 63 show enlarged portions of the assemblies in FIG. 58. Also shown is a rubber cap 1259 that covers the connector 1251 and, if desired, also the washer and nut assembly 1258.

Figure 64:
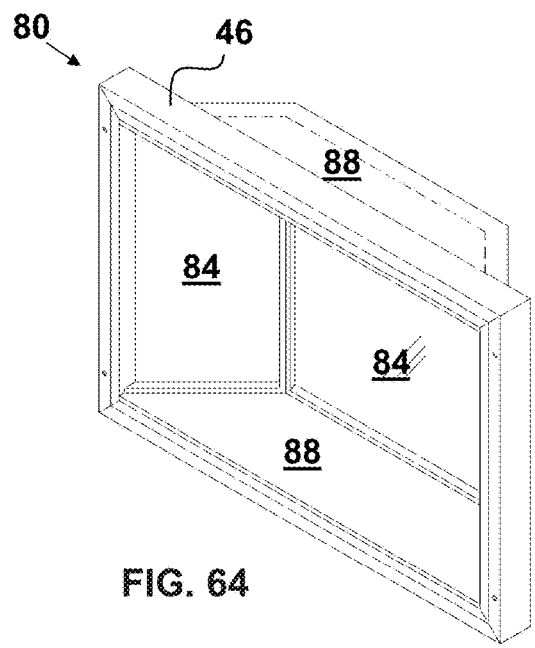
FIG. 64 is a perspective view of another exemplary embodiment of a horizontal bay window frame-to-connector frame system connection having internal interlocking mechanisms shown in FIG. 50 from an interior side.
Figure 65:
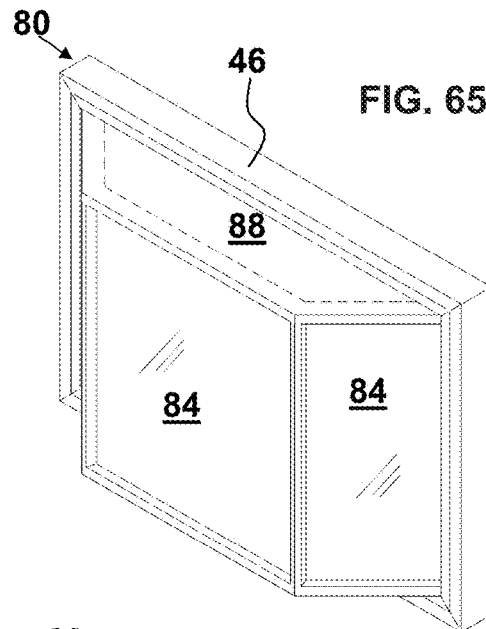
FIG. 65 is a perspective view of the horizontal bay window frame-to-connector frame system connection shown in FIG. 64 from an exterior side of the bay window.
Figure 66:
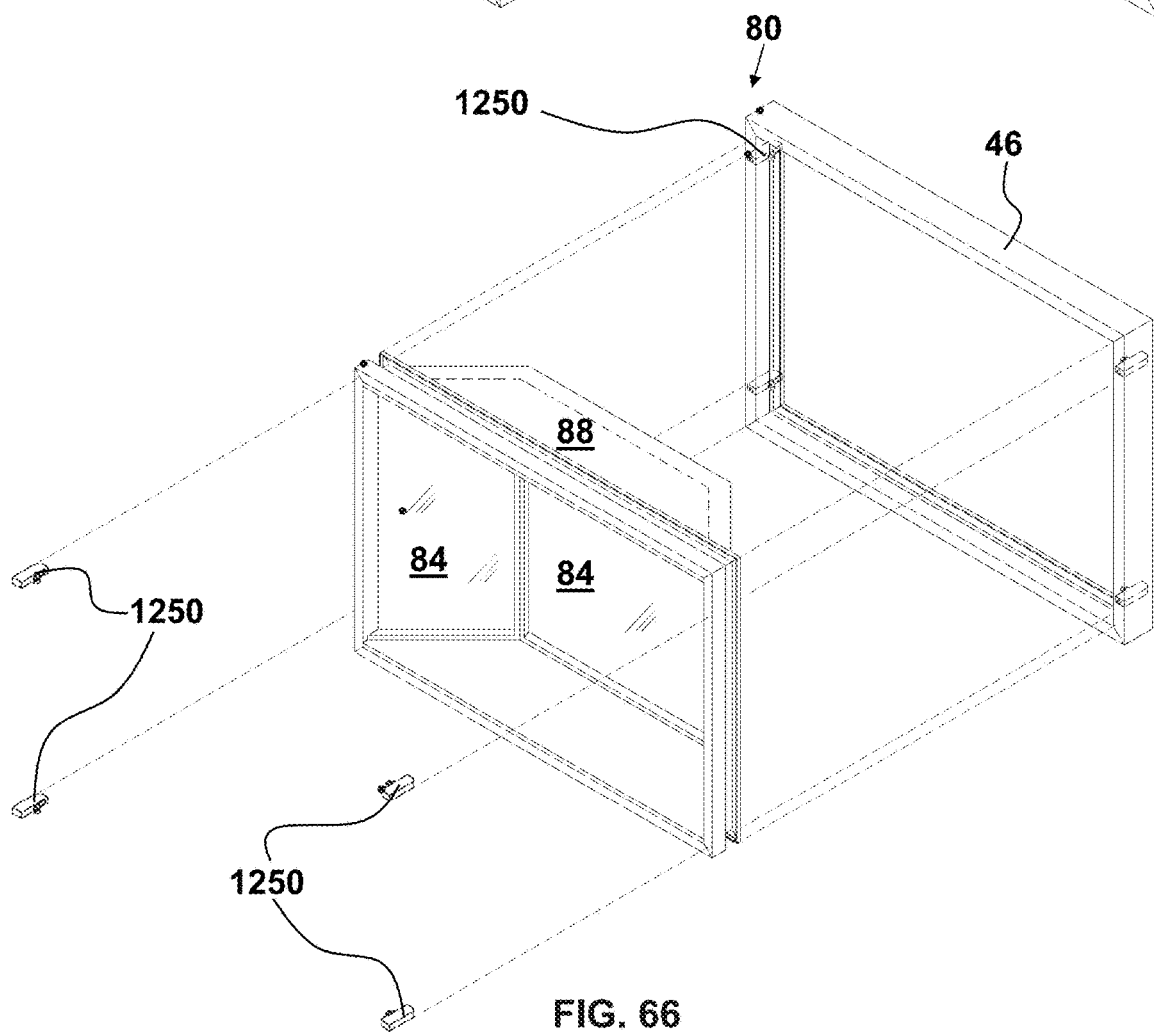
FIG. 66 is an exploded perspective view of the bay window connector frame system of FIGS. 64 to 65 having internal interlocking mechanisms shown in FIG. 50 in horizontal positions to be connected to a bay window frame in a horizontal bay window frame-to-connector frame system connection.
Figure 67:
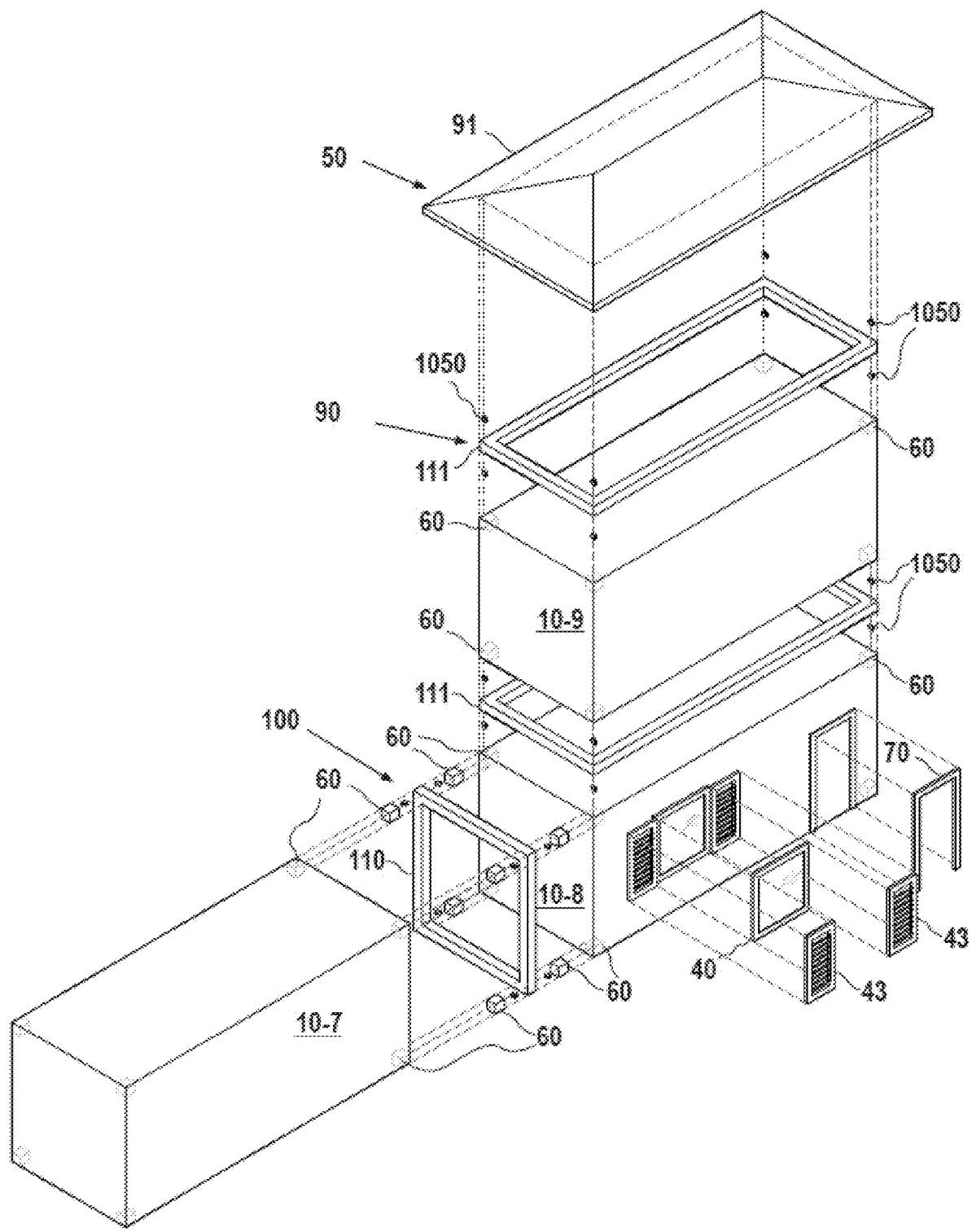
FIG. 67 is an exploded, perspective view of an exemplary embodiment of a vertical container-to-connector frame-to-container connection system between two shipping containers, one on top of the other, and with a horizontal container-to-connector frame-to-container connection system between two shipping containers, one on the rear end side of the other, with a container-to-connector frame-to-hip roof module connection system above the top shipping container and below a hip roof module to connect the hip roof module to the upper shipping container, and with door, window, and shutter module connector frames systems to be connected and locked in place on the right side of the lower shipping container.
Figure 68:
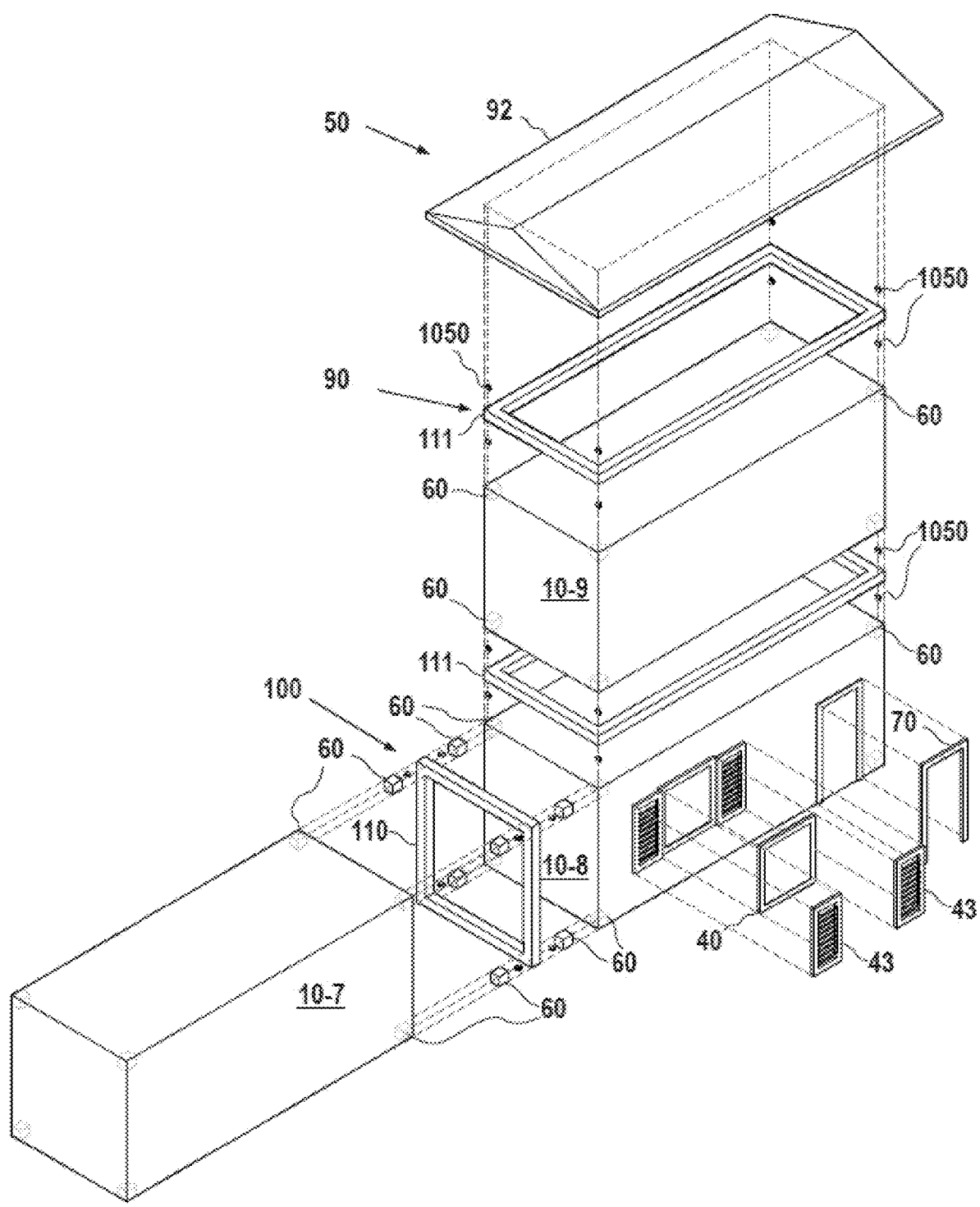
FIG. 68 is an exploded, perspective view of an exemplary embodiment of a vertical container-to-connector frame-to-container connection system between two shipping containers, one on top of the other, and with a horizontal container-to-connector frame-to-container connection system between two shipping containers, one on the rear end side of the other, with a container-to-connector frame-to-gable roof module connection system above the top shipping container and below a gable roof module to connect the gable roof module to the upper shipping container, and with door, window, and shutter module connector frames systems to be connected and locked in place on the right side of the lower shipping container.
Figure 69:
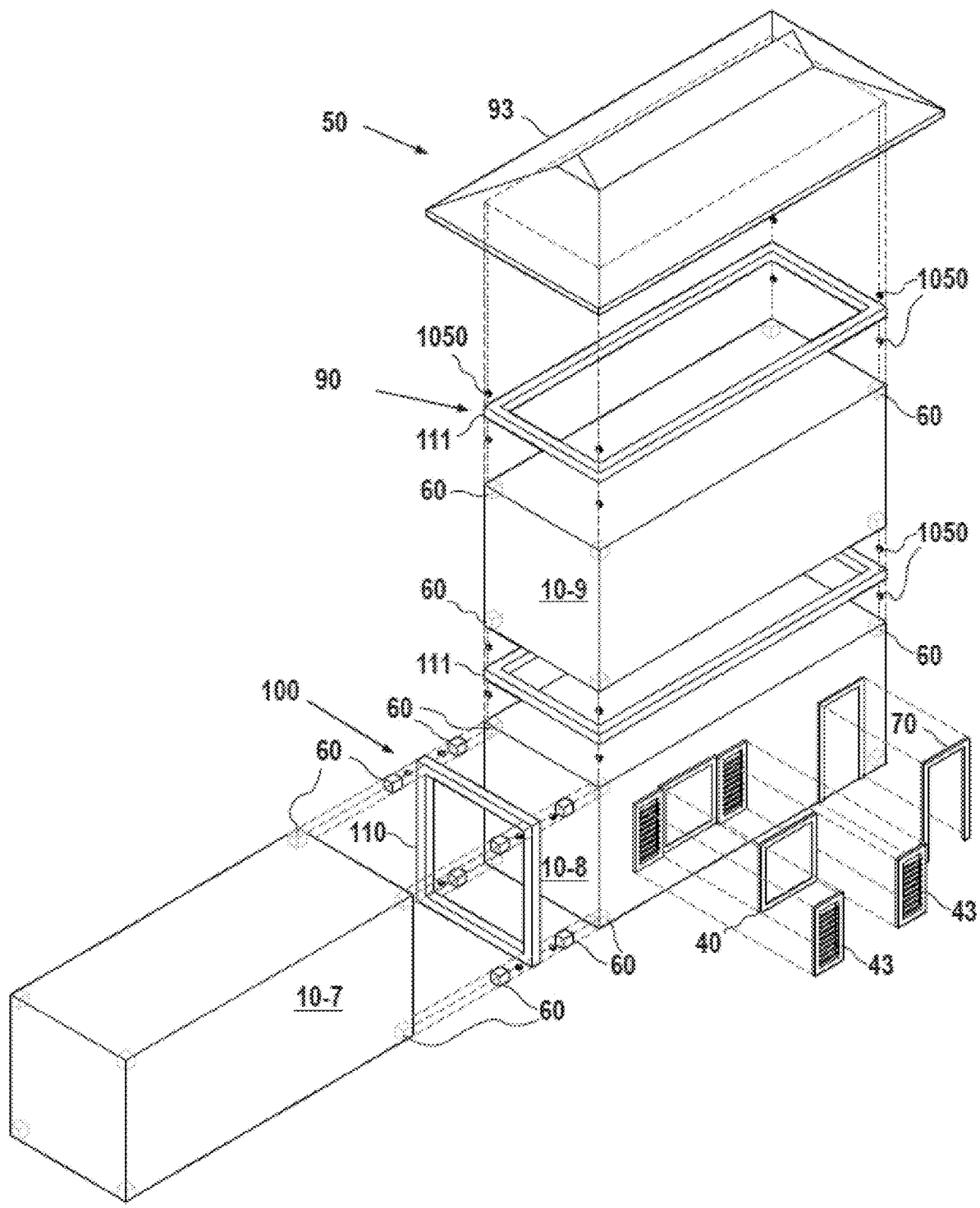
FIG. 69 is an exploded, perspective view of an exemplary embodiment of a vertical container-to-connector frame-to-container connection system between two shipping containers, one on top of the other, and with a horizontal container-to-connector frame-to-container connection system between two shipping containers, one on the rear end side of the other, with a container-to-connector frame-to-Polynesian roof module connection system above the top shipping container and below a Polynesian roof module to connect the Polynesian roof module to the upper shipping container, and with door, window, and shutter module connector frames systems to be connected and locked in place on the right side of the lower shipping container.
Figure 70:
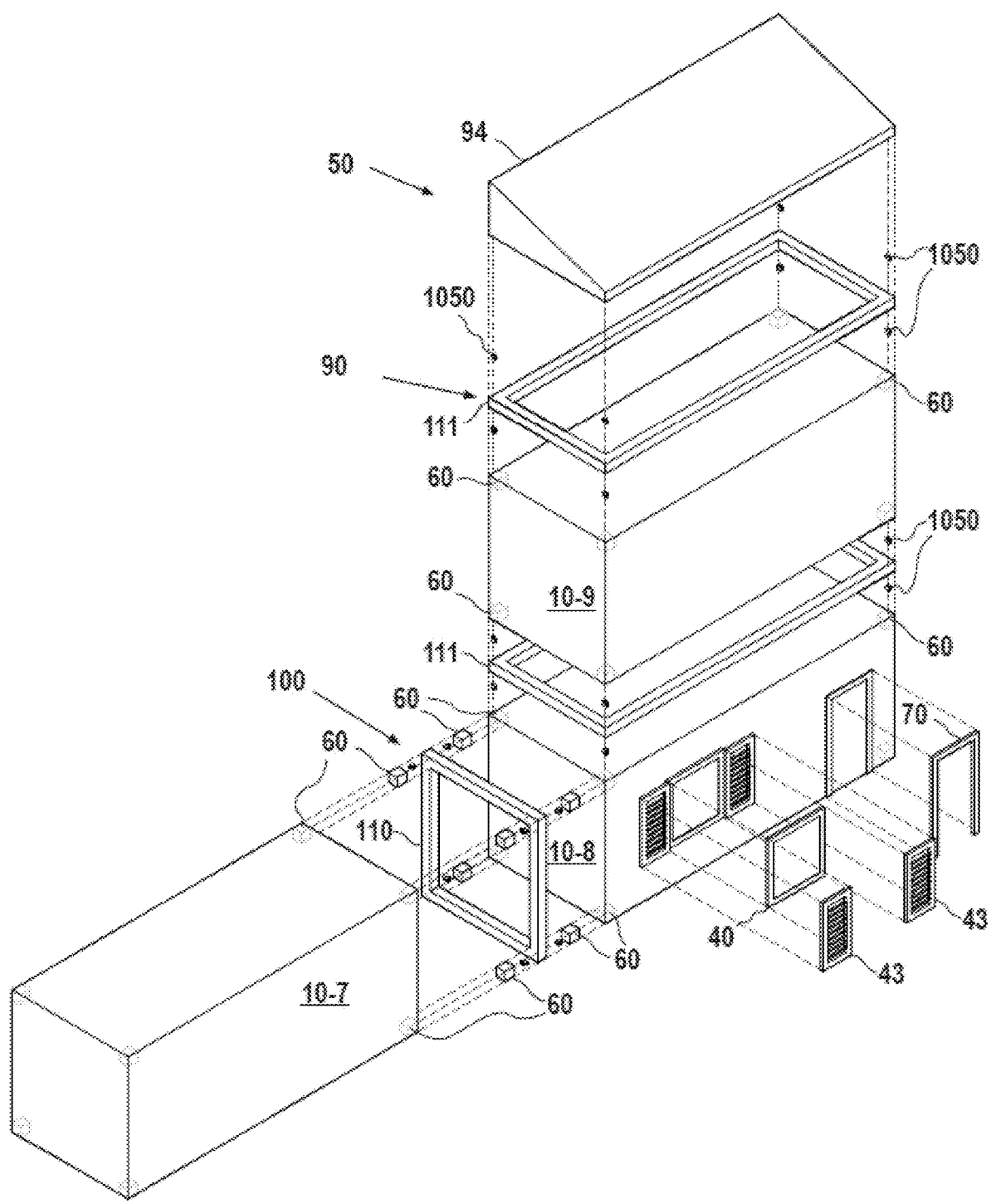
FIG. 70 is an exploded, perspective view of an exemplary embodiment of a vertical container-to-connector frame-to-container connection system between two shipping containers, one on top of the other, and with a horizontal container-to-connector frame-to-container connection system between two shipping containers, one on the rear end side of the other, with a container-to-connector frame-to-shed roof module connection system above the top shipping container and below a shed roof module to connect the shed roof module to the upper shipping container, and with door, window, and shutter module connector frames systems to be connected and locked in place on the right side of the lower shipping container.
Figure 71:
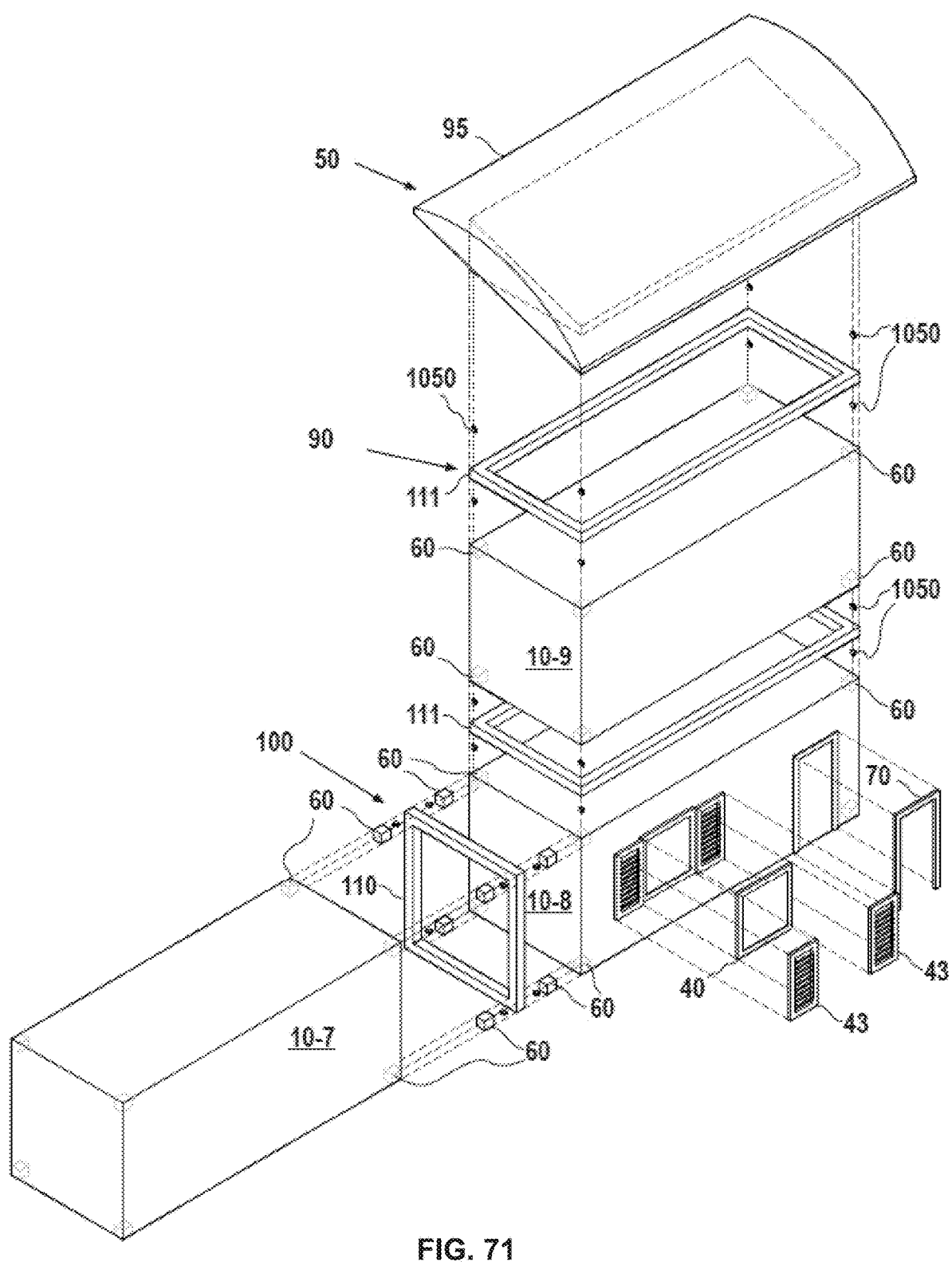
FIG. 71 is an exploded, perspective view of an exemplary embodiment of a vertical container-to-connector frame-to-container connection system between two shipping containers, one on top of the other, and with a horizontal container-to-connector frame-to-container connection system between two shipping containers, one on the rear end side of the other, with a container-to-connector frame-to-curved roof module connection system above the top shipping container and below a curved roof module to connect the curved roof module to the upper shipping container, and with door, window, and shutter module connector frames systems to be connected and locked in place on the right side of the lower shipping container.

FIGS. 64 to 66 show a variation of the window assemblies depicted in FIGS. 58 to 63. The features are similar and, therefore, the description is not repeated and incorporated herein by reference in its entirety. In these figures, the window assembly is a bay window assembly 80 having the connector window frame 46 with vertical and horizontal struts connected together at angular joints and a set of modular interlock parts (here, e.g., four of 1250) are shown for connecting, in a central orifice thereof, a modular, pre-hung bay window 88. In FIG. 66, the modular, pre-hung bay window 88 and the set of modular interlock parts 1250 are depicted separated from one another. The assembly of the connector frame 46 allows for the early and safe installation of the bay window to be locked in place, thus protecting the glass and frames from damage during construction.

FIGS. 67 to 71 show exemplary embodiments of a vertical container-to-connector frame-to-container connection 100 system between two shipping containers 10-8, 10-9, one on top of the other, and with a horizontal container-to-connector frame-to-container connection 100 system between two shipping containers 10-7, 10-8, one on the rear end side of the other, with a container-to-connector frame-to-roof module connection 90 system above the top shipping container 10-9 and below a roof module/segment 50, including, for example, a hip roof module 91 (FIG. 67), a gable roof module 92 (FIG. 68), a Polynesian roof module 93 (FIG. 69), a shed roof module 94 (FIG. 70), and a curved roof module 95 (FIG. 71), to connect the roof module/segment 50 to the upper shipping container 10-9, and with door 70, window 40, and shutter module 43 connector frames systems to be connected and locked in place on the right side of the lower shipping container 10-8. In FIGS. 67 to 71, the shipping containers 10-7, 10-8, 10-9, the connector frames 110, 111, the modular architectural elements (such as doors 70, windows 40, and shutters 43), and the set of modular interlock parts 1050 are depicted separated from one another. The assembly of the window and door connector frames 46, 72 allows for the early and safe installation of a window or door to be locked in place, thus protecting the glass and frames from damage during construction.

It is noted that various configurations described herein have been depicted or described with one or another of different combinations. For example, some connector frames have been depicted and/or described with modular interlock part 1050 while others have been depicted and/or described with modular interlock part 1250. No one combination of the various different embodiment should be understood as limited to that single combination shown or described. Herein, any of the various parts can be combined or exchanged with another one of the parts in any combination that is possible. For example, where a particular configuration is shown or described with modular interlock part 1250, it is equally possible to be combined with any of the other interlocks 140, 150, 250, 350, 650, 750, 850, 950, 1050, 1150 or modular interlock part 1250. No single part is to be understood as being required to be combined with another singular part and all possible combinations thereof are expressly claimed herein without repetitive description for reasons of brevity.

While one exemplary embodiment for the container-to-connector frame-to-container connection systems is to utilize shipping containers for homes, these can also be used for safe schools, for laboratories, and for clean rooms, to name a few applications. Regarding use for schools, the shipping containers provide significant bullet resistance and can be enhanced to be bullet proof. The shipping containers can be attached together with the container-to-connector frame-to-container connection systems in units or packs of four or six to make larger classrooms or to make separate rooms with interconnected hallways.

The structures can also be used as bullet-proof/resistant safe rooms or houses or as a bunker.

In each of the exemplary embodiments that the container-to-connector frame-to-container connection systems can be used with shipping containers, the structures have attributes allowing them to qualify as hurricane shelters, being able to withstand winds of up to 300 mph in various configurations.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and, in any combination, or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

Unless otherwise described, reference signs differing by the value 100 or a multiple of 100 hereinabove are intended to describe similar, same, or corresponding features or components, so that reference can be made to the respective descriptions elsewhere in this description. For example, the reference signs 170, 270, 370, 470, 570 etc., are used to designate, describe, and display interlock mechanisms. Each of these is interchangeable with the other and this applies to every similarly functioning part with a different reference sign.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A modular housing structure, comprising:
at least two shipping containers having corner fittings defining orifices, each shipping container having six sides, a first of the at least two shipping containers adjacent a second of the at least two shipping containers to face a pair of the six sides towards one another to define a facing side pair defining a perimeter;
a plurality of modular interchangeable interlocks each having a lock part:
movable between a locked position and an unlocked position; and
shaped and configured to lock within an orifice of any of the corner fittings of the at least two shipping containers; and
a modular connector frame:
disposed between the facing side pair;
having a shape corresponding to the perimeter; and
comprising four modular struts each having:
a first corner interlock assembly defining a first hollow interlock assembly compartment shaped to contain therein at least one of the interchangeable interlocks; and
a second corner interlock assembly defining a second hollow interlock assembly compartment shaped to contain therein at least another one of the interchangeable interlocks, wherein:
a first subset of the interchangeable interlocks is disposed within each of the first and second hollow interlock assembly compartments and positioned such that, responsive to moving each lock part into the locked position, the four modular struts are removably locked together to form an enclosed rectangle having four corners; and a second subset of the interchangeable interlocks disposed in the first and second corner interlock assemblies at each of the four corners of the frame and configured to lock within an opposing orifice of a corner fitting of one of the two shipping containers to removably lock the modular connector frame to the two facing sides and secure the at least two shipping containers together.

2. The structure according to claim 1, wherein the six sides comprise two opposing ends and four sides and the facing side pair comprises one of:
the two facing ends of two shipping containers; and
two facing sides of the two shipping containers.

3. The structure according to claim 1, wherein each of the plurality of modular interchangeable interlocks are identical in shape and are configured to be any of the first and second subsets of the interchangeable interlocks.

4. The structure according to claim 1, wherein each of the plurality of modular, interchangeable struts comprises:
a first end at which the first corner interlock assembly defines the first hollow interlock assembly compartment shaped to contain therein at least three of the interchangeable interlocks; and
a second end, opposite the first end, at which the second corner interlock assembly defines the second hollow interlock assembly compartment shaped to contain therein at least another three of the interchangeable interlocks.

5. The structure according to claim 1, wherein the enclosed rectangle is a square.

6. The structure according to claim 1, wherein, responsive to the second subset of the interchangeable interlocks being moved to the locked position, the two shipping containers are removably locked together at the two facing ends.

7. The structure according to claim 1, wherein:
the at least two shipping containers are at least three shipping containers;
the modular connector frame comprises first and second modular connector frames each having subsets of the interchangeable interlocks;
two of the at least three shipping containers are removably connected together at two opposing ends thereof by the first modular connector frame and a subset of the interchangeable interlocks; and
two of the at least three shipping containers are removably connected together at two opposing sides thereof by the second modular connector frame and a subset of the interchangeable interlocks.

8. The structure according to claim 1, wherein at least one of the first and second shipping containers have dimensions of one of:
8' wide by 8.5' high by 20' long;
8' wide by 8.5' high by 40' long;
8' wide by 8.5' high by 10' long;
8' wide by 9.5' high by 40' long; and
8' wide by 9.5' high by 45' long.

9. The structure according to claim 1, wherein the first and second shipping containers and the modular connector frame comprise at least one of a school room, a laboratory, and a clean room.

10. The structure according to claim 1, wherein the first and second shipping containers and the modular connector frame comprise a hurricane shelter configured to withstand winds of up to 300 mph.

11. The structure according to claim 1, which further comprises at least one accessory comprising at least one of a stairway, a façade, siding, a window, a window treatment, a window casement, a roof, a roof segment, a wall, a door, and a door casement, each accessory comprising at least one hollow interlock assembly compartment shaped to receive therein at least one of the modular interchangeable interlocks.

12. The structure according to claim 11, wherein, responsive to the at least one modular interchangeable interlock being disposed in the at least one hollow interlock assembly compartment and to the lock part of the at least one modular interchangeable interlock being moved into the locked position, the at least one modular interchangeable interlock removably locks the respective accessory to a respective opposing lock part orifice of one of the corner fittings of one of the first and second shipping containers.

13. The structure according to claim 1, wherein each of the plurality of modular interchangeable interlocks comprise:
a body;
the lock part pivotally connected to the body between the locked position and the unlocked position; and
a driveshaft connected to the body in a rotatable manner and operatively connected to the lock part to pivot the lock part into the locked position responsive to the driveshaft being rotated in a first direction and to pivot the lock part into the unlocked position responsive to the driveshaft being rotated in a second direction opposite the first direction.

14. The modular multi-container housing structure according to claim 1, wherein the second subset of the interchangeable interlocks comprise:
a first group of the interchangeable interlocks positioned to lock within an opposing orifice of a corner fitting of a first of the two shipping containers to removably lock the modular connector frame to the facing side of the first shipping container; and
a second group of the interchangeable interlocks positioned to lock within an opposing orifice of a corner fitting of a second of the two shipping containers to removably lock the modular connector frame to the facing side of the second shipping container.

15. The structure according to claim 14, wherein each of the plurality of modular interchangeable interlocks is identical in shape and configured to be any of the first and second subsets of the interchangeable interlocks.

16. A modular multi-container housing structure, comprising:
at least two shipping containers having corner fittings defining orifices, each shipping container having six sides, a first of the at least two shipping containers adjacent a second of the at least two shipping containers to face a pair of the six sides towards one another to define a facing side pair defining a perimeter and at least one facing corner pair of the corner fittings;
a plurality of modular interchangeable interlocks shaped and configured to lock within any of the orifices of the corner fittings of the at least two shipping containers;
a modular connector frame comprising modular, interchangeable struts each having opposing first and second corner interlock assemblies each containing at least one of the modular interchangeable interlocks to define a first subset of the plurality of modular interchangeable interlocks, the struts disposed between the facing side pair the first subset of the plurality of modular interchangeable interlocks within the corner interlock assemblies of the struts being positioned such that, responsive to being locked, the struts removably lock together to form a rectangle having a shape corresponding to the perimeter; and at least one second subset of the plurality of modular interchangeable interlocks being disposed within the corner interlock assemblies of the frame positioned and configured to lock within an opposing orifice of one of the at least one facing corner pair of corner fittings responsive to placing the frame against the one of the at least one facing corner pair of corner fittings and locking the second subset.

17. The modular multi-container housing structure according to claim 16, which further comprises at least one third subset of the plurality of modular interchangeable interlocks within the corner interlock assemblies of the frame positioned and configured to lock within an opposing orifice of the other of the at least one facing corner pair of corner fittings responsive to the frame being placed against the other of the at least one facing pair of corner fittings and responsive to the third subset being locked.

18. The modular multi-container housing structure according to claim 17, wherein each of the plurality of modular interchangeable interlocks is identical in shape and configured to be any of the first, second, and third subsets of the interchangeable interlocks.

* * * * *